(12) United States Patent
Kawana

(10) Patent No.: US 7,489,449 B2
(45) Date of Patent: Feb. 10, 2009

(54) ZOOM LENS FOR PROJECTION AND PROJECTION DISPLAY DEVICE

(75) Inventor: Masanao Kawana, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/955,202

(22) Filed: Dec. 12, 2007

(65) Prior Publication Data
US 2008/0151382 A1 Jun. 26, 2008

(30) Foreign Application Priority Data

Dec. 21, 2006 (JP) ............................ P2006-343774
Mar. 5, 2007 (JP) ............................ P2007-054359

(51) Int. Cl.
*G02B 15/14* (2006.01)
(52) U.S. Cl. .................. 359/680; 359/682; 359/686
(58) Field of Classification Search ................. 359/680, 359/681, 682, 686
See application file for complete search history.

(56) References Cited

U.S. PATENT DOCUMENTS 5,157,550 A * 10/1992 Tsuchida et al. ............ 359/686
5,867,326 A * 2/1999 Yamamoto ................. 359/686
6,204,976 B1 * 3/2001 Nagahara .................. 359/686

FOREIGN PATENT DOCUMENTS

| JP | 2000-271668 A | 10/2000 |
| JP | 2006-78705 A | 3/2006 |
| JP | 2007-271695 A | 10/2007 |

* cited by examiner

*Primary Examiner*—Scott J Sugarman
(74) *Attorney, Agent, or Firm*—Birch, Stewart, Kolasch & Birch, LLP

(57) ABSTRACT

A zoom lens for projection is provided and includes a first group having a negative refractive power, a second group having a positive refractive power, a third group having a positive refractive power, and a fourth group having a positive or negative refractive power, in order from the magnification side. At variable power from a wide-angle end to a telephoto end, the second, third and fourth groups are moved to the magnification side, and the first group is slightly moved to the reduction side. Also, the following conditional expression (1) is satisfied.

$$0.95 < frw/frt < 1.05 \qquad (1)$$

Where frw is a composite focal length of the second, third and the fourth groups at the wide-angle end, and frt is a composite focal length of the second, third group and fourth groups at the telephoto end.

13 Claims, 49 Drawing Sheets

EXAMPLE 1 (WIDE)

EXAMPLE 1 (WIDE)

EXAMPLE 2 (WIDE)

EXAMPLE 2

EXAMPLE 3 (WIDE)

EXAMPLE 3

EXAMPLE 4 (WIDE)

EXAMPLE 4

EXAMPLE 5 (WIDE)

EXAMPLE 1

EXAMPLE 1

EXAMPLE 1

EXAMPLE 2

EXAMPLE 2

EXAMPLE 2

EXAMPLE 2

EXAMPLE 3

EXAMPLE 3
WIDE

FIG. 21
EXAMPLE 3
MIDDLE
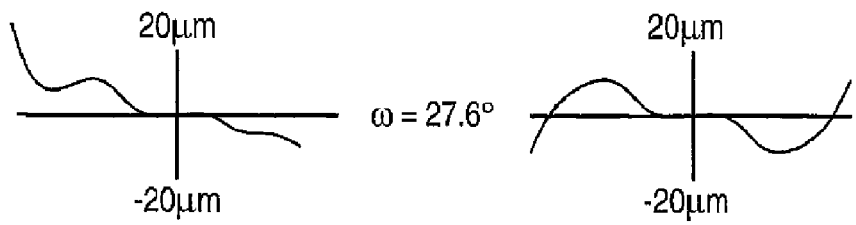
ω = 27.6°
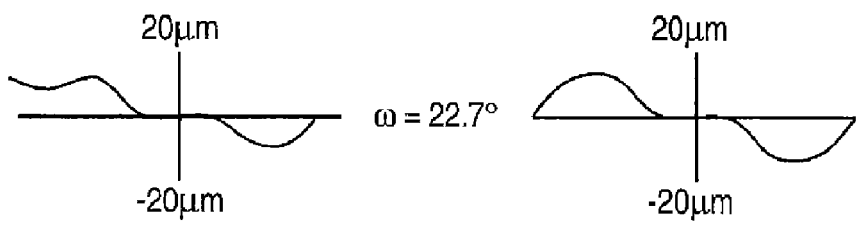
ω = 22.7°
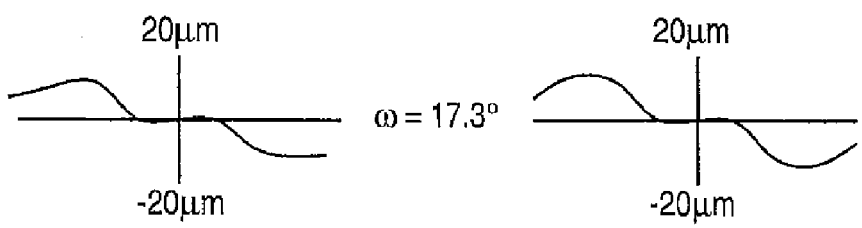
ω = 17.3°
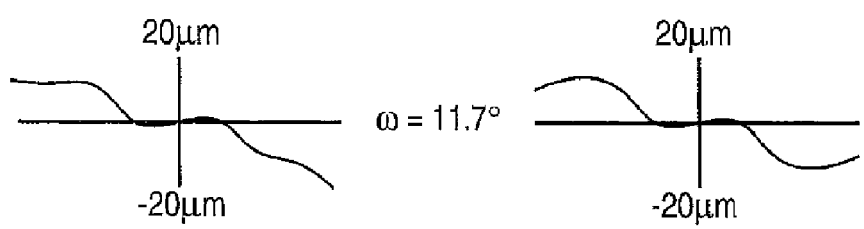
ω = 11.7°
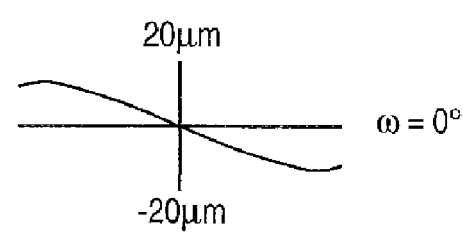
ω = 0°

EXAMPLE 3

EXAMPLE 4

EXAMPLE 4

EXAMPLE 4

EXAMPLE 4

EXAMPLE 5

FIG. 28
EXAMPLE 5
WIDE
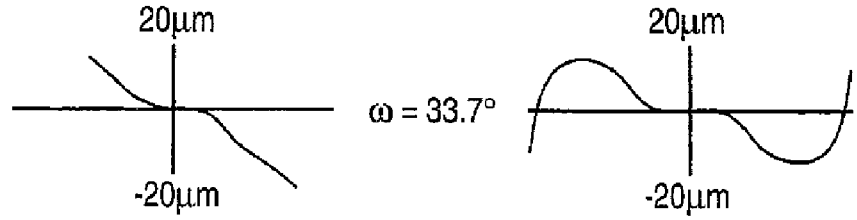
ω = 33.7°
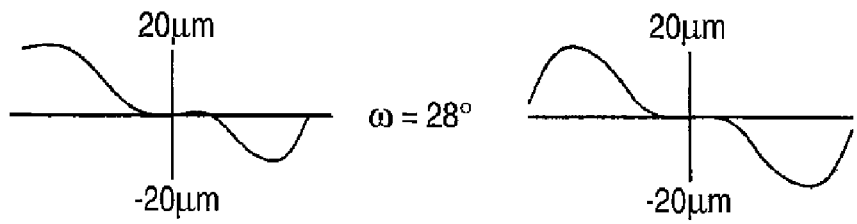
ω = 28°
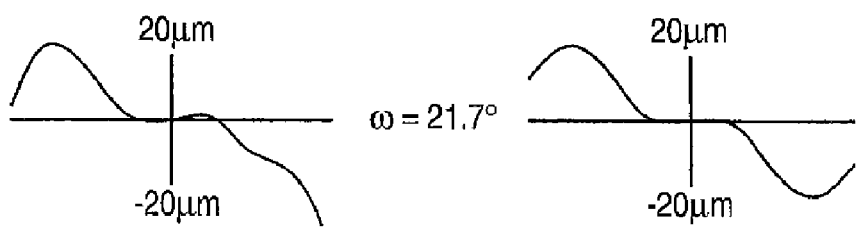
ω = 21.7°
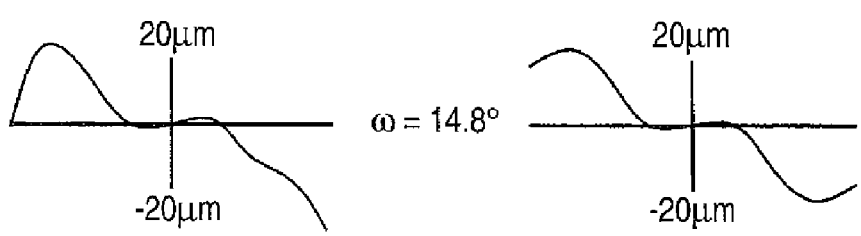
ω = 14.8°
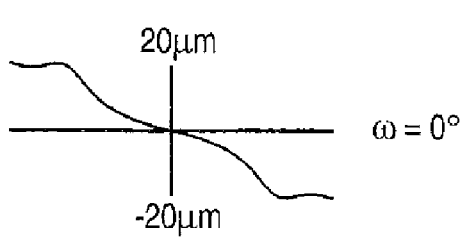
ω = 0°

EXAMPLE 5

FIG. 30
EXAMPLE 5
TELE
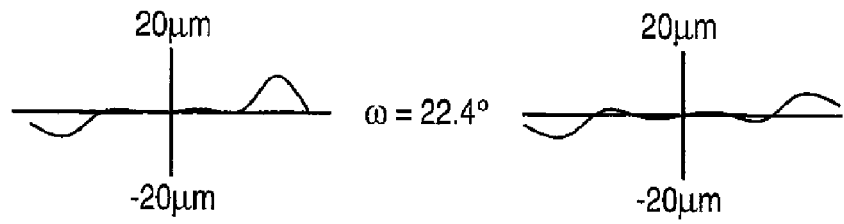
ω = 22.4°
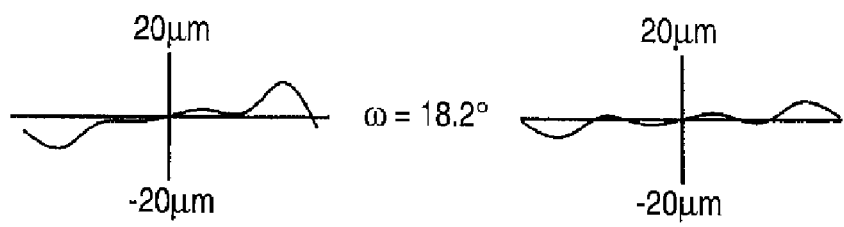
ω = 18.2°
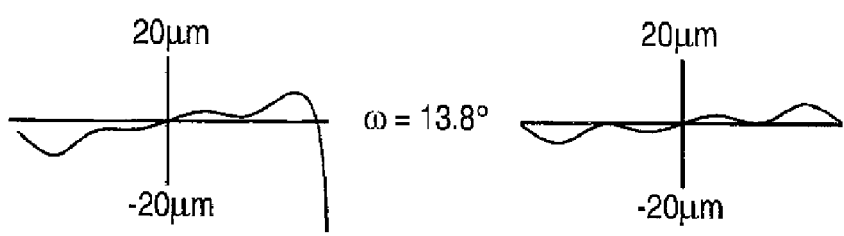
ω = 13.8°
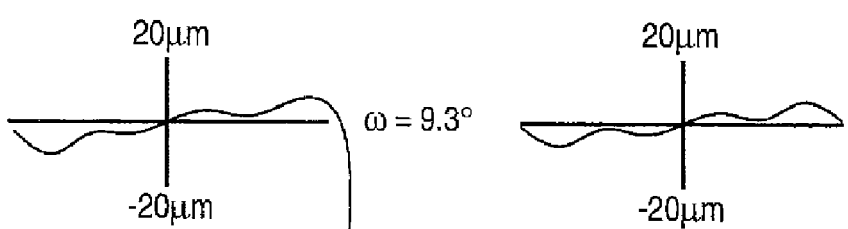
ω = 9.3°
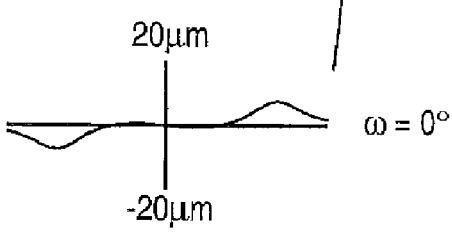
ω = 0°

EXAMPLE 6 (WIDE)

EXAMPLE 6

EXAMPLE 7 (WIDE)

EXAMPLE 8 (WIDE)

EXAMPLE 8

EXAMPLE 6

EXAMPLE 6

FIG. 40
EXAMPLE 6
TELE
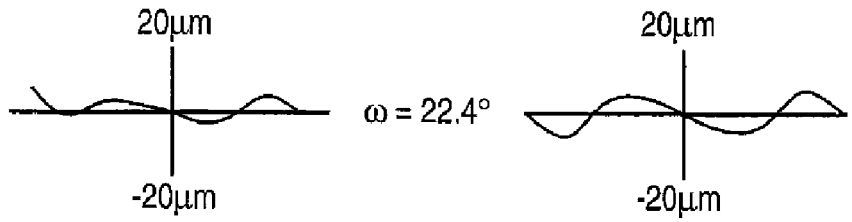
ω = 22.4°
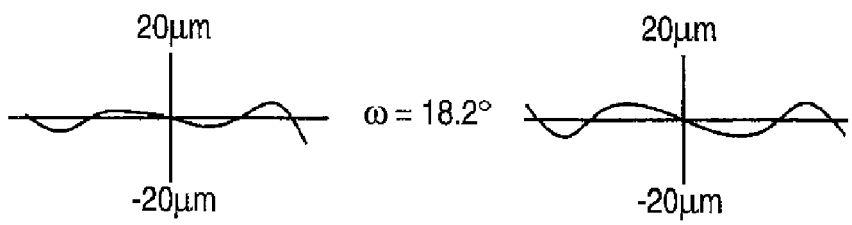
ω = 18.2°
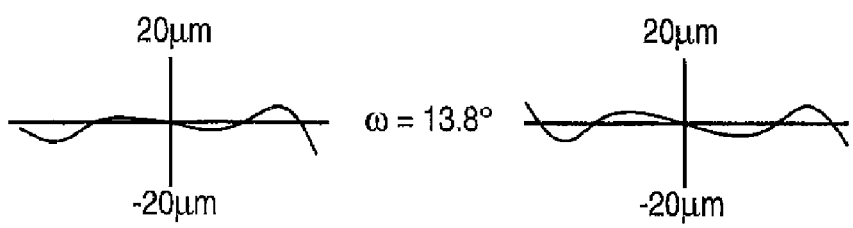
ω = 13.8°
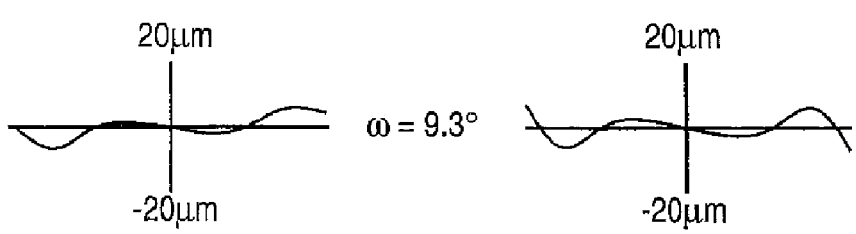
ω = 9.3°
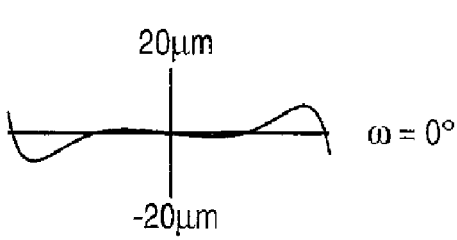
ω = 0°

EXAMPLE 7

EXAMPLE 7

FIG. 44
EXAMPLE 7
TELE
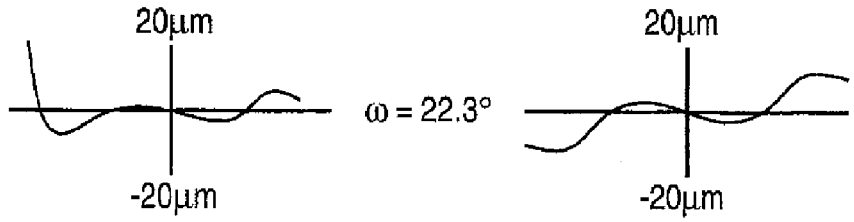
ω = 22.3°
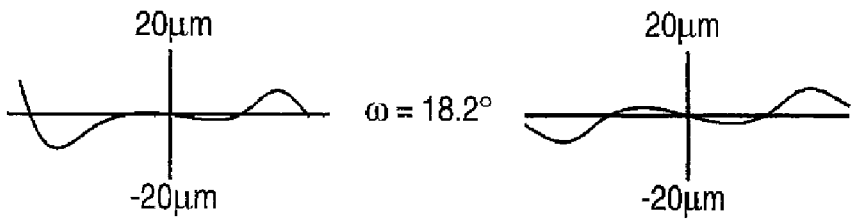
ω = 18.2°
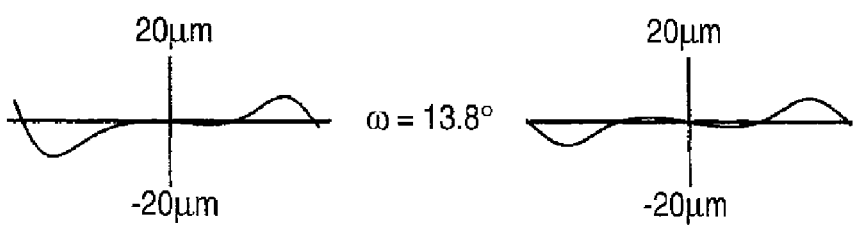
ω = 13.8°
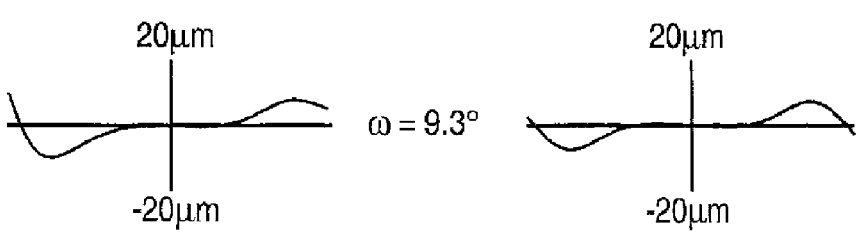
ω = 9.3°
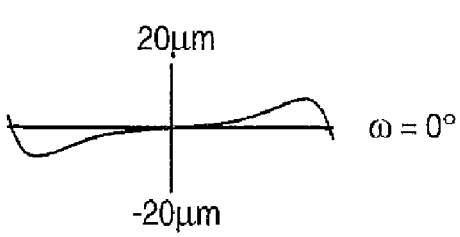
ω = 0°

EXAMPLE 8

EXAMPLE 8

FIG. 47
EXAMPLE 8
MIDDLE
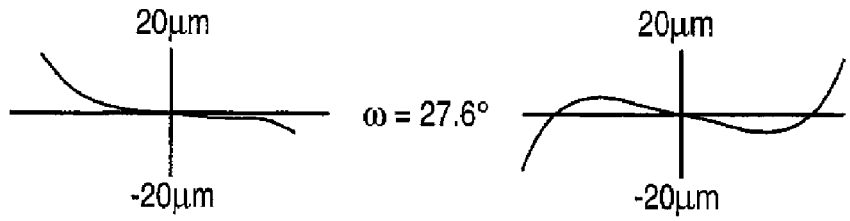
ω = 27.6°
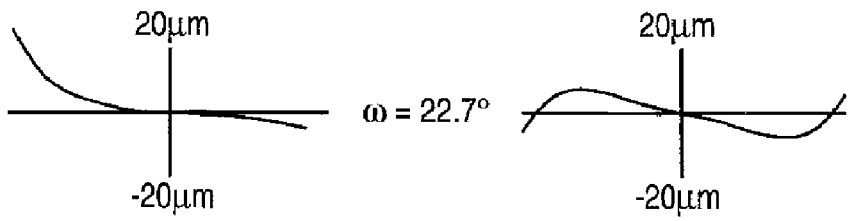
ω = 22.7°
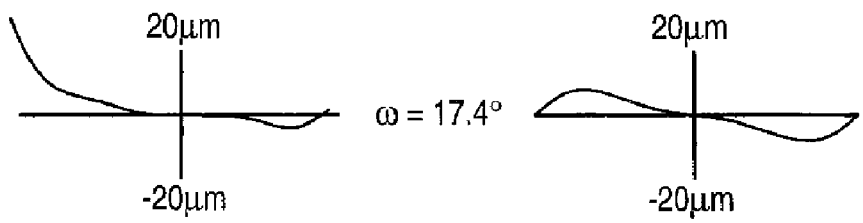
ω = 17.4°
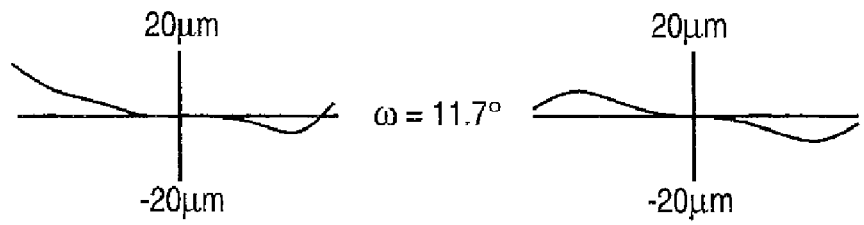
ω = 11.7°
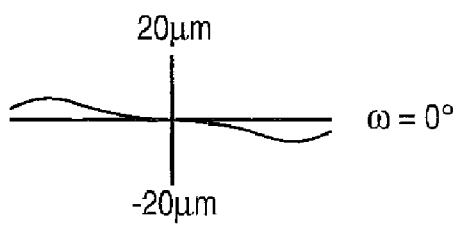
ω = 0°

EXAMPLE 8

ZOOM LENS FOR PROJECTION AND PROJECTION DISPLAY DEVICE

BACKGROUND OF THE INVENTION

1. Field of the Invention

The present invention relates to a zoom lens for projection, including four lens groups and being mounted on a projection display device, and a projection display device. Particularly, the present invention relates to a zoom lens for projection and a projection display device for magnifying and projecting a flux of light carrying video information from a light valve of a DMD (Digital Micro-mirror Device) display device onto a screen.

2. Description of Related Art

In recent years, a projector device (projection display device) using a DMD display device as a light valve has been noted.

The DMD is made by forming rectangular minute mirrors (mirror elements) of high reflectance, which can change the inclination in the range of 10 degrees or more in accordance with a video signal, on a silicon memory chip, using the CMOS semiconductor technology. The projector device using this DMD controls the reflecting direction of a light from a light source by changing the angle of the mirror elements, focusing only a desired reflected light onto the screen to enable a desired video to be projected.

In this DMD, for example, millions of mirrors or more are arranged in rows and columns on a substrate. Since these many mirrors can be digitally controlled independently of one another, each mirror corresponds to one pixel in the video.

Also, since it is unnecessary to polarize the illuminating light, unlike a liquid crystal display, there is less loss of light, whereby the DMD is excellent in the correctness of gradation representation.

In this manner, the DMD display device has many advantages, but there is a high degree of demand for an optical system mounted on the DMD display device to ensure the effectiveness of these advantages. Further, there is a growing demand for the projector device using the DMD that is convenient to carry or has good portability. It is required for the optical system to meet such demand for the portability.

By the way, most of the projector devices using the DMD adopt a so-called time division method in which an illumination system is constructed without a prism that is for the color synthesis or the separation of illuminating light or projected light and that is disposed on the reduction side of a projecting lens. In this case, since a space for disposing the prism is unnecessary, and the reduction side of the projecting lens is not required to be telecentric, it is demanded to further miniaturize the lenses by setting up the pupil on the reduction side at a position near the panel. In addition to the high image quality consistent with the resolution of the device, the wide angle of view and the zoom of high variable power ratio are further required from the viewpoint of establishment.

A zoom lens system capable of meeting the above requests to some extent was described in JP-A-2004-271668.

The techniques as described in JP-A-2004-271668 can meet the above various requests, including the wide angle of view and the high variable power ratio. However, to maintain the excellent aberration with the constitution as described in JP-A-2004-271668, it was required that a plurality of aspheric lenses were disposed, as will be clear from the examples.

Therefore, the processing and assembling loads of the optical system were increased, causing the manufacturing cost to rise.

JP-A-2006-78705 discloses a system configured to be telecentric on the reduction side, and fundamentally inconsistent with the invention in which the miniaturization is an important object. Also, a zoom lens for projection that is the three group zoom lens but and can be achieve object to the invention, and a projection display device are disclosed in JP-A-2007-271695.

SUMMARY OF THE INVENTION

An object of an illustrative, non-limiting embodiment of the invention is to provide a zoom lens for projection, which is suitable for a projector device using a DMD, which can achieve a wide angle of view, a high variable power ratio, and a lower cost, has high performance, and which is compact and bright, without using a plurality of aspheric lenses, and to provide a projection display device.

According to an aspect of the invention, there is a zoom lens for projection which includes: in order from a magnification side of the zoom lens, a first lens group having a negative refractive power; a second lens group having a positive refractive power; a third lens group having a positive refractive power; and a fourth lens group having a positive or negative refractive power. When the zoom lens varies a power thereof from a wide-angle end to a telephoto end, the second, third and fourth lens groups moves to the magnification side. The zoom lens satisfies the following conditional expression (1):

$$0.95 < frw/frt < 1.05 \qquad (1)$$

where frw is a composite focal length of the second, third and fourth lens groups at the wide-angle end, and frt is a composite focal length of the second, third and fourth lens groups at the telephoto end.

Also, the following expressions (2) and (3) may be satisfied, $$|M4/f4| < |M1/f1| < |M2/f2| < |M3/f3| \qquad (2)$$

$$0.4 < |M3/f3| < 0.8 \qquad (3)$$

where Mn is a travel distance of the nth lens group from a wide-angle end position to a telephoto end position, and fn is a focal length of the nth lens group.

Also, instead of the above conditional expressions (2) and (3), the following expressions (4) and (5) may be satisfied, $$|M4/f4| < |M2/f2| < |M1/f1| < |M3/f3| \qquad (4)$$

$$0.2 < |M3/f3| < 0.6 \qquad (5)$$

where Mn is the travel distance of the nth lens group from a wide-angle end position to a telephoto end position, and fn is the focal length of the nth lens group.

Also, in the fourth lens group, a refractive index Nd, at the d-line, of an optical material (e.g., a glass material or a resin material) of a lens having the strongest negative refractive power may satisfy the following expression (6).

$$Nd > 1.75 \qquad (6)$$

Also, a positive lens with a convex surface on the reduction side thereof may be disposed on the most reduction side of the fourth lens group.

Also, an aspheric lens may be disposed in the fourth lens group.

Further, according to an aspect of the invention, there is provided a projection display device, which includes a light source, a light valve, an illuminating optical section for conducting a flux of light from the light source to the light valve, and the zoom lens for projection according to any one as above, wherein the flux of light from the light source is optically modulated by the light valve, and projected through the zoom lens for projection onto a screen.

BRIEF DESCRIPTION OF THE DRAWINGS

The features of the invention will appear more fully upon consideration of the exemplary embodiment of the invention, which are schematically set forth in the drawings, in which:

FIG. 21 is an aberration view showing the lateral aberration at the middle position of the zoom lens for projection according to the example 3;

FIG. 28 is an aberration view showing the lateral aberration at the wide-angle end of the zoom lens for projection according to the example 5;

FIG. 30 is an aberration view showing the lateral aberration at the telephoto end of the zoom lens for projection according to the example 5;

FIG. 40 is an aberration view showing the lateral aberration at the telephoto end of the zoom lens for projection according to the example 6;

FIG. 44 is an aberration view showing the lateral aberration at the telephoto end of the zoom lens for projection according to the example 7;

FIG. 47 is an aberration view showing the lateral aberration at the middle position of the zoom lens for projection according to the example 8;

DETAILED DESCRIPTION OF THE EXEMPLARY EMBODIMENTS

Although the invention will be described below with reference to exemplary embodiments thereof, the following exemplary embodiments and modifications do not restrict the invention.

According to a zoom lens for projection and a projection display device in an embodiment of the invention, since the lens system has a four lens group constitution, and the power and variable power function are appropriately shared among the groups, it is possible to provide the wide angle system, which has a variable power ratio of about 1.6 times or more while making the balance of aberration excellent, and is bright as the F value is from about 2.05 to 2.20 at the wide angle end, without using a plurality of aspheric lenses.

Further, if the conditional expressions are satisfied, the miniaturization is further promoted and various aberrations can be made more excellent.

Also, if the conditional expression (1) is satisfied, the entire lens system can be approximately regarded as a retro focus type two group zoom lens, whereby the system with a wide angle of view and a long back focus can be made.

Figure 1:
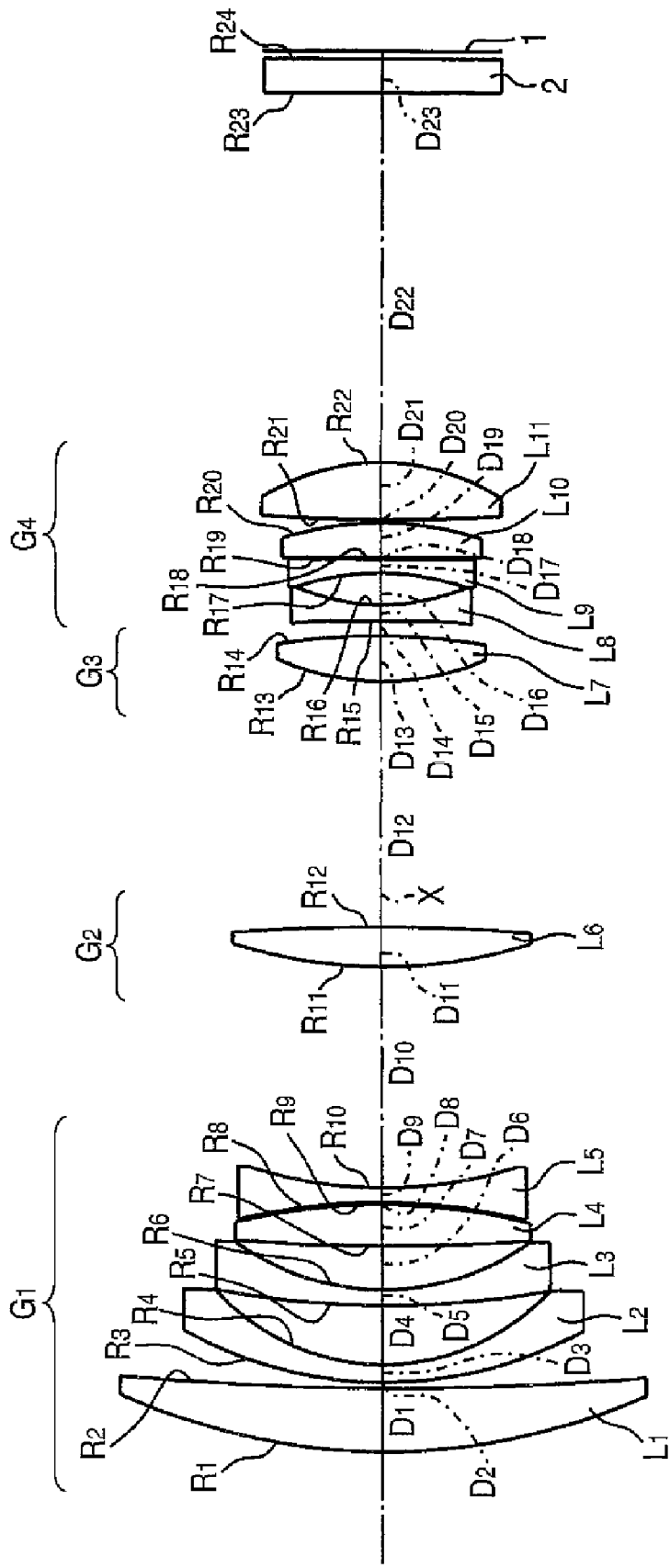
FIG. 1 is a schematic view showing the constitution of a zoom lens for projection according to an example 1 in an exemplary embodiment of the present invention.

An exemplary embodiment of the present invention will be described below with reference to the drawings. A zoom lens for projection according to an exemplary embodiment as shown in FIG. 1 (typically showing a state at a wide-angle end in an example 1) includes a first lens group $G_1$ having a negative refractive power, a second lens group $G_2$ having a positive refractive power, a third lens group $G_3$ having a positive refractive power, and a fourth lens group $G_4$ having a positive or negative refractive power in order from the magnification side. At variable power from a wide-angle end to a telephoto end, the second lens group $G_2$, the third lens group $G_3$ and the fourth lens group $G_4$ are moved to the magnification side. At its latter stage, a cover glass (filter part) 2 and a DMD 1 are disposed. In the figure, X denotes an optical axis.

Herein, the first lens group $G_1$ has a first lens $L_1$ of a positive lens, a second lens $L_2$ of a negative meniscus lens with a convex surface on the magnification side, a third lens $L_3$ of a negative lens, a fourth lens $L_4$ of a positive meniscus lens with a convex surface on the reduction side, and a fifth lens $L_5$ of a negative meniscus lens with a concave surface on the magnification side, which are disposed in order from the magnification side. The fourth lens $L_4$ and the fifth lens $L_5$ are disposed so that the opposed surfaces may be proximate (examples 1 to 4) or joined (examples 5 to 8). The degree of freedom in the lens design is increased if the lenses are mutually independent, and the optical adjustment (alignment adjustment) is facilitated if they are mutually joined, whereby it is appropriately selected according to the situation.

Also, the second lens group $G_2$ includes a sixth lens $L_6$ of a single positive lens. Also, the third lens group $G_3$ includes a seventh lens $L_7$ of a single positive lens.

Further, the fourth lens group $G_4$ includes an eighth lens $L_8$ of a negative lens with a concave surface on the reduction side, a ninth lens $L_9$ of a negative lens with a convex surface on the magnification side, a tenth lens $L_{10}$ and an eleventh lens $L_{11}$ each having a positive lens with a convex surface on the reduction side, in order from the magnification side. Particularly, since the eleventh lens $L_{11}$ is a positive lens with a convex surface on the reduction side, the reduction side of the system can be made compact.

The lens constitution of each lens group is not limited to the above organization, but one or more negative or positive lenses may be increased or decreased.

Among the above lenses, only the eighth lens $L_8$ is an aspheric lens, and all the other lenses are spherical lenses. Because two or more aspheric lenses are not used, the manufacturing cost is reduced. When one aspheric lens is used, it can be disposed in the final lens group (fourth lens group $G_4$), thereby making the aberration correction more efficient.

In this embodiment, the lens material is generally glass, but if various kinds of conditions such as heat resistance and temperature condition are adaptable, plastic may be used. Particularly, plastic for the aspheric lens is favorable in the respects of manufacturability and lower cost.

Herein, the aspheric surface in this embodiment can be represented by the following aspheric expression.

$$Z = \frac{Y^2/R}{1+\sqrt{1-K \times Y^2/R^2}} + \sum_{i=3}^{20} A_i Y^i$$

where Z is the length of the perpendicular line from a point on the aspheric surface distance Y off the optical axis to the tangential plane (plane perpendicular to the optical axis) at the aspheric vertex, Y is the distance off the optical axis, R is the radius of curvature for the aspheric surface near the optical axis, K is the eccentricity, and $A_i$ is the aspheric coefficient (i=3 to 20).

Also, when the zoom lens for projection according to this embodiment transfers from the wide-angle side to the telephoto side at variable power (i.e., when the zoom lens varies a power thereof), the second lens group $G_2$, the third lens group $G_3$ and the fourth lens group $G_4$ are moved to the magnification side, while the first lens group $G_1$ is slightly moved to the reduction side. At variable power, the first lens group $G_1$ may be fixed.

The zoom lens for projection according to this embodiment not only satisfies the conditional expression (1), but also satisfies the conditional expressions (2) and (3).

$$0.95 < frw/frt < 1.05 \quad (1)$$

$$|M4/f4| < |M1/f1| < |M2/f2| < |M3/f3| \quad (2)$$

$$0.4 < |M3/f3| < 0.8 \quad (3)$$

Where frw is a composite focal length at the wide-angle end of the second lens group $G_2$, the third lens group $G_3$ and the fourth lens group $G_4$, frt is a composite focal length at the telephoto end of the second lens group $G_2$, the third lens group $G_3$ and the fourth lens group $G_4$, Mn is a travel distance of the nth lens group between the wide-angle end position and the telephoto end position, and fn is a focal length of the nth lens group.

Instead of the above conditional expressions (2) and (3), the following conditional expressions (4) and (5) may be satisfied.

$$|M4/f4| < |M2/f2| < |M1/f1| < |M3/f3| \quad (4)$$

$$0.2 < |M3/f3| < 0.6 \quad (5)$$

Where Mn is the travel distance of the nth lens group between the wide-angle end position and the telephoto end position, and fn is the focal length of the nth lens group.

In the fourth lens group $G_4$, the refractive index Nd, at the d-line, of an optical material making up the lens having the strongest negative refractive index satisfies the following conditional expression (6).

$$Nd > 1.75 \quad (6)$$

Herein, a technological meaning of the above conditional expressions (1) to (6) will be described below.

The conditional expressions (1) to (5) appropriately set up the sharing of variable power among the lens groups at variable power.

If the above conditional expression (1) is satisfied, the entire lens system can be approximately regarded as a retro focus type two group zoom lens, considering that the first lens group $G_1$ is a front group, and the second lens group $G_2$, the third lens group $G_3$ and the fourth lens group $G_4$ are collectively a back group.

In this manner, it is possible to meet a request for the wide-angle of view and long back focus with the constitution of the type approximate to the retro focus type two group zoom lens.

On the other hand, in the case of the constitution of the type approximate to the retro focus type two group zoom lens in this manner, if the brighter lens system is configured by making the F value smaller, the lens outer diameter of the back group tends to be larger, increasing the size of the lens system.

Thus, if the above conditional expressions (2) and (3) or (4) and (5) are satisfied, and the sharing of the refractive power among the lenses making up the second lens group $G_2$ and the third lens group $G_3$ to be moved at variable power is adjusted appropriately, the lens system can be constructed in a practical compact size while achieving the brightness of about F2.05 to 2.20 at the wide-angle end.

Accordingly, it is preferable that all of the conditional expressions (1), (2) and (3) or the conditional expressions (1), (4) and (5) are satisfied in achieving the effect of making the brighter lens system, while correcting the aberration in line with the brightness and suppressing the larger size of the lens system.

Further, the conditional expression (6) stipulates the refractive index at the d-line of an optical material making up the lens (ninth lens $L_9$ in each example) having the strongest negative refractive power in the fourth lens group $G_4$, and the range for making the spherical aberration and chromatic aberration excellent. That is, below the lower limit of this conditional expression (6), it is difficult to correct the spherical aberration and chromatic aberration.

Figure 49:
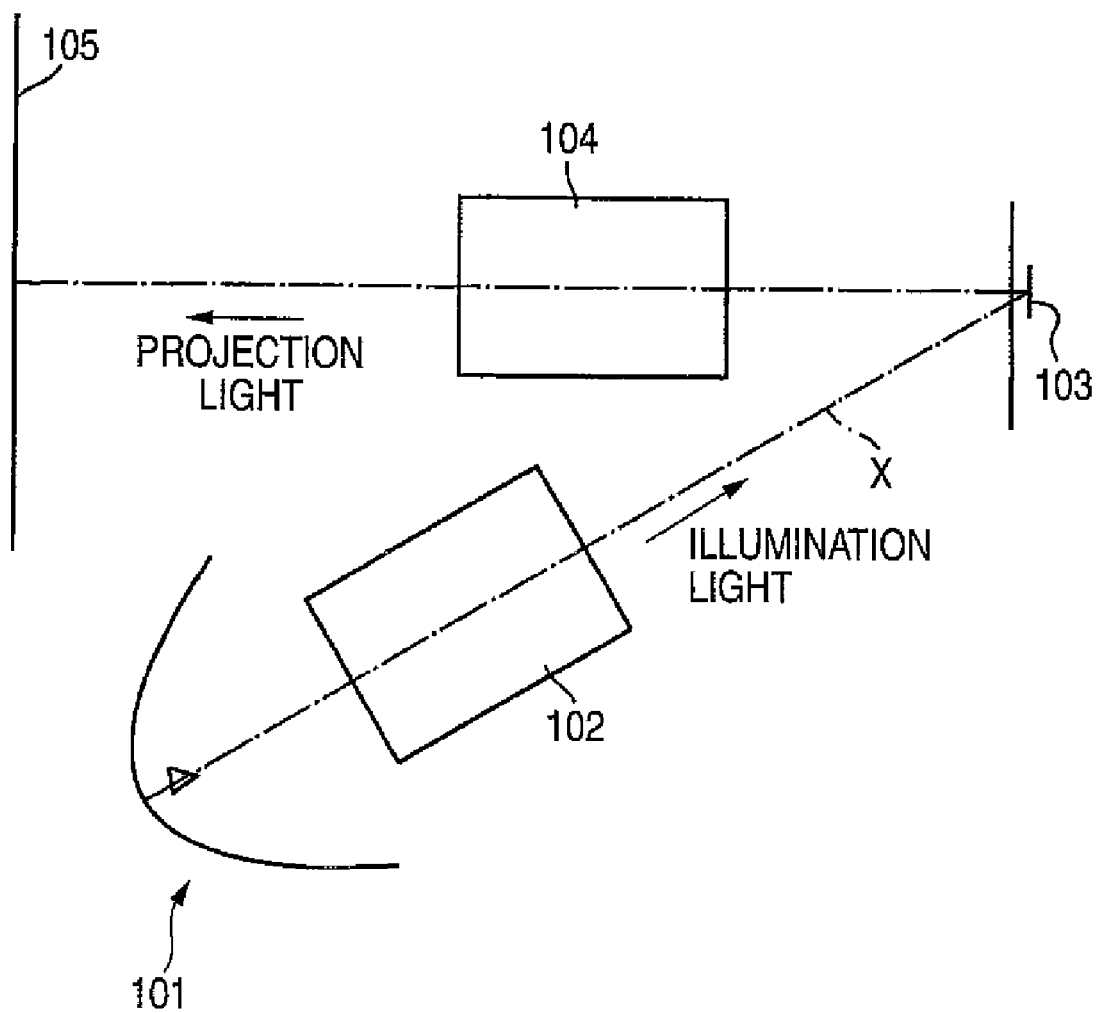
FIG. 49 is a schematic constitutional view of a projection display device according to one embodiment of the invention.

A projection display device according to an exemplary embodiment of the invention will be briefly described below. FIG. 49 is a schematic constitutional view of a projection display device according to this embodiment.

As shown in FIG. 49, a flux of light emitted from a light source 101 is passed through a rod integrator 102 for equalizing the light quantity distribution of flux of light over the cross section perpendicular to the optical axis, selectively converted in time series into three primary color lights (R,G,B) by a color wheel, not shown, and directed to a DMD 103. This DMD 103 switches to the modulation for color light in accordance with changing color of the incident light, whereby a projected light appropriately modulated by the DMD 103 is incident upon a zoom lens for projection 104, and finally arrives at a screen 105.

EXAMPLES

A zoom lens for projection according to an exemplary embodiment of the invention will be further described below using the specific examples.

Example 1

A schematic constitution of the zoom lens for projection (wide angle end) according to an example 1 is shown in FIG. 1. This zoom lens for projection includes a first lens group $G_1$ having a negative refractive power, a second lens group $G_2$ having a positive refractive power, a third lens group $G_3$ having a positive refractive power, and a fourth lens group $G_4$ having a positive or negative refractive power in order from the magnification side. At variable power from the wide-angle end to the telephoto end, the second lens group $G_2$, the third lens group $G_3$ and the fourth lens group $G_4$ are moved to the magnification side, and at its latter stage, a cover glass (filter part) 2 and a DMD 1 are disposed. In the figure, X denotes an optical axis.

Herein, the first lens group $G_1$ has a first lens $L_1$ of a positive meniscus lens with a convex surface on the magnification side, a second lens $L_2$ and a third lens $L_3$ each having a negative meniscus lens with a convex surface on the magnification side, a fourth lens $L_4$ of a biconvex lens and a fifth lens $L_5$ of a biconcave lens, which are disposed in order from the magnification side. The fourth lens $L_4$ and the fifth lens $L_5$ are disposed so that the opposed surfaces may be proximate to each other via a gap.

Table 1 shows the values of the zoom lens for projection, including the radius of curvature R (mm) of each lens surface, the central thickness of each lens, an air gap (hereinafter generically referred to as an on-axis surface spacing) D mm between each lens, the refractive index N of each lens at the d-line, and the Abbe number ν. The number in Table 1 indicates the order from the magnification side (same in the following Tables 3, 5, 7, 9, 11, 13 and 15). In the upper stage of Table 1, the focal length f (mm), the back focus Bfw (mm), FNo, and the angle of view 2ω (degree) are shown (same in the following Tables 3, 5, 7, 9, 11, 13 and 15).

In Table 1, of three numerical values as described stepwise, the numerical value at left end indicates the value at the wide-angle end, the numerical value in the middle indicates the value at the middle position, and the numerical value at right end indicates the value at the telephoto end (same in the following Tables 3, 5, 7, 9, 11, 13 and 15).

Also, the faces (fifteenth face and sixteenth face) of the eighth lens $L_8$ are aspheric. Table 2 shows the constant K and the values of $A_3$ to $A_{20}$ in the above aspheric expression for each aspheric face.

TABLE 1 f = 16.76~21.17~26.72
Bfw = 36.01
FNo = 2.20~2.48~2.81
2ω = 67.2°~55.2°~44.8°

| Surface Number | R | D | $N_d$ | $v_d$ |
|---|---|---|---|---|
| 1 | 57.768 | 5.75 | 1.51680 | 64.2 |
| 2 | 279.923 | 0.50 | | |
| 3 | 37.258 | 1.60 | 1.72916 | 54.7 |
| 4 | 20.522 | 5.38 | | |
| 5 | 86.667 | 1.40 | 1.83400 | 37.2 |
| 6 | 23.161 | 3.96 | | |
| 7 | 192.598 | 3.76 | 1.84666 | 23.8 |
| 8 | −55.214 | 0.20 | | |
| 9 | −54.758 | 1.30 | 1.67790 | 55.3 |
| 10 | 40.714 | 20.08~9.77~2.25 | | |
| 11 | 46.269 | 3.64 | 1.60562 | 43.7 |
| 12 | −161.878 | 22.29~23.11~22.23 | | |
| 13 | 24.141 | 4.16 | 1.67790 | 50.7 |
| 14 | −57.971 | 1.31~2.20~3.53 | | |
| 15* | 263.912 | 1.50 | 1.68893 | 31.1 |
| 16* | 18.486 | 2.94 | | |
| 17 | −24.482 | 1.20 | 1.80518 | 25.4 |
| 18 | 1368.571 | 0.15 | | |
| 19 | 1886.868 | 3.19 | 1.56384 | 60.7 |
| 20 | −30.448 | 0.33 | | |
| 21 | 209.015 | 5.18 | 1.63930 | 44.9 |
| 22 | −20.541 | 33.50~39.18~45.56 | | |
| 23 | ∞ | 3.00 | 1.48749 | 70.2 |
| 24 | ∞ | | | |

*Aspheric surface

TABLE 2

| | Surface Number | |
|---|---|---|
| | 15 | 16 |
| K | 0.0000000 | 0.0000000 |
| $A_3$ | −1.0471568 × 10$^{-4}$ | −7.5836214 × 10$^{-5}$ |
| $A_4$ | −4.3620137 × 10$^{-5}$ | 5.1552071 × 10$^{-6}$ |
| $A_5$ | −3.5084393 × 10$^{-6}$ | −2.6776992 × 10$^{-6}$ |
| $A_6$ | −8.9583417 × 10$^{-8}$ | 8.4726801 × 10$^{-9}$ |
| $A_7$ | 7.6117760 × 10$^{-9}$ | 1.2869468 × 10$^{-8}$ |
| $A_8$ | 1.2664597 × 10$^{-9}$ | 1.0715066 × 10$^{-9}$ |
| $A_9$ | 1.2929374 × 10$^{-10}$ | −1.2245440 × 10$^{-11}$ |
| $A_{10}$ | 1.0846301 × 10$^{-11}$ | −1.4783182 × 10$^{-11}$ |
| $A_{11}$ | 5.0629956 × 10$^{-13}$ | −2.2041223 × 10$^{-12}$ |
| $A_{12}$ | −6.3586240 × 10$^{-14}$ | −1.3456856 × 10$^{-13}$ |
| $A_{13}$ | −2.1857224 × 10$^{-14}$ | 1.7775463 × 10$^{-14}$ |
| $A_{14}$ | −3.3387951 × 10$^{-15}$ | 6.7404111 × 10$^{-15}$ |
| $A_{15}$ | −2.5030973 × 10$^{-16}$ | 4.9499512 × 10$^{-16}$ |
| $A_{16}$ | −1.7200227 × 10$^{-17}$ | −1.0245881 × 10$^{-16}$ |
| $A_{17}$ | 8.8322444 × 10$^{-18}$ | −9.0115329 × 10$^{-19}$ |
| $A_{18}$ | 2.0826063 × 10$^{-21}$ | −8.7157272 × 10$^{-33}$ |
| $A_{19}$ | 2.4986267 × 10$^{-37}$ | −7.3577881 × 10$^{-38}$ |
| $A_{20}$ | 3.9921875 × 10$^{-38}$ | −1.0839844 × 10$^{-38}$ |

With the zoom lens for projection according to the example 1, all of the conditional expressions (1) to (3) and (6) are satisfied, as shown in Table 1 and Table 17 (refractive index $Nd_9$ of glass material of the ninth lens $L_9$ having the strongest negative power in the fourth lens group $G_4$,=1.805).

Figure 2:
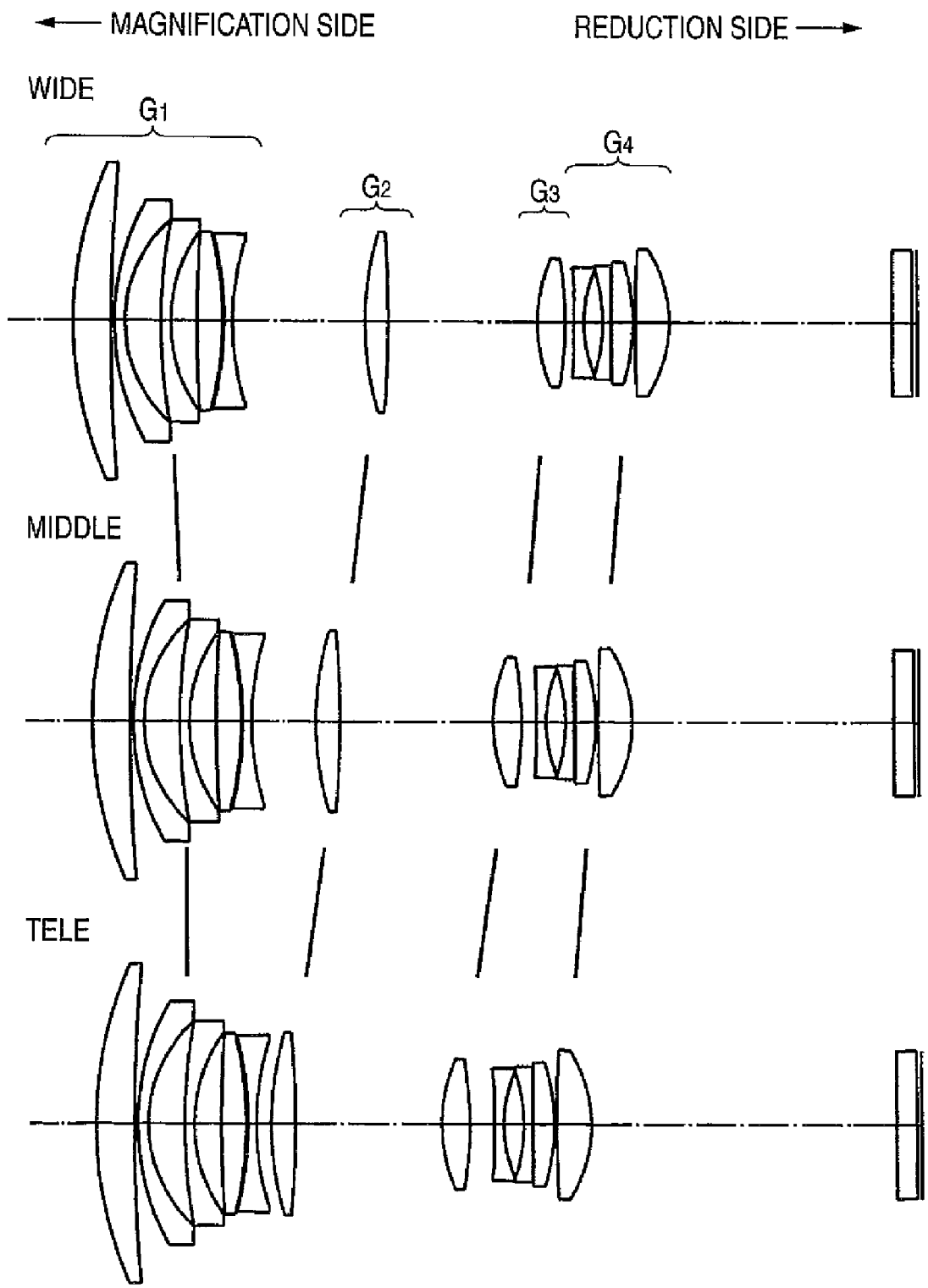
FIG. 2 is a schematic view showing the lens movement loci at variable power in the zoom lens for projection according to the example 1.

FIG. 2 shows the lens movement loci at variable power in the zoom lens for projection according to the example 1.

Figure 11:
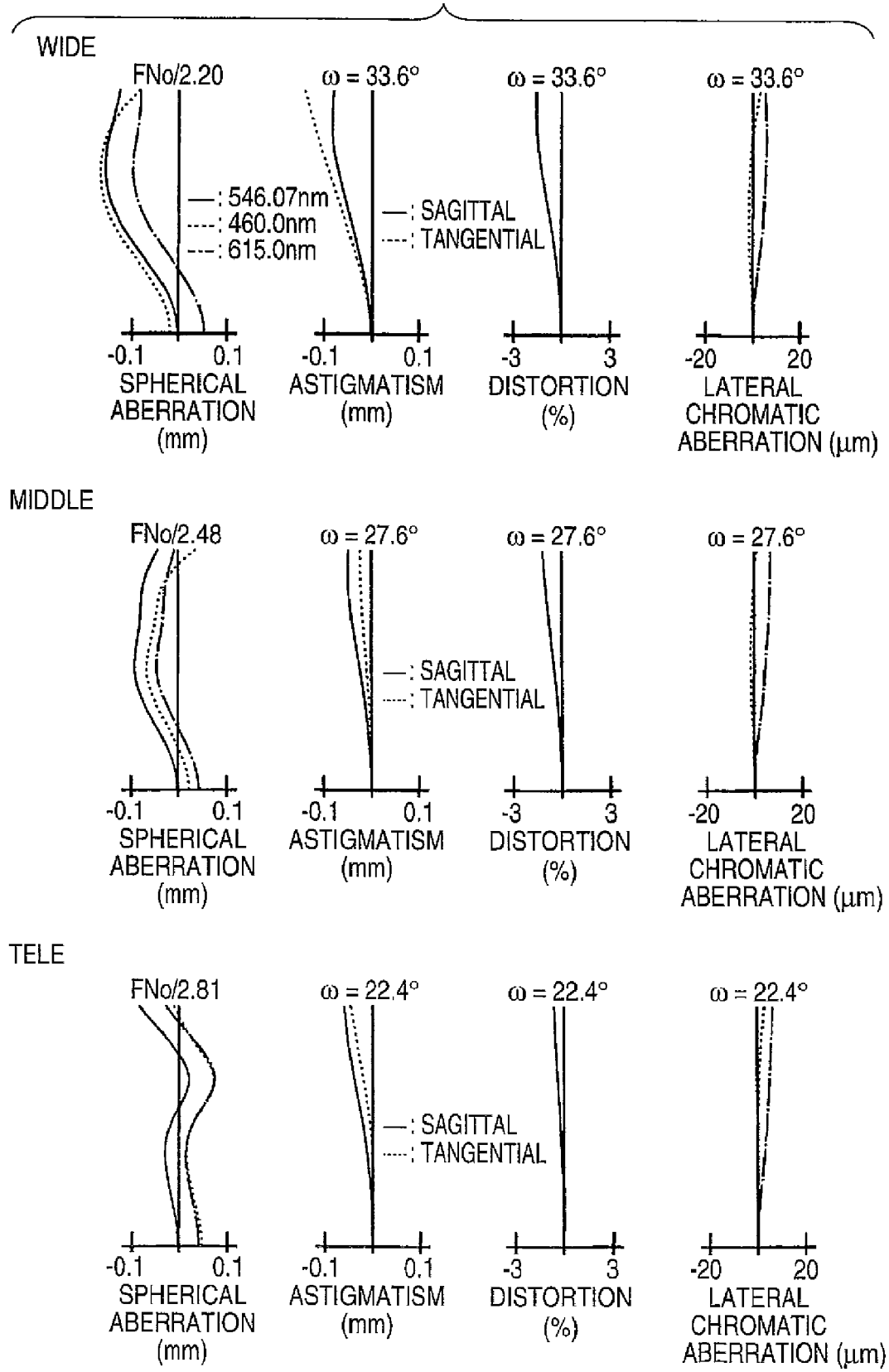
FIG. 11 is an aberration view showing various aberrations (spherical aberration, astigmatism, distortion and lateral chromatic aberration) of the zoom lens for projection according to the example 1.
Figure 12:
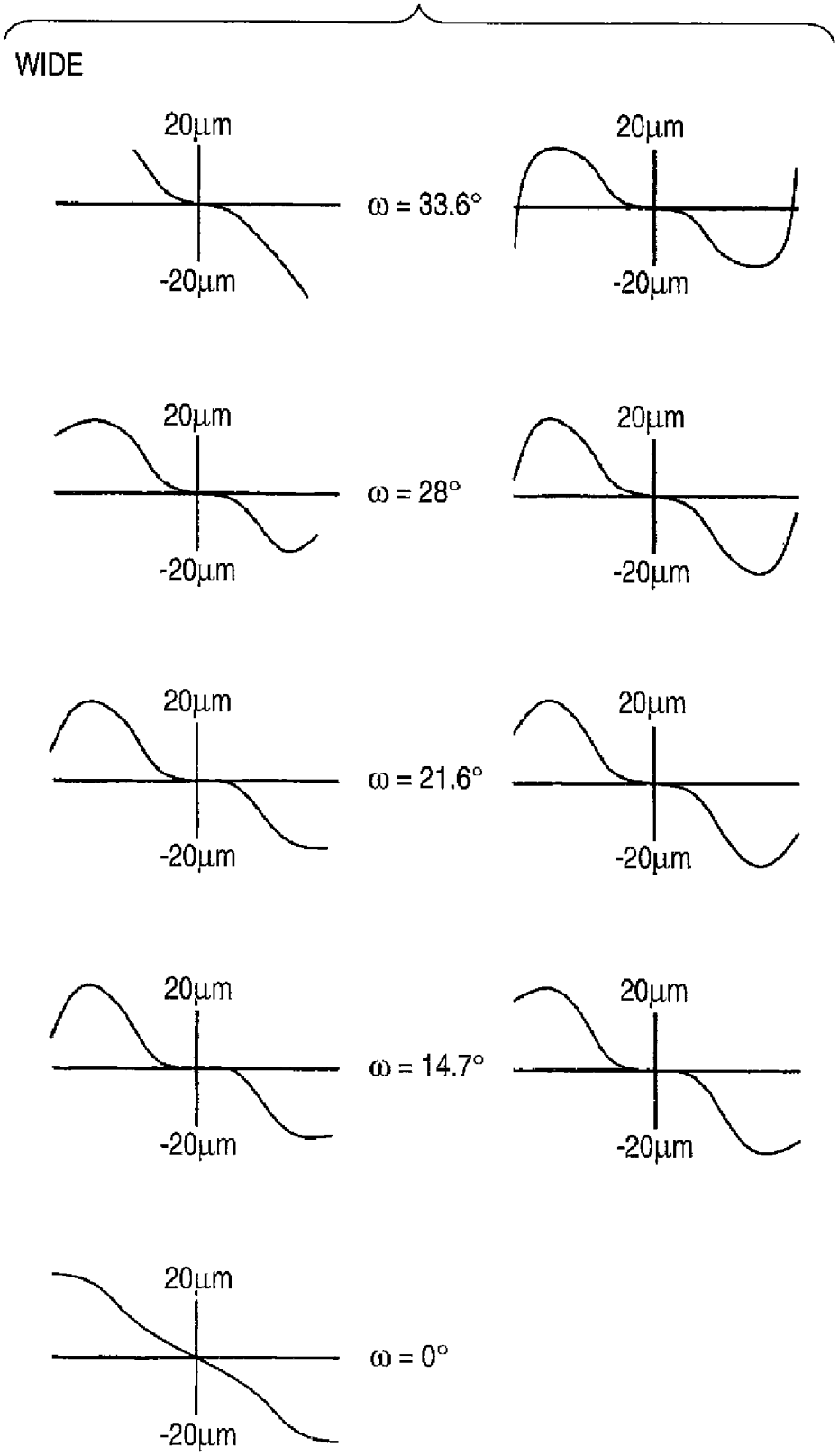
FIG. 12 is an aberration view showing the lateral aberration at the wide-angle end of the zoom lens for projection according to the example 1.
Figure 13:
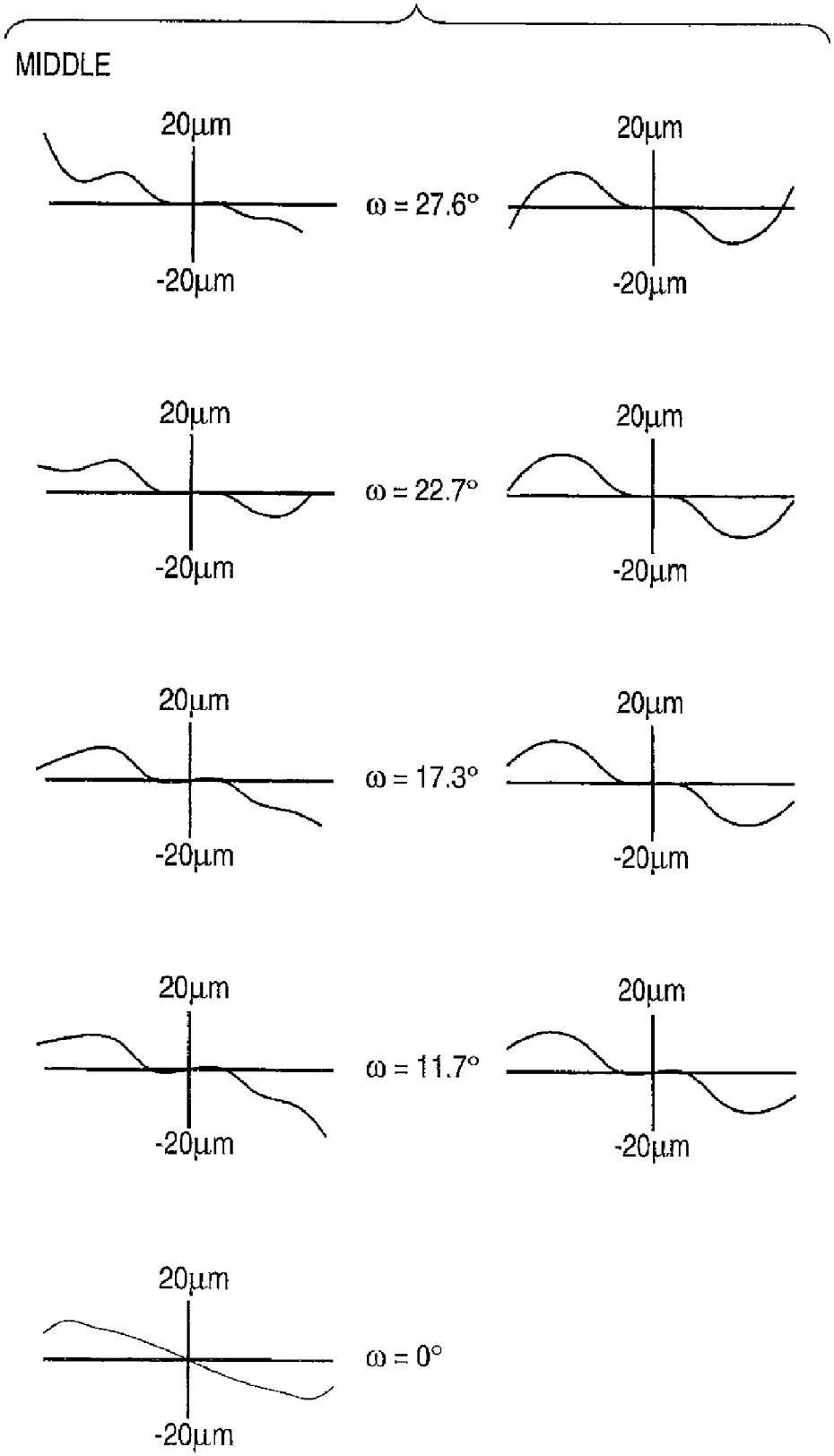
FIG. 13 is an aberration view showing the lateral aberration at the middle position of the zoom lens for projection according to the example 1.
Figure 14:
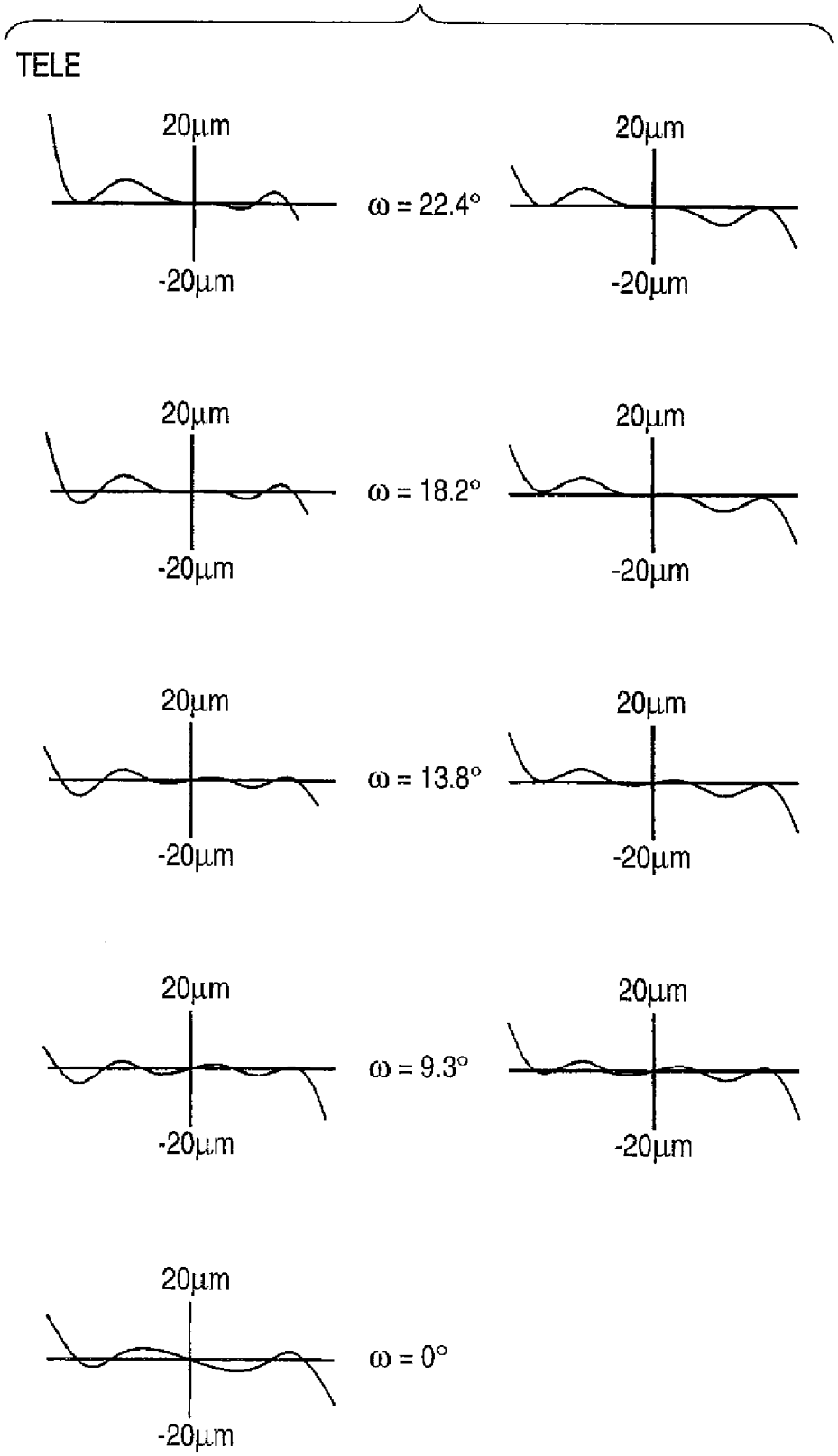
FIG. 14 is an aberration view showing the lateral aberration at the telephoto end of the zoom lens for projection according to the example 1.

FIG. 11 is an aberration view showing the spherical aberration, astigmatism, distortion and lateral chromatic aberration at the wide-angle end, the middle position and the telephoto end in the zoom lens for projection according to the example 1. FIGS. 12, 13 and 14 are the lateral aberration views at the wide-angle end, the middle position and the telephoto end for the light having a wavelength of 546.07 nm. In an astigmatism view, the aberrations for sagittal image surface and tangential image surface are shown (same in the following Tables 15, 19, 23, 27, 37, 41 and 45).

As will be clear from these aberration views, with the zoom lens for projection according to the example 1, each aberration can be corrected extremely excellently.

Also, with the zoom lens for projection according to the example 1, the optical performance is excellent, and the variable power ratio can be 1.59 times or more, or near 1.6 times. Also, the angle of view 2ω at wide-angle end can be as large as 67.2 degrees.

Example 2

Figure 3:
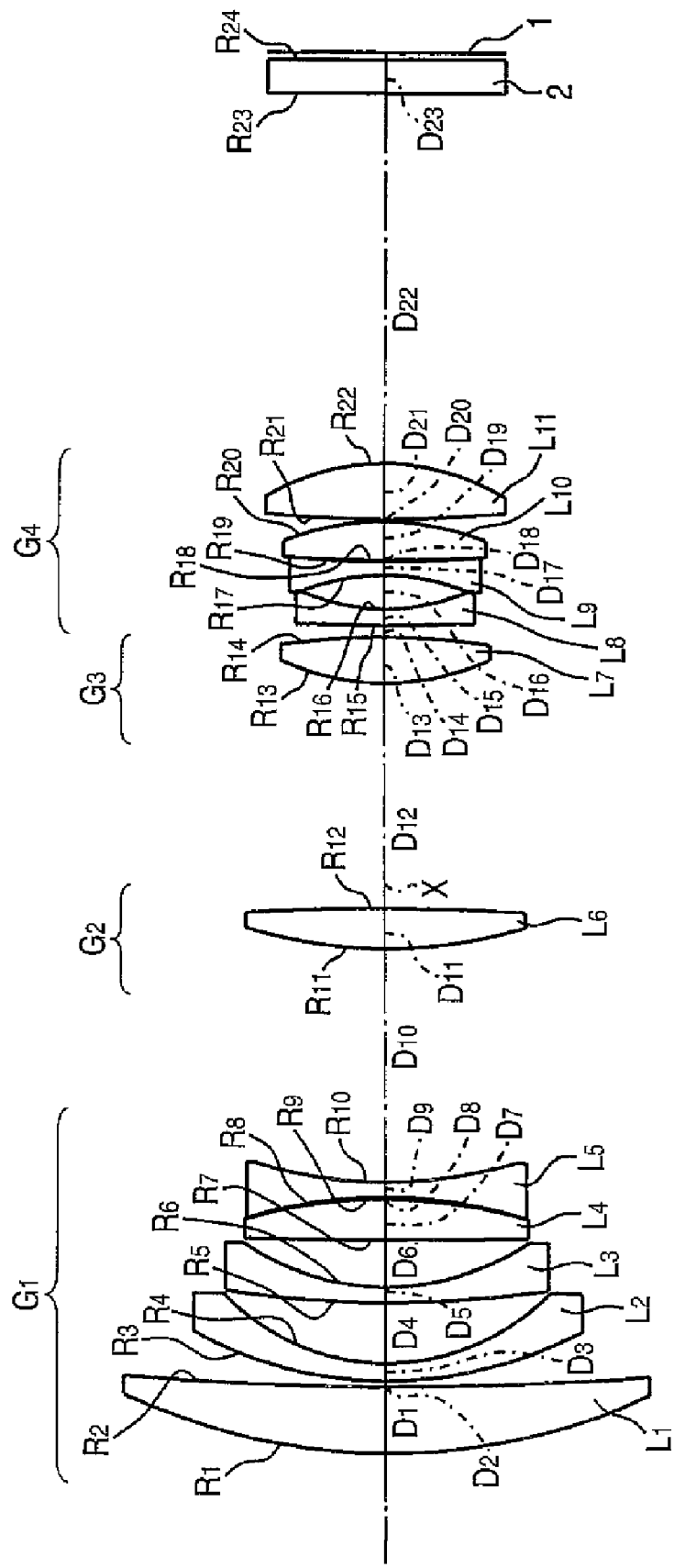
FIG. 3 is a schematic view showing the constitution of a zoom lens for projection according to an example 2 in an exemplary embodiment of the present invention.

A schematic constitution of the zoom lens for projection according to an example 2 is shown in FIG. 3. The lens constitution of the zoom lens for projection according to the example 2 is almost the same as the example 1, and the duplicate explanation is omitted.

Table 3 shows the values of the zoom lens for projection, including the radius of curvature R (mm) of each lens face, the on-axis surface spacing D (mm) of each lens, the refractive index N of each lens at the d-line, and the Abbe number ν.

Also, the faces (fifteenth face and sixteenth face) of the eighth lens $L_8$ are aspheric. Table 4 shows the constant K and the values of $A_3$ to $A_{20}$ in the above aspheric expression for each aspheric surface.

TABLE 3 f = 16.75~21.17~26.72
Bfw = 36.01
FNo = 2.20~2.50~2.85
2ω = 67.0°~55.2°~44.8°

| Surface Number | R | D | $N_d$ | $v_d$ |
|---|---|---|---|---|
| 1 | 55.736 | 6.03 | 1.51680 | 64.2 |
| 2 | 295.794 | 0.50 | | |
| 3 | 36.714 | 1.61 | 1.77250 | 49.6 |
| 4 | 20.487 | 5.48 | | |
| 5 | 96.694 | 1.40 | 1.83400 | 37.2 |
| 6 | 23.019 | 4.28 | | |
| 7 | 685.397 | 3.68 | 1.84666 | 23.8 |
| 8 | −47.457 | 0.20 | | |
| 9 | −43.752 | 1.30 | 1.56384 | 60.7 |
| 10 | 41.087 | 21.14~10.85~3.49 | | |
| 11 | 43.375 | 3.69 | 1.60342 | 38.0 |
| 12 | −196.323 | 20.53~21.57~20.31 | | |
| 13 | 22.937 | 4.25 | 1.61272 | 58.7 |
| 14 | −61.417 | 1.03~2.08~3.62 | | |
| 15* | 74.827 | 1.50 | 1.68893 | 31.1 |
| 16* | 18.180 | 3.09 | | |
| 17 | −21.254 | 1.20 | 1.80518 | 25.4 |
| 18 | 100.782 | 0.15 | | |
| 19 | 170.615 | 3.49 | 1.58913 | 61.2 |

TABLE 3-continued f = 16.75~21.17~26.72
Bfw = 36.01
FNo = 2.20~2.50~2.85
2ω = 67.0°~55.2°~44.8°

| Surface Number | R | D | $N_d$ | $v_d$ |
|---|---|---|---|---|
| 20 | −25.579 | 0.20 | | |
| 21 | 112.014 | 5.06 | 1.62004 | 36.3 |
| 22 | −21.468 | 33.50~38.86~44.80 | | |
| 23 | ∞ | 3.00 | 1.48749 | 70.2 |
| 24 | ∞ | | | |

*Aspheric surface

TABLE 4

| | Surface Number | |
|---|---|---|
| | 15 | 16 |
| K | 0.0000000 | 0.0000000 |
| $A_3$ | −7.9591626 × 10$^{-5}$ | −3.9701683 × 10$^{-5}$ |
| $A_4$ | −3.9515490 × 10$^{-5}$ | 8.4130783 × 10$^{-7}$ |
| $A_5$ | −3.4244703 × 10$^{-6}$ | −2.6608757 × 10$^{-6}$ |
| $A_6$ | −9.4250262 × 10$^{-8}$ | 2.1560723 × 10$^{-8}$ |
| $A_7$ | 6.1440593 × 10$^{-9}$ | 1.3872093 × 10$^{-8}$ |
| $A_8$ | 1.0645256 × 10$^{-9}$ | 1.0766851 × 10$^{-9}$ |
| $A_9$ | 1.1050783 × 10$^{-10}$ | −2.5105616 × 10$^{-11}$ |
| $A_{10}$ | 9.7472559 × 10$^{-12}$ | −1.7479264 × 10$^{-11}$ |
| $A_{11}$ | 5.0631064 × 10$^{-13}$ | −2.5756205 × 10$^{-12}$ |
| $A_{12}$ | −5.4447386 × 10$^{-14}$ | −1.7364162 × 10$^{-13}$ |
| $A_{13}$ | −2.0833345 × 10$^{-14}$ | 1.4328772 × 10$^{-14}$ |
| $A_{14}$ | −3.3494952 × 10$^{-15}$ | 6.5005510 × 10$^{-15}$ |
| $A_{15}$ | −2.3822591 × 10$^{-16}$ | 7.8565064 × 10$^{-16}$ |
| $A_{16}$ | −2.8085182 × 10$^{-17}$ | −1.1350333 × 10$^{-16}$ |
| $A_{17}$ | 1.0107697 × 10$^{-17}$ | −1.1529447 × 10$^{-18}$ |
| $A_{18}$ | 2.0826063 × 10$^{-21}$ | −8.7157272 × 10$^{-33}$ |
| $A_{19}$ | 2.4986267 × 10$^{-37}$ | −7.3608398 × 10$^{-38}$ |
| $A_{20}$ | 3.9921875 × 10$^{-38}$ | −1.0839844 × 10$^{-38}$ |

Also, with the zoom lens for projection according to the example 2, all of the conditional expressions (1) to (3) and (6) are satisfied, as shown in Table 3 and Table 17 (refractive index $Nd_9$ of glass material of the ninth lens $L_9$ having the strongest negative power in the fourth lens group $G_4$,=1.805).

Figure 4:
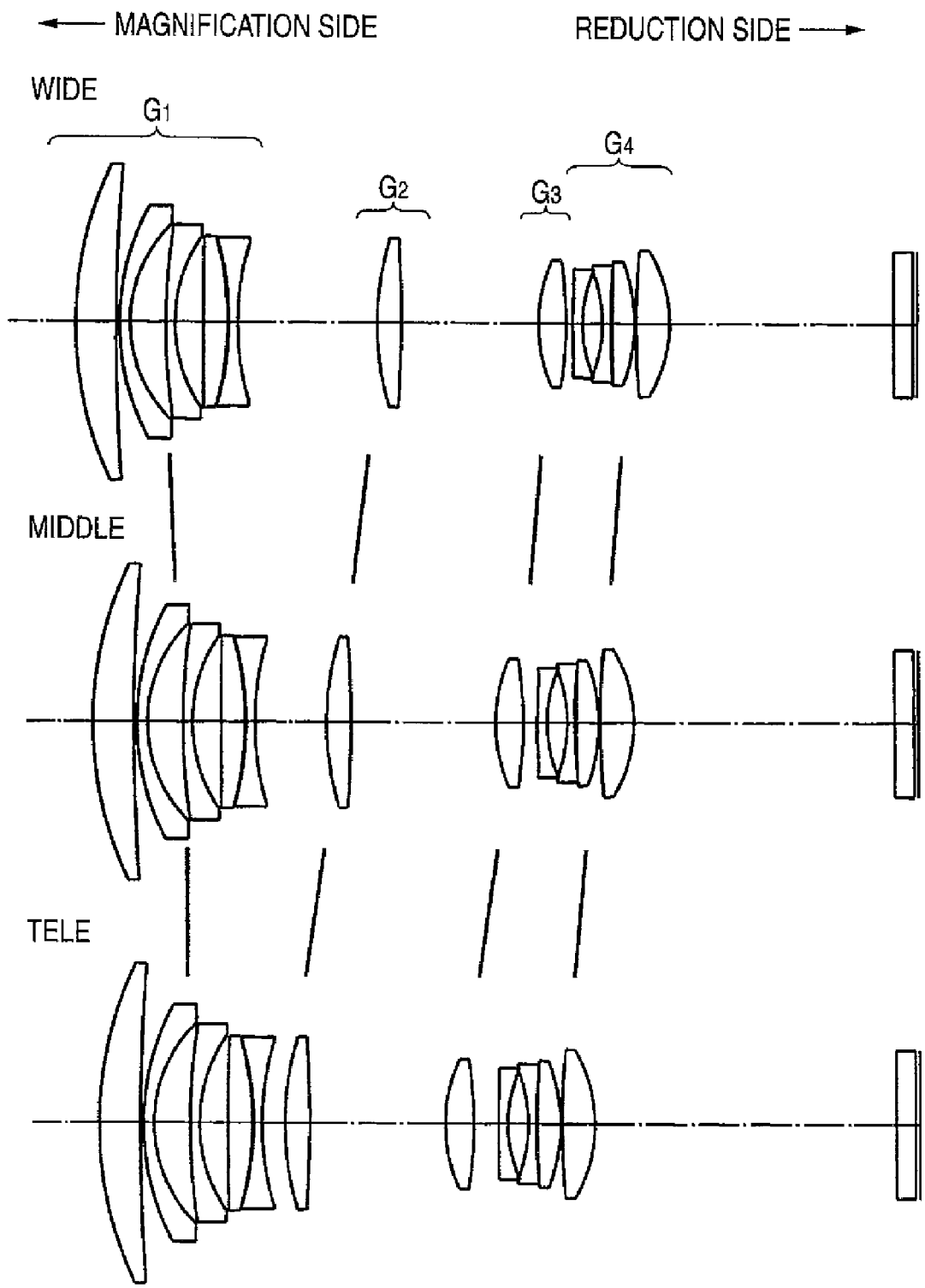
FIG. 4 is a schematic view showing the lens movement loci at variable power in the zoom lens for projection according to the example 2.

FIG. 4 shows the lens movement loci at variable power in the zoom lens for projection according to the example 2.

Figure 15:
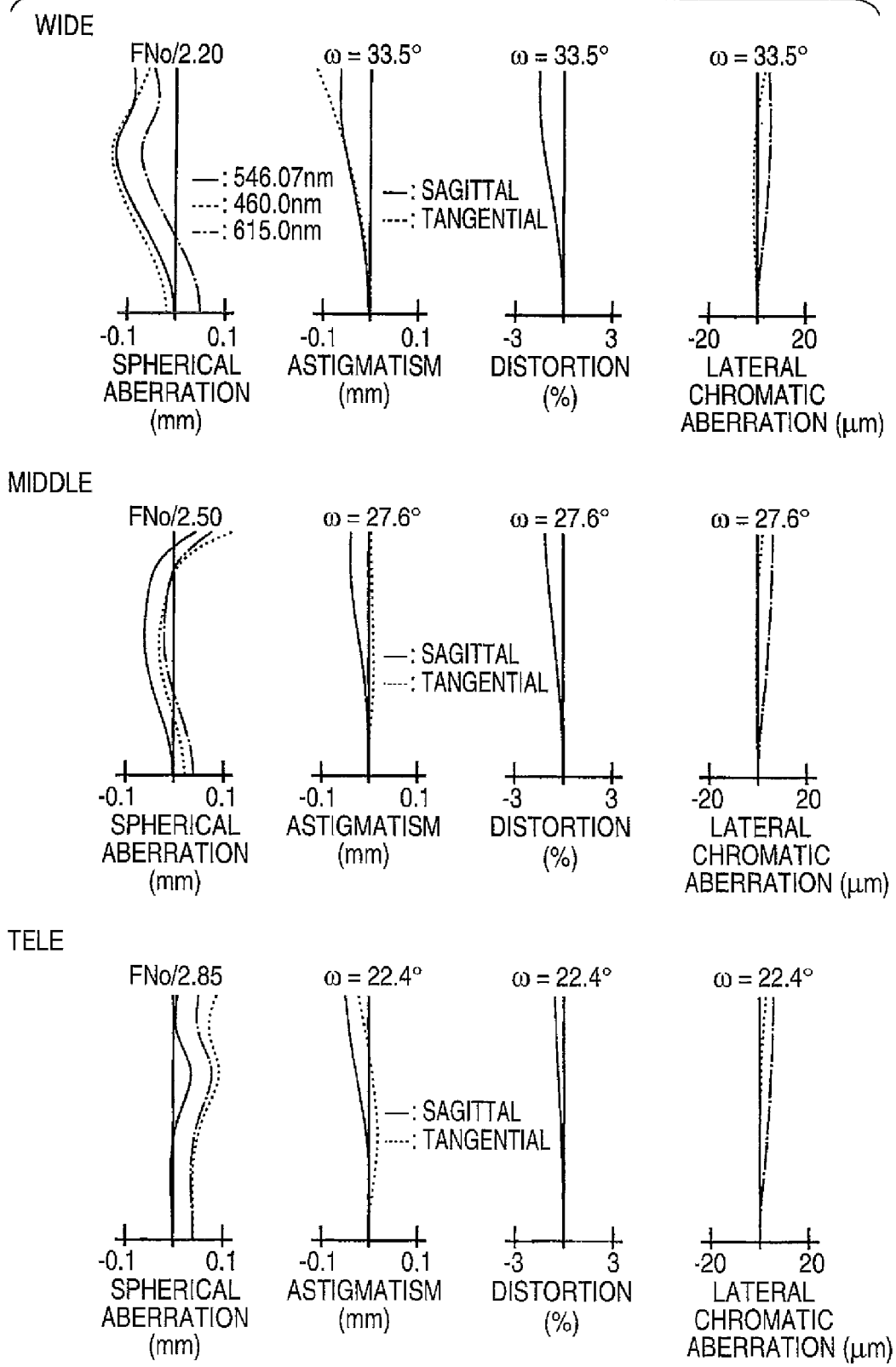
FIG. 15 is an aberration view showing various aberrations (spherical aberration, astigmatism, distortion and lateral chromatic aberration) of the zoom lens for projection according to the example 2.
Figure 16:
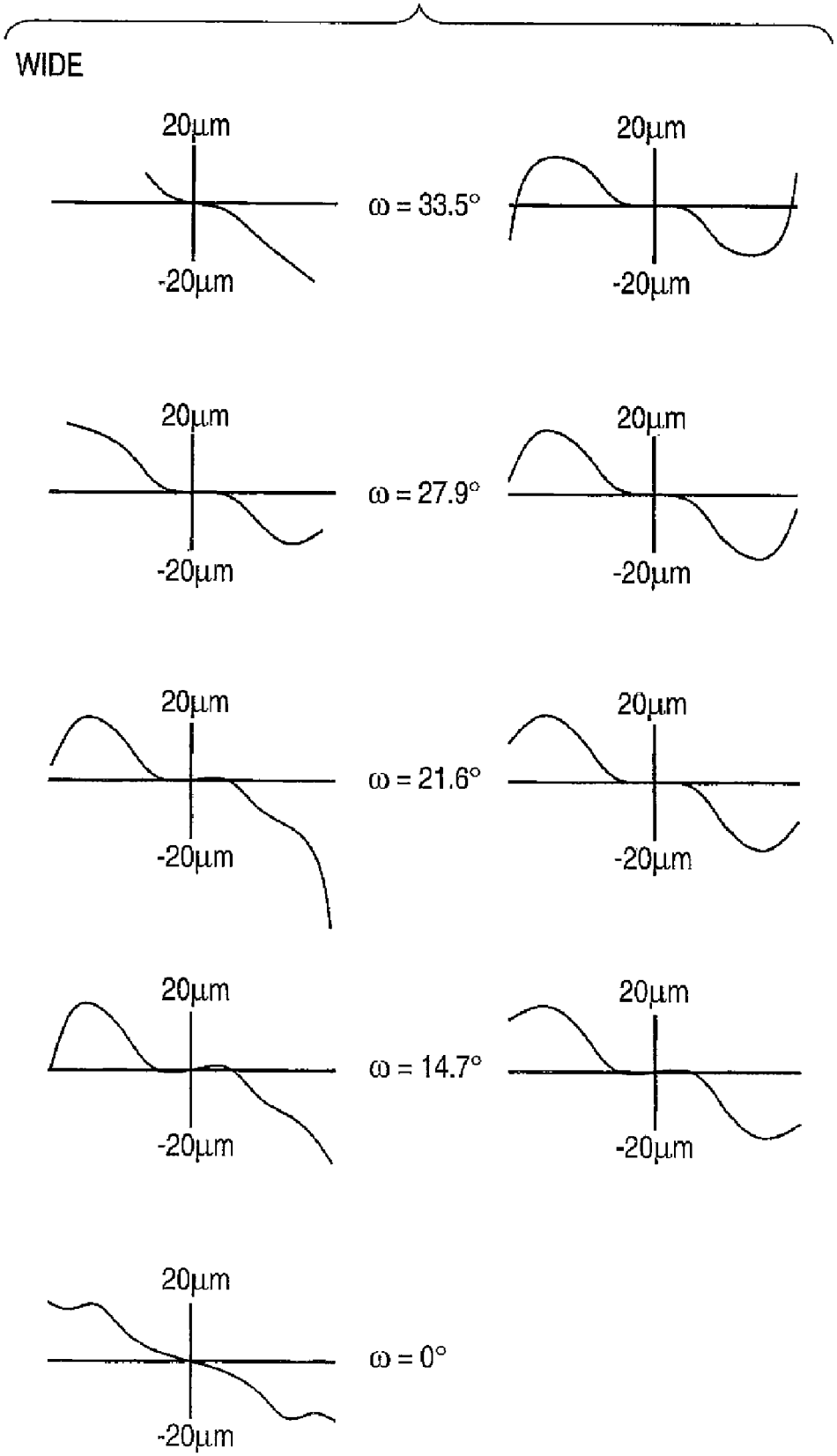
FIG. 16 is an aberration view showing the lateral aberration at the wide-angle end of the zoom lens for projection according to the example 2.
Figure 17:
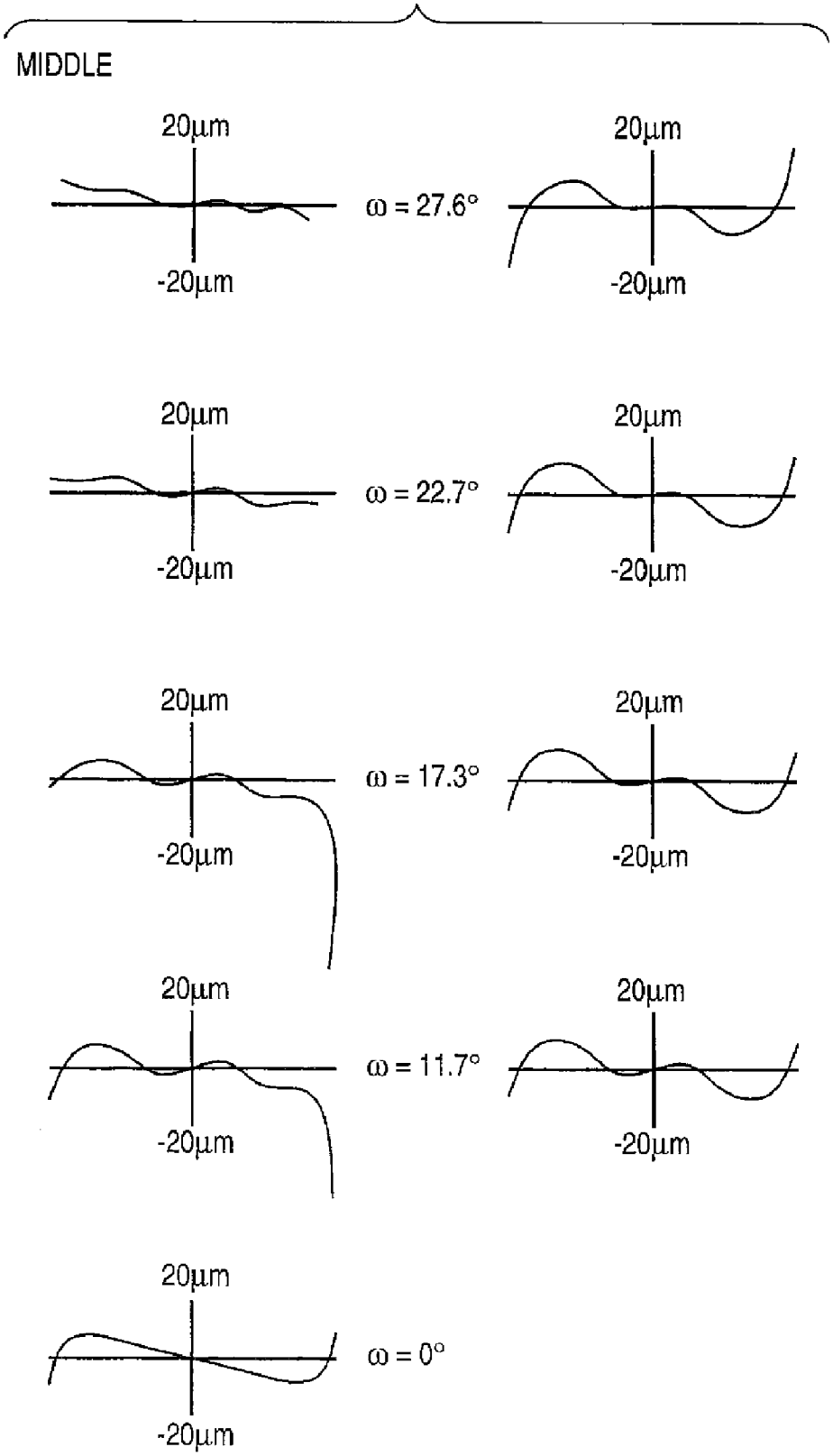
FIG. 17 is an aberration view showing the lateral aberration at the middle position of the zoom lens for projection according to the example 2.
Figure 18:
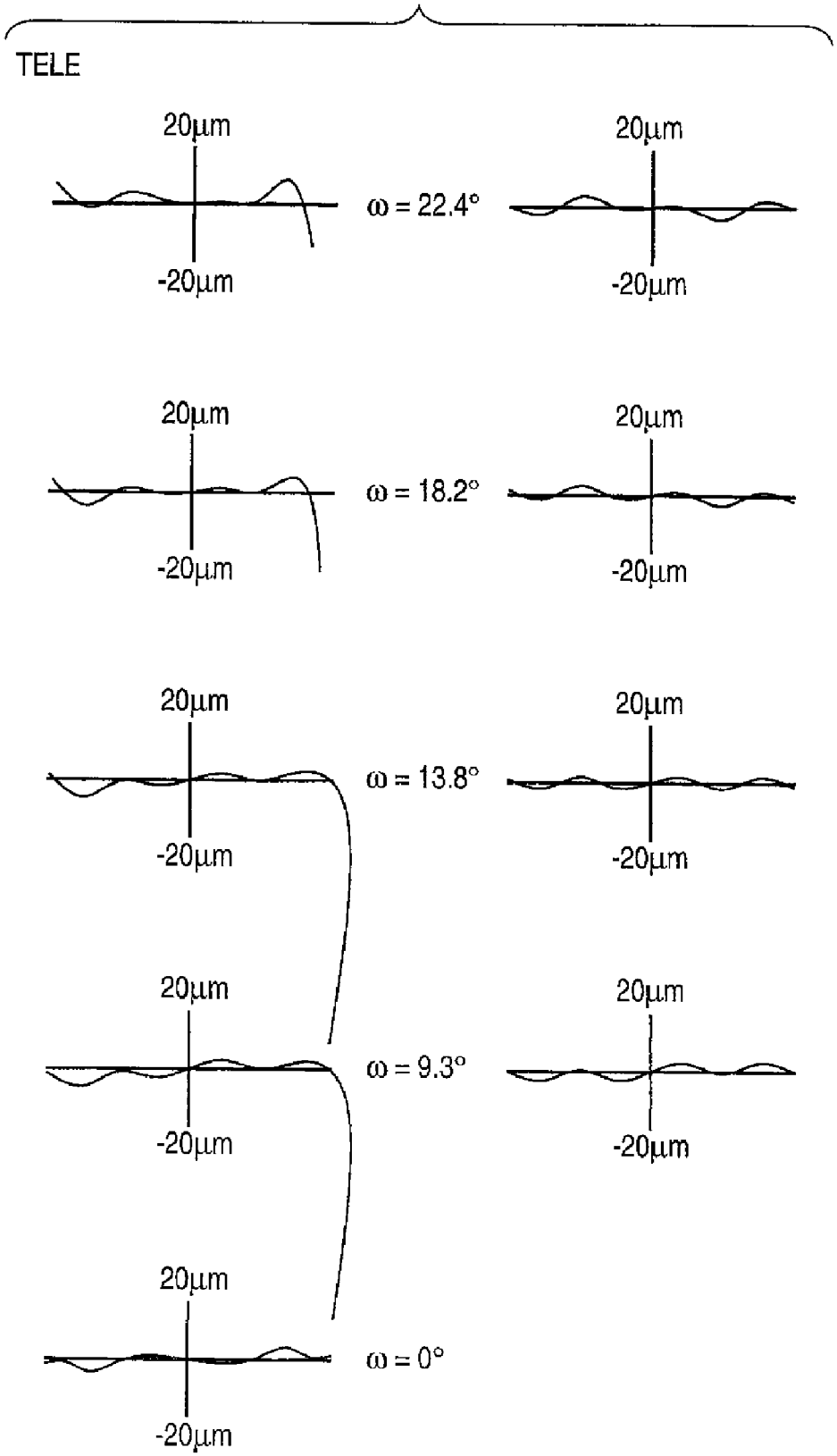
FIG. 18 is an aberration view showing the lateral aberration at the telephoto end of the zoom lens for projection according to the example 2.

Further, FIG. 15 is an aberration view showing the spherical aberration, astigmatism, distortion and lateral chromatic aberration at the wide-angle end, the middle position and the telephoto end in the zoom lens for projection according to the example 2. FIGS. 16, 17 and 18 are the lateral aberration views at the wide-angle end, the middle position and the telephoto end for the light having a wavelength of 546.07 nm.

As will be clear from these aberration views, with the zoom lens for projection according to the example 2, each aberration can be corrected extremely excellently.

Also, with the zoom lens for projection according to the example 2, the optical performance is excellent, and the variable power ratio can be 1.59 times or more, or near 1.6 times. Also, the angle of view 2ω at the wide-angle end can be as large as 67.0 degrees.

Example 3

Figure 5:
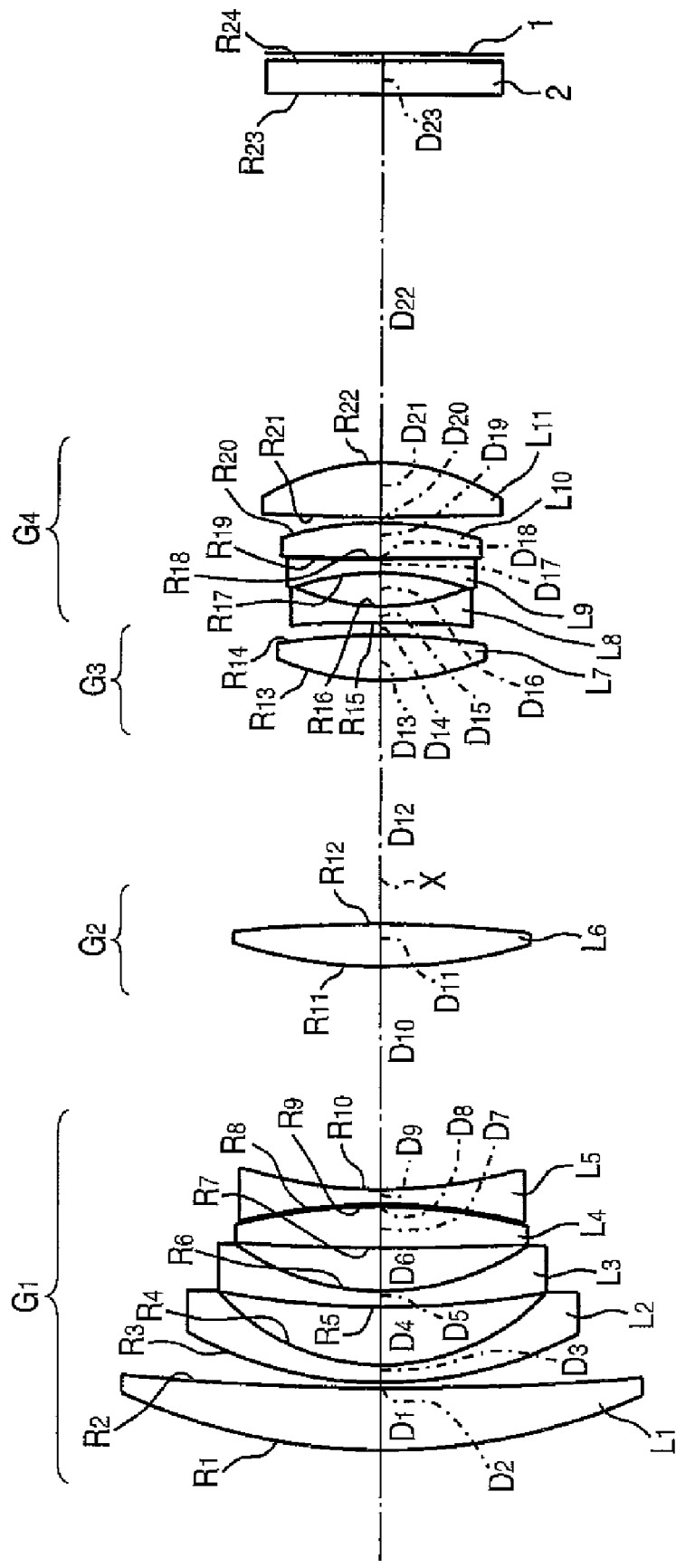
FIG. 5 is a schematic view showing the constitution of a zoom lens for projection according to an example 3 in an exemplary embodiment of the present invention.

A schematic constitution of the zoom lens for projection according to an example 3 is shown in FIG. 5. The lens constitution of the zoom lens for projection according to the example 3 is almost the same as the example 1, and the duplicate explanation is omitted.

Table 5 shows the values of the zoom lens for projection, including the radius of curvature R (mm) of each lens face, the on-axis surface spacing D (mm) of each lens, the refractive index N of each lens at the d-line, and the Abbe number ν.

Also, the faces (fifteenth face and sixteenth face) of the eighth lens $L_8$ are aspheric. Table 6 shows the constant K and the values of $A_3$ to $A_{20}$ in the above aspheric expression for each aspheric surface.

TABLE 5 f = 16.75~21.16~26.72
Bfw = 36.01
FNo = 2.20~2.49~2.82
2ω = 67.2°~55.2°~44.8°

| Surface Number | R | D | $N_d$ | $v_d$ |
|---|---|---|---|---|
| 1 | 58.242 | 5.60 | 1.51680 | 64.2 |
| 2 | 261.274 | 0.50 | | |
| 3 | 37.478 | 1.61 | 1.75500 | 52.3 |
| 4 | 20.346 | 5.25 | | |
| 5 | 83.631 | 1.40 | 1.83400 | 37.2 |
| 6 | 23.466 | 3.89 | | |
| 7 | 217.203 | 3.74 | 1.84666 | 23.8 |
| 8 | −53.120 | 0.22 | | |
| 9 | −52.760 | 1.30 | 1.67790 | 55.3 |
| 10 | 43.290 | 20.40~9.91~2.01 | | |
| 11 | 44.643 | 3.92 | 1.54814 | 45.8 |
| 12 | −117.149 | 22.19~23.04~22.57 | | |
| 13 | 24.256 | 4.16 | 1.72000 | 46.0 |
| 14 | −56.377 | 1.10~1.82~2.93 | | |
| 15* | 433.084 | 1.50 | 1.68893 | 31.1 |
| 16* | 18.185 | 3.04 | | |
| 17 | −23.848 | 1.20 | 1.80518 | 25.4 |
| 18 | 204.612 | 0.15 | | |
| 19 | 376.565 | 3.21 | 1.58313 | 59.4 |
| 20 | −29.925 | 0.53 | | |
| 21 | 244.913 | 4.98 | 1.63930 | 44.9 |
| 22 | −20.232 | 33.50~39.30~45.91 | | |
| 23 | ∞ | 3.00 | 1.48749 | 70.2 |
| 24 | ∞ | | | |

*Aspheric surface

TABLE 6

| | Surface Number | |
|---|---|---|
| | 15 | 16 |
| K | 0.0000000 | 0.0000000 |
| $A_3$ | −1.2230718 × 10$^{-4}$ | −8.9500376 × 10$^{-5}$ |
| $A_4$ | −4.2430283 × 10$^{-5}$ | 6.7172376 × 10$^{-6}$ |
| $A_5$ | −3.4092379 × 10$^{-6}$ | −2.5483986 × 10$^{-6}$ |
| $A_6$ | −8.6972222 × 10$^{-8}$ | 8.7431785 × 10$^{-9}$ |
| $A_7$ | 7.1484629 × 10$^{-9}$ | 1.1929007 × 10$^{-8}$ |
| $A_8$ | 1.1757361 × 10$^{-9}$ | 9.5934489 × 10$^{-10}$ |
| $A_9$ | 1.1978347 × 10$^{-10}$ | −1.8964460 × 10$^{-11}$ |
| $A_{10}$ | 1.0324842 × 10$^{-11}$ | −1.4717821 × 10$^{-11}$ |
| $A_{11}$ | 5.5972680 × 10$^{-13}$ | −2.0964357 × 10$^{-12}$ |
| $A_{12}$ | −3.3085418 × 10$^{-14}$ | −9.0025225 × 10$^{-14}$ |
| $A_{13}$ | −1.0588648 × 10$^{-14}$ | 3.7881613 × 10$^{-14}$ |
| $A_{14}$ | −3.6622081 × 10$^{-16}$ | 1.1691650 × 10$^{-14}$ |
| $A_{15}$ | −1.2626284 × 10$^{-15}$ | −1.8769971 × 10$^{-15}$ |
| $A_{16}$ | 4.4199041 × 10$^{-17}$ | 7.2676141 × 10$^{-17}$ |
| $A_{17}$ | 8.6690083 × 10$^{-18}$ | −1.1646457 × 10$^{-18}$ |
| $A_{18}$ | 2.0826063 × 10$^{-21}$ | −8.7157272 × 10$^{-33}$ |
| $A_{19}$ | 2.4986267 × 10$^{-37}$ | −7.3608398 × 10$^{-38}$ |
| $A_{20}$ | 3.9921875 × 10$^{-38}$ | −1.0839844 × 10$^{-38}$ |

Also, with the zoom lens for projection according to the example 3, all of the conditional expressions (1) to (3) and (6) are satisfied, as shown in Table 5 and Table 17 (refractive index $Nd_9$ of glass material of the ninth lens $L_9$ having the strongest negative power in the fourth lens group $G_4$,=1.805).

Figure 6:
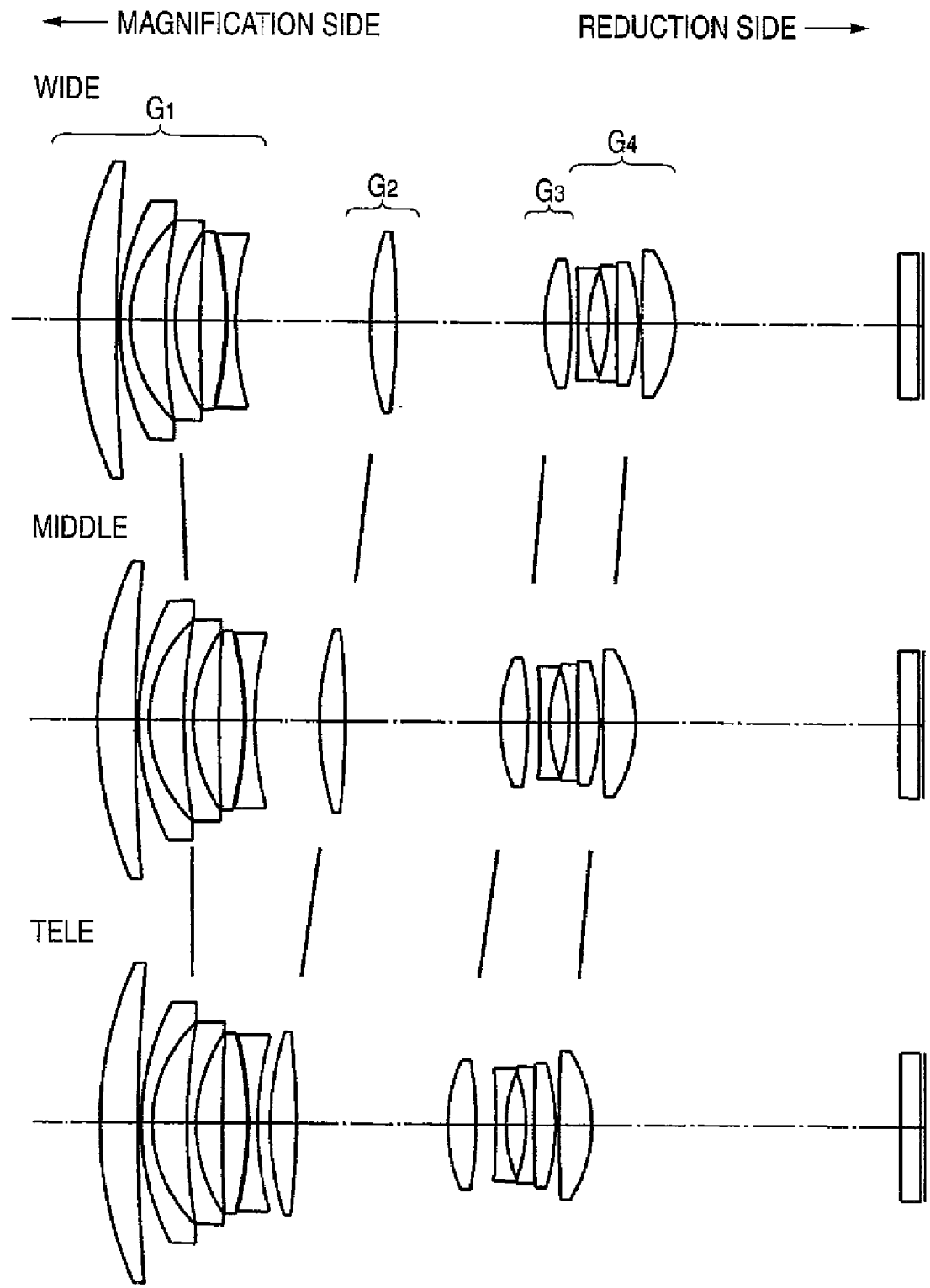
FIG. 6 is a schematic view showing the lens movement loci at variable power in the zoom lens for projection according to the example 3.

FIG. 6 shows the lens movement loci at variable power in the zoom lens for projection according to the example 3.

Figure 19:
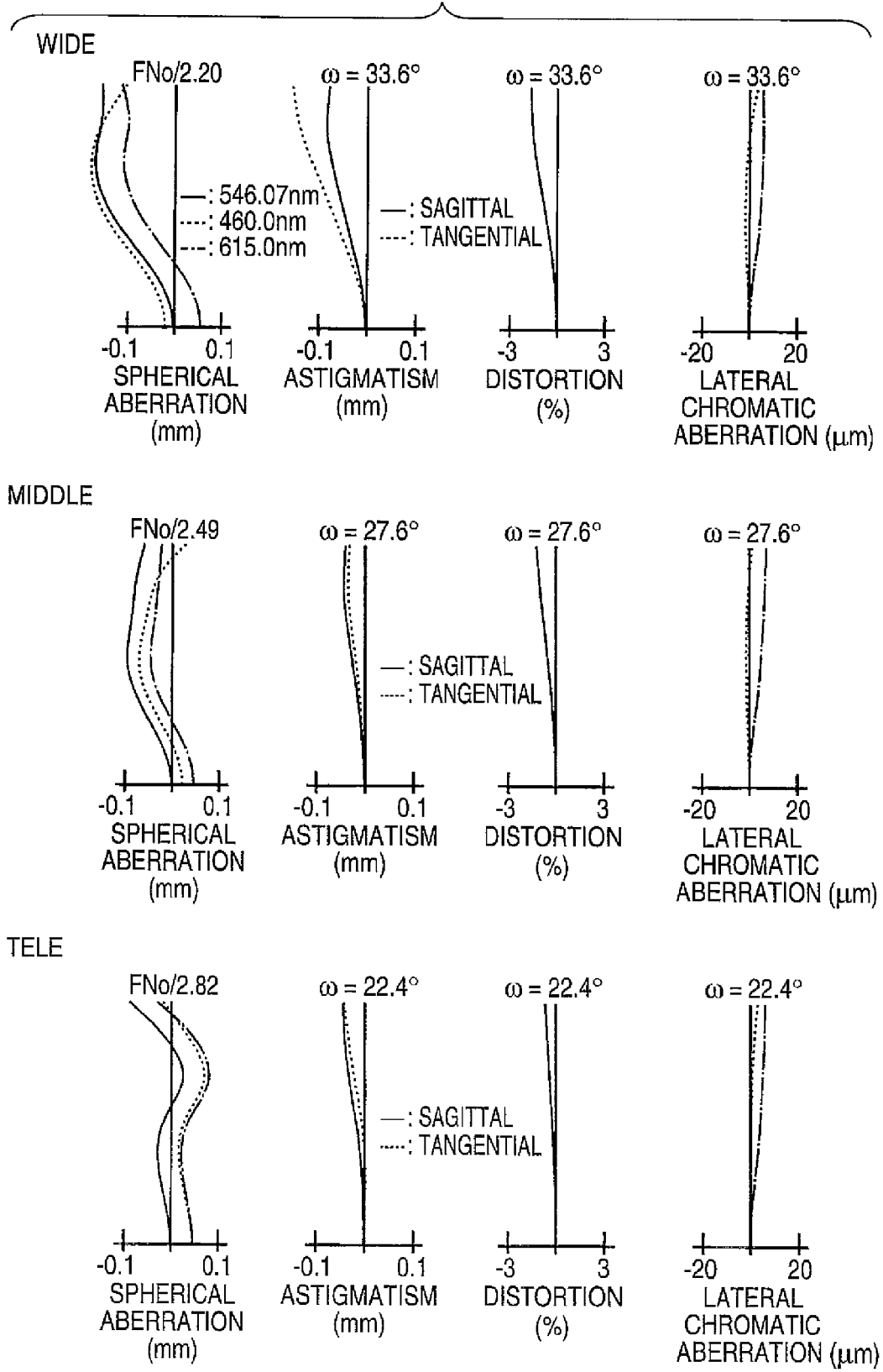
FIG. 19 is an aberration view showing various aberrations (spherical aberration, astigmatism, distortion and lateral chromatic aberration) of the zoom lens for projection according to the example 3.
Figure 20:
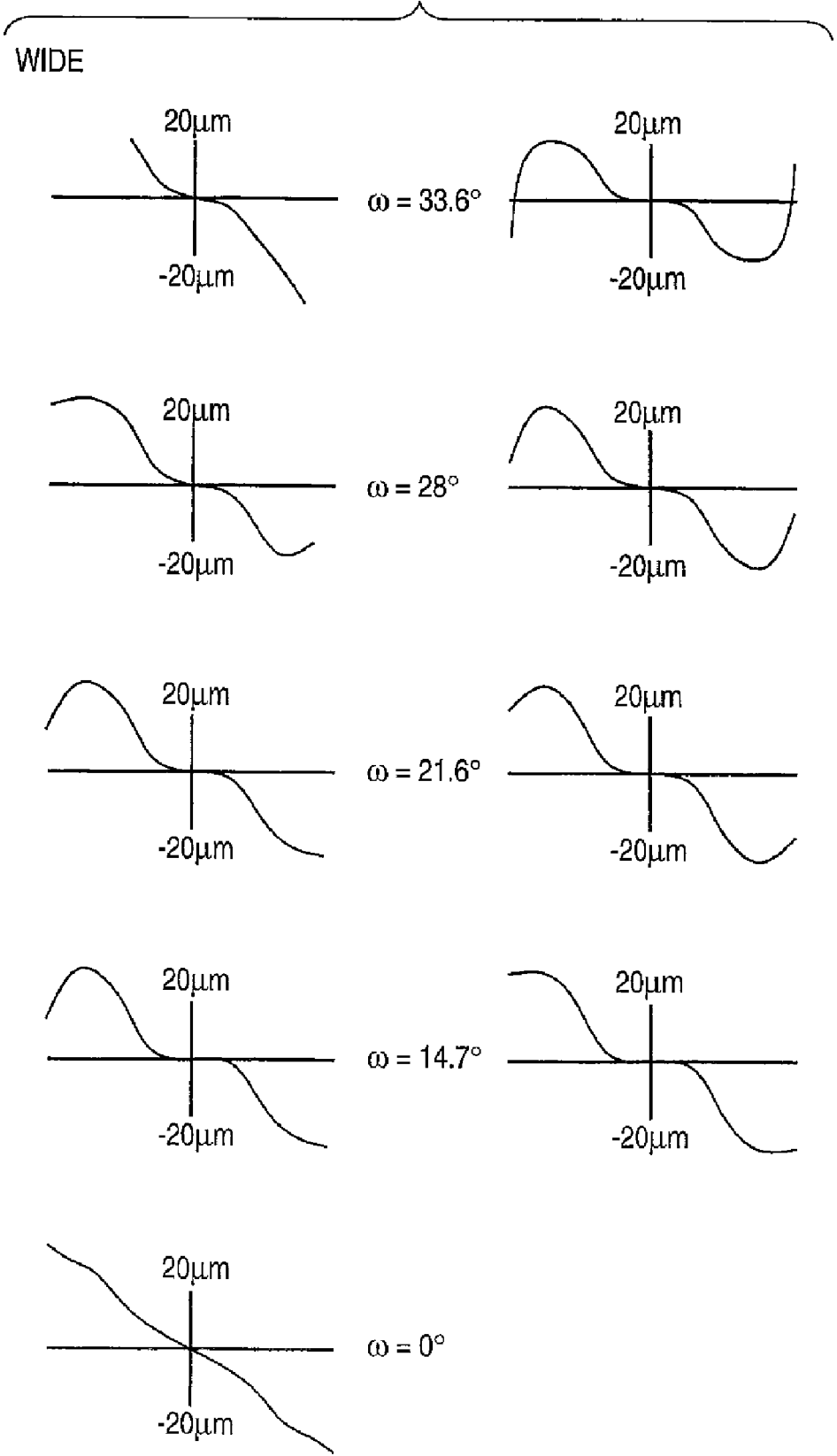
FIG. 20 is an aberration view showing the lateral aberration at the wide-angle end of the zoom lens for projection according to the example 3.
Figure 22:
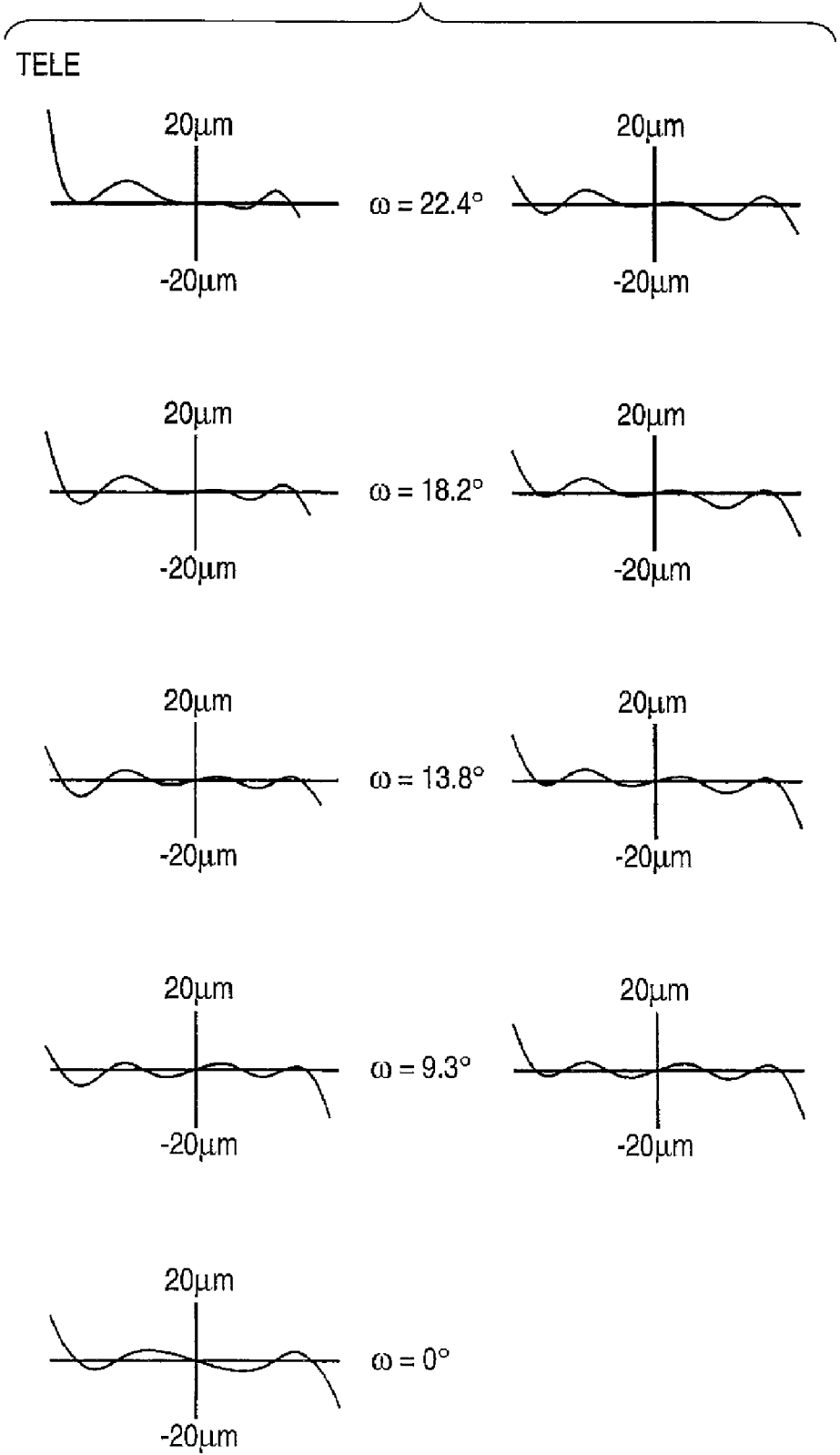
FIG. 22 is an aberration view showing the lateral aberration at the telephoto end of the zoom lens for projection according to the example 3.

Further, FIG. 19 is an aberration view showing the spherical aberration, astigmatism, distortion and lateral chromatic aberration at the wide-angle end, the middle position and the telephoto end in the zoom lens for projection according to the example 3. FIGS. 20, 21 and 22 are the lateral aberration views at the wide-angle end, the middle position and the telephoto end for the light having a wavelength of 546.07 nm.

As will be clear from these aberration views, with the zoom lens for projection according to the example 3, each aberration can be corrected extremely excellently.

Also, with the zoom tens for projection according to the example 3, the optical performance is excellent, and the variable power ratio can be 1.59 times or more, or near 1.6 times. Also, the angle of view 2ω at the wide-angle end can be as large as 67.2 degrees.

Example 4

Figure 7:
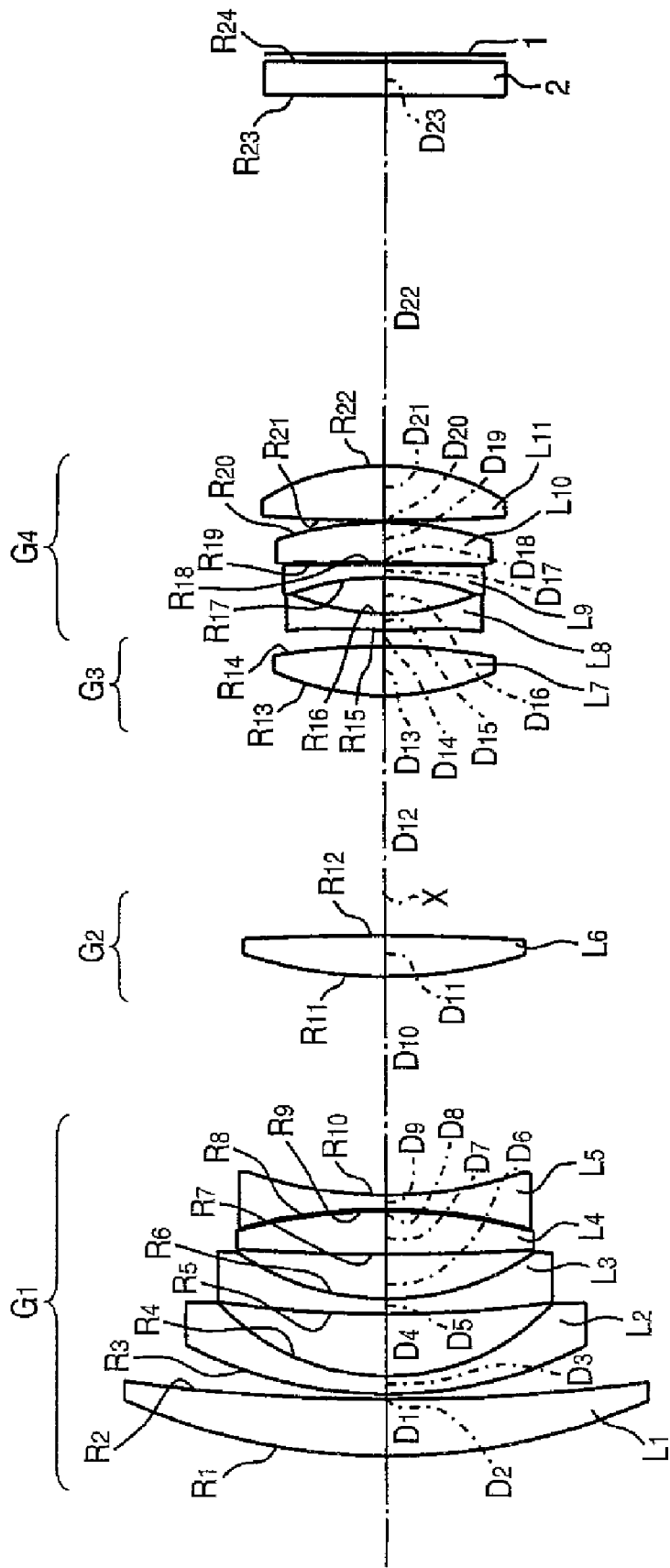
FIG. 7 is a schematic view showing the constitution of a zoom lens for projection according to an example 4 in an exemplary embodiment of the present invention.

A schematic constitution of the zoom lens for projection according to an example 4 is shown in FIG. 7. The lens constitution of the zoom lens for projection according to the example 4 is almost the same as the example 1, and the duplicate explanation is omitted.

Table 7 shows the values of the zoom lens for projection, including the radius of curvature R (mm) of each lens face, the on-axis surface spacing D (mm) of each lens, the refractive index N of each lens at the d-line, and the Abbe number ν.

Also, the faces (fifteenth face and sixteenth face) of the eighth lens $L_8$ are aspheric. Table 8 shows the constant K and the values of $A_3$ to $A_{20}$ in the above aspheric expression for each aspheric surface.

TABLE 7 f = 16.75~21.16~26.71
Bfw = 36.01
FNo = 2.05~2.34~2.70
2ω = 67.2°~55.2°~44.8°

| Surface Number | R | D | $N_d$ | $v_d$ |
| --- | --- | --- | --- | --- |
| 1 | 58.624 | 5.11 | 1.72916 | 54.7 |
| 2 | 177.513 | 0.50 | | |
| 3 | 39.339 | 1.62 | 1.83481 | 42.7 |
| 4 | 20.648 | 5.59 | | |
| 5 | 106.016 | 1.40 | 1.83400 | 37.2 |
| 6 | 23.660 | 3.99 | | |
| 7 | 218.629 | 3.88 | 1.84666 | 23.8 |
| 8 | −51.399 | 0.20 | | |
| 9 | −49.871 | 1.30 | 1.60311 | 60.7 |
| 10 | 39.210 | 19.70~9.43~2.42 | | |
| 11 | 40.892 | 3.79 | 1.58144 | 40.7 |
| 12 | −210.669 | 21.82~22.84~21.16 | | |
| 13 | 24.060 | 4.48 | 1.60311 | 60.7 |
| 14 | −54.955 | 1.49~2.72~4.57 | | |
| 15* | 99.557 | 1.50 | 1.68893 | 31.1 |
| 16* | 18.531 | 3.30 | | |
| 17 | −23.519 | 1.20 | 1.80518 | 25.4 |
| 18 | −455.560 | 0.15 | | |
| 19 | −634.448 | 3.64 | 1.57250 | 57.8 |
| 20 | −29.491 | 0.20 | | |
| 21 | 176.562 | 4.96 | 1.61340 | 44.3 |
| 22 | −20.847 | 33.50~39.10~45.03 | | |
| 23 | ∞ | 3.00 | 1.48749 | 70.2 |
| 24 | ∞ | | | |

*Aspheric surface

TABLE 8

| | Surface Number | |
| --- | --- | --- |
| | 15 | 16 |
| K | 0.0000000 | 0.0000000 |
| $A_3$ | $-1.0353440 \times 10^{-4}$ | $-7.4030668 \times 10^{-5}$ |
| $A_4$ | $-4.4919518 \times 10^{-5}$ | $3.7547762 \times 10^{-6}$ |
| $A_5$ | $-3.5496227 \times 10^{-6}$ | $-3.1004270 \times 10^{-6}$ |
| $A_6$ | $-1.0131108 \times 10^{-7}$ | $-3.2015221 \times 10^{-8}$ |
| $A_7$ | $3.9824904 \times 10^{-9}$ | $1.1760558 \times 10^{-8}$ |
| $A_8$ | $7.2207100 \times 10^{-10}$ | $1.3522870 \times 10^{-9}$ |
| $A_9$ | $8.0720078 \times 10^{-11}$ | $4.3372320 \times 10^{-11}$ |
| $A_{10}$ | $9.3347595 \times 10^{-12}$ | $-9.1688212 \times 10^{-12}$ |
| $A_{11}$ | $8.8358738 \times 10^{-13}$ | $-1.9597767 \times 10^{-12}$ |
| $A_{12}$ | $3.0502100 \times 10^{-14}$ | $-1.6791332 \times 10^{-13}$ |
| $A_{13}$ | $-8.4958313 \times 10^{-15}$ | $7.8446395 \times 10^{-15}$ |
| $A_{14}$ | $-2.0064778 \times 10^{-15}$ | $5.3065610 \times 10^{-15}$ |
| $A_{15}$ | $-1.8249307 \times 10^{-16}$ | $3.7253910 \times 10^{-16}$ |
| $A_{16}$ | $-2.6186592 \times 10^{-17}$ | $-1.0032141 \times 10^{-16}$ |
| $A_{17}$ | $5.1359000 \times 10^{-18}$ | $2.7317807 \times 10^{-18}$ |
| $A_{18}$ | $2.0826063 \times 10^{-21}$ | $-8.7157272 \times 10^{-33}$ |
| $A_{19}$ | $2.4986267 \times 10^{-37}$ | $-7.3577881 \times 10^{-38}$ |
| $A_{20}$ | $3.9921875 \times 10^{-38}$ | $-1.0839844 \times 10^{-38}$ |

Also, with the zoom lens for projection according to the example 4, all of the conditional expressions (1) to (3) and (6) are satisfied, as shown in Table 7 and Table 17 (refractive index $Nd_9$ of glass material of the ninth lens $L_9$ having the strongest negative power in the fourth lens group $G_4$,=1.805).

Figure 8:
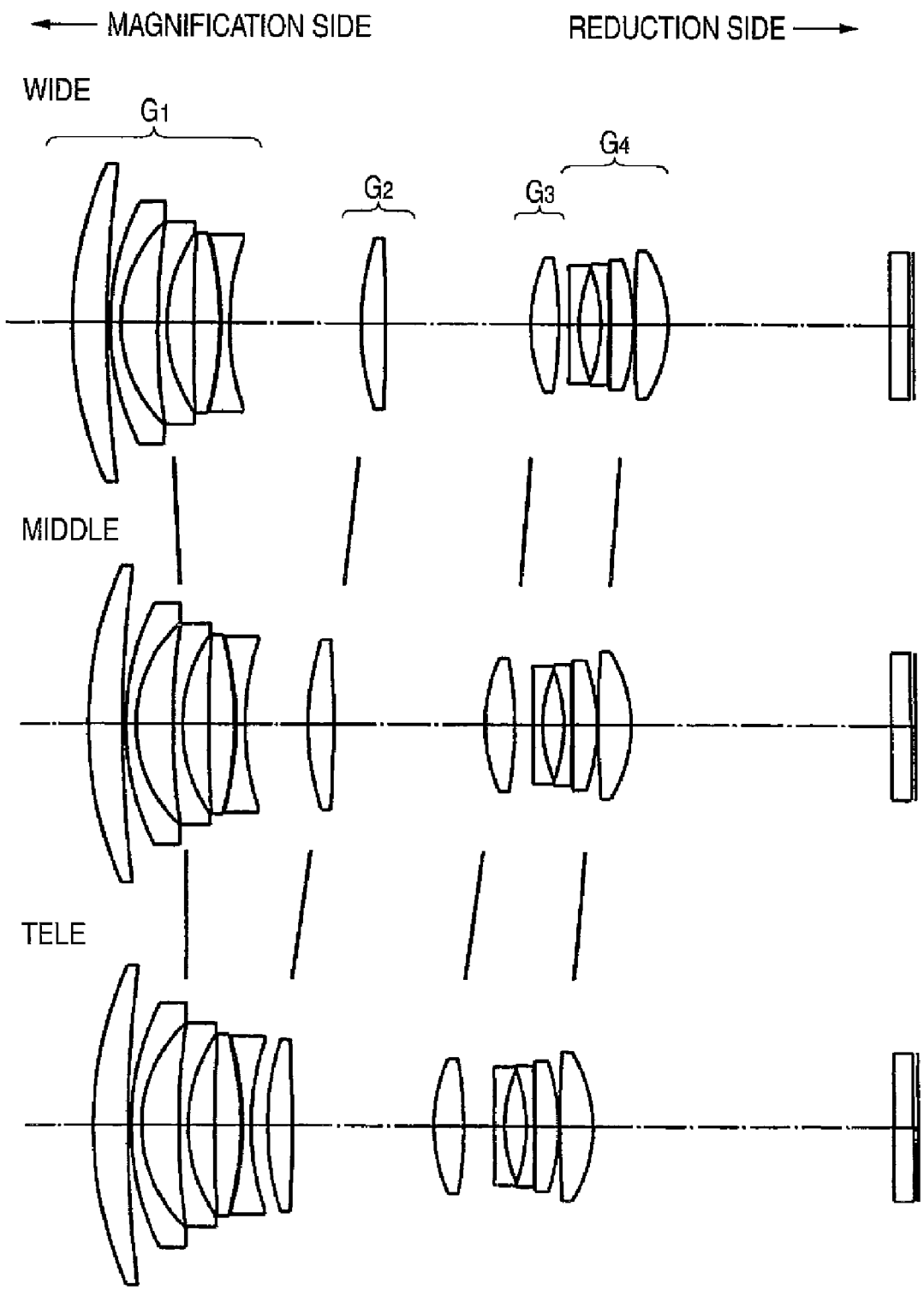
FIG. 8 is a schematic view showing the lens movement loci at variable power in the zoom lens for projection according to the example 4.

FIG. 8 shows the lens movement loci at variable power in the zoom lens for projection according to the example 4.

Figure 23:
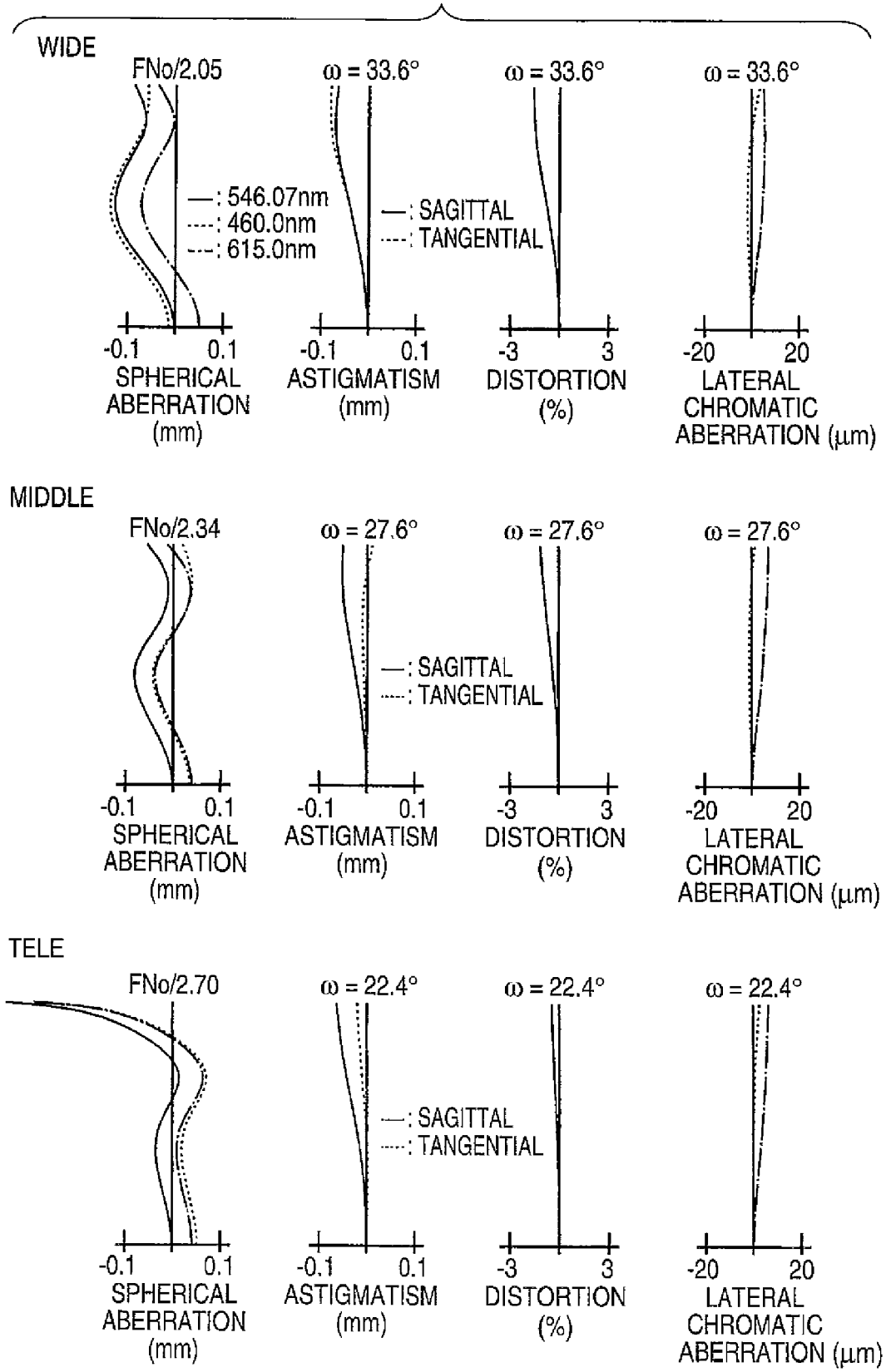
FIG. 23 is an aberration view showing various aberrations (spherical aberration, astigmatism, distortion and lateral chromatic aberration) of the zoom lens for projection according to the example 4.
Figure 24:
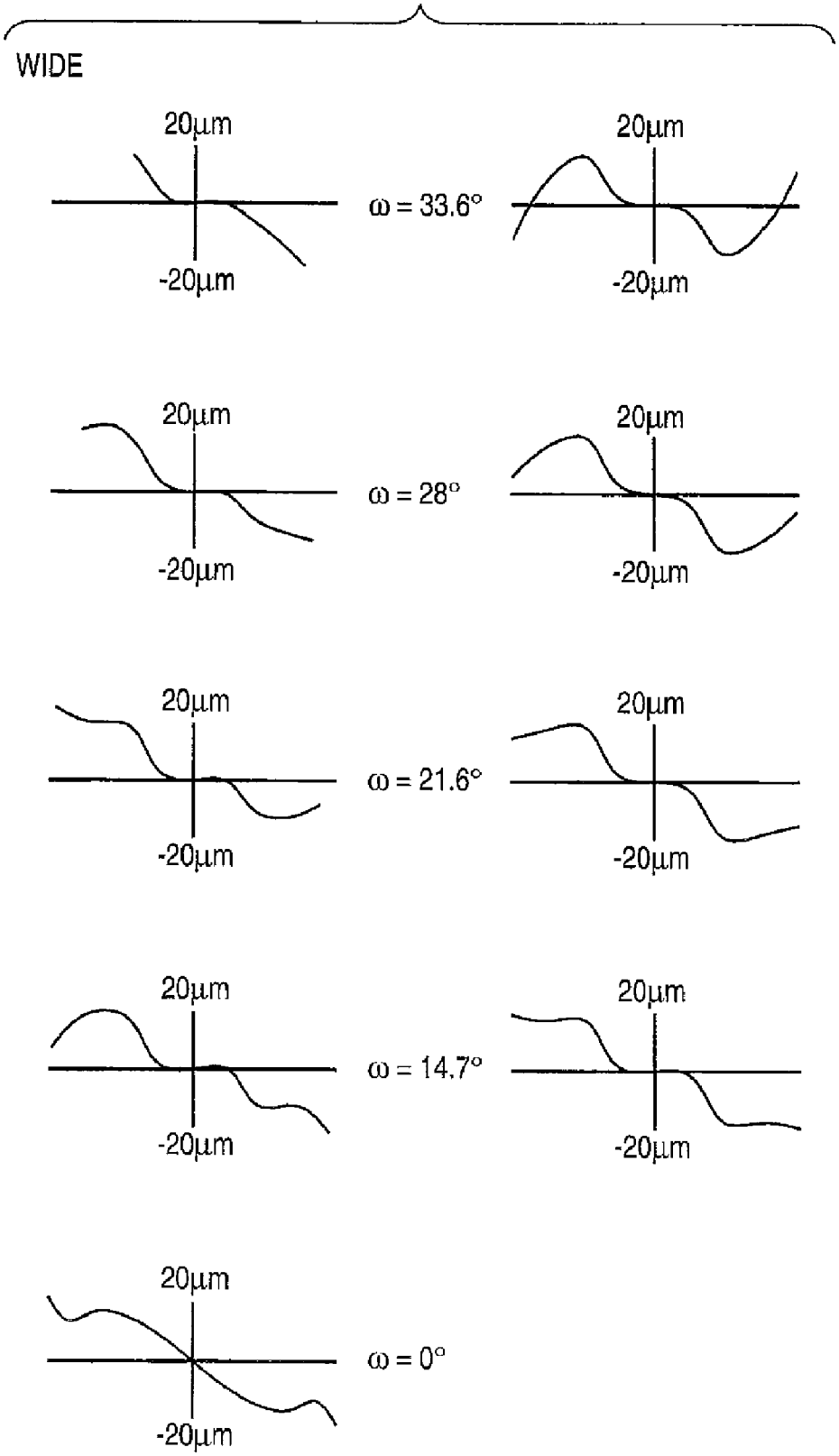
FIG. 24 is an aberration view showing the lateral aberration at the wide-angle end of the zoom lens for projection according to the example 4.
Figure 25:
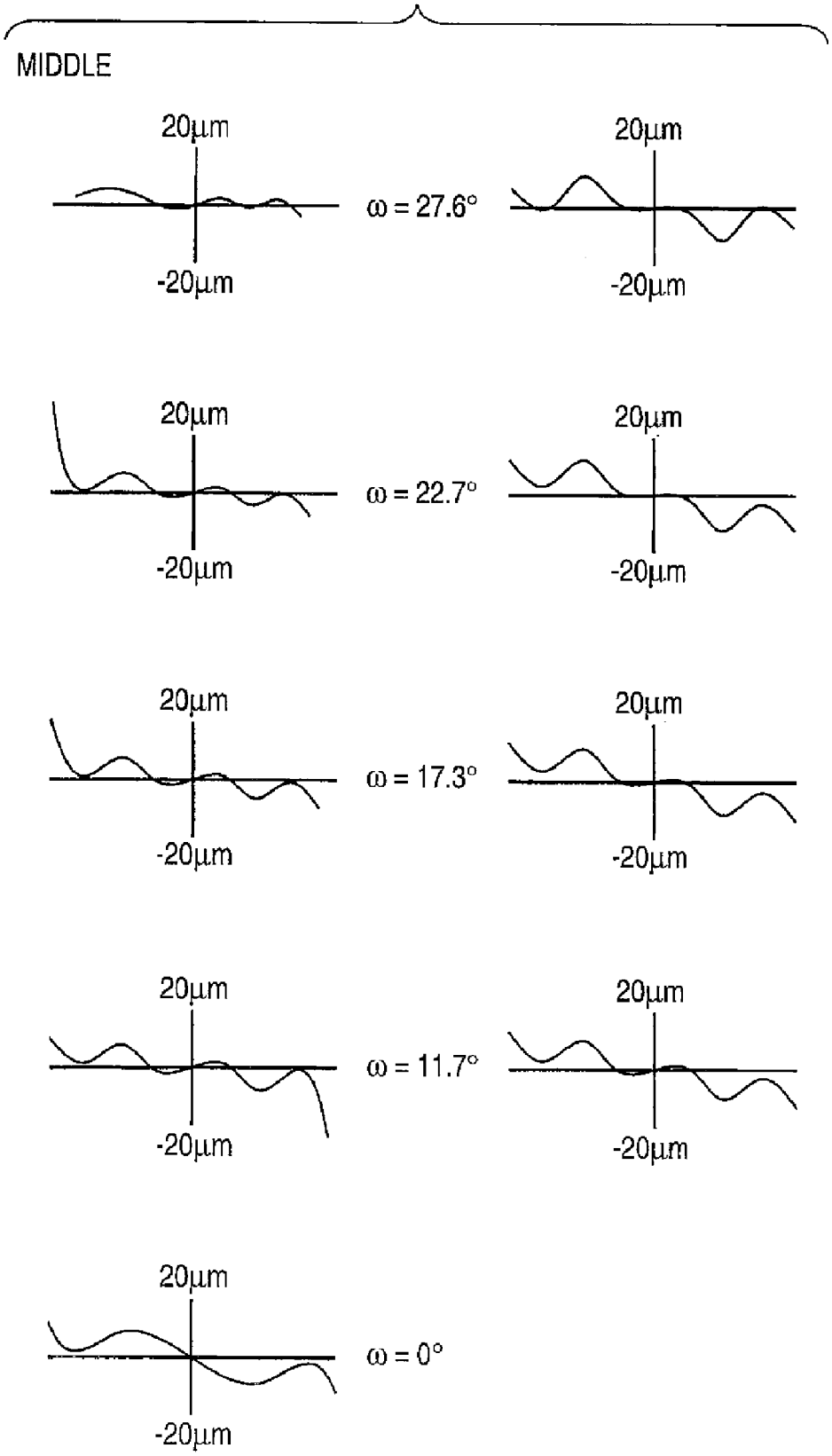
FIG. 25 is an aberration view showing the lateral aberration at the middle position of the zoom lens for projection according to the example 4.
Figure 26:
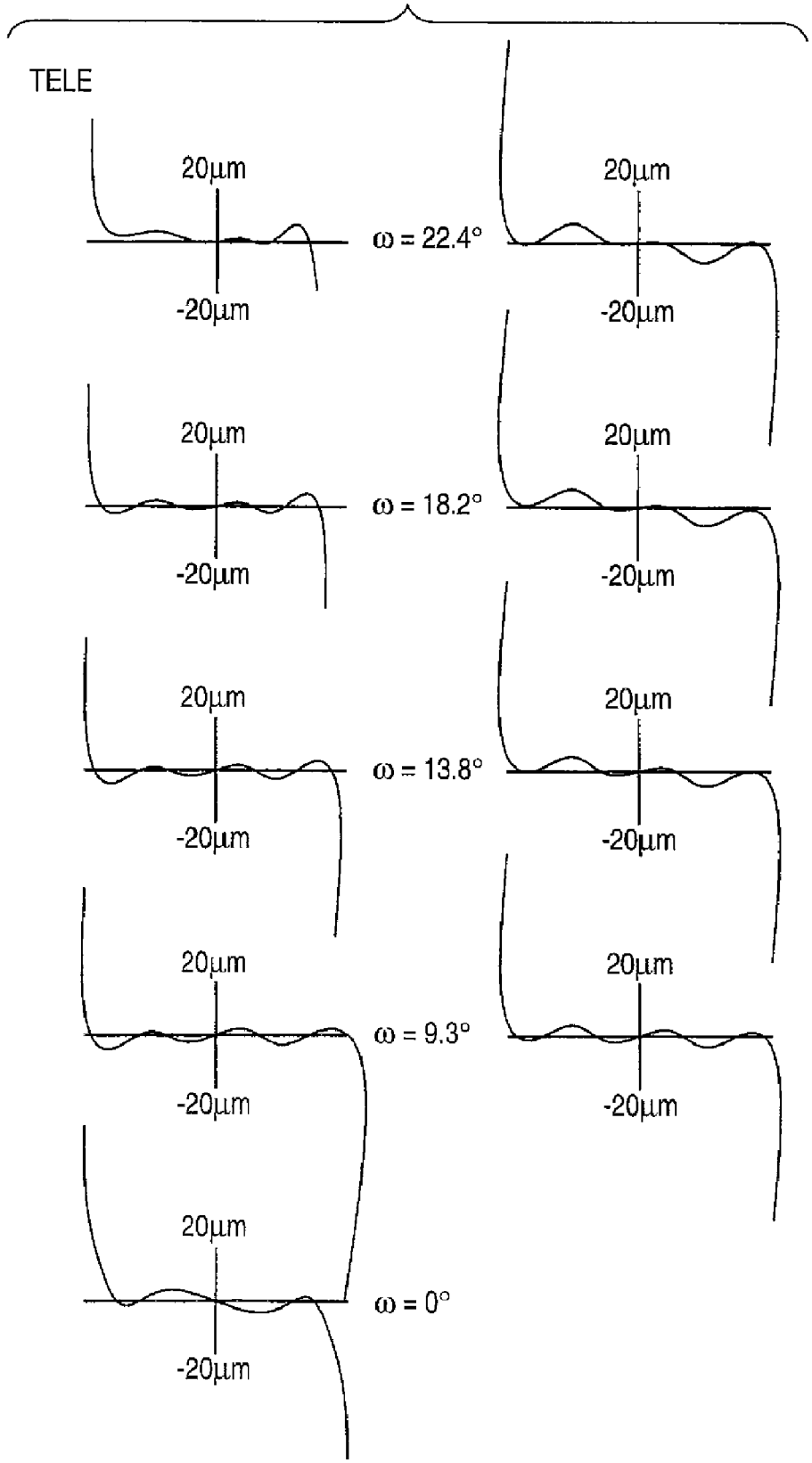
FIG. 26 is an aberration view showing the lateral aberration at the telephoto end of the zoom lens for projection according to the example 4.

Further, FIG. 23 is an aberration view showing the spherical aberration, astigmatism, distortion and lateral chromatic aberration at the wide-angle end, the middle position and the telephoto end in the zoom lens for projection according to the example 4. FIGS. 24, 25 and 26 are the lateral aberration views at the wide-angle end, the middle position and the telephoto end for the light having a wavelength of 546.07 nm.

As will be clear from these aberration views, with the zoom lens for projection according to the example 4, each aberration can be corrected extremely excellently.

Also, with the zoom lens for projection according to the example 4, the optical performance is excellent, and the variable power ratio can be 1.59 times or more, or near 1.6 times. Also, the angle of view 2ω at the wide-angle end can be as large as 67.2 degrees.

Example 5

Figure 9:
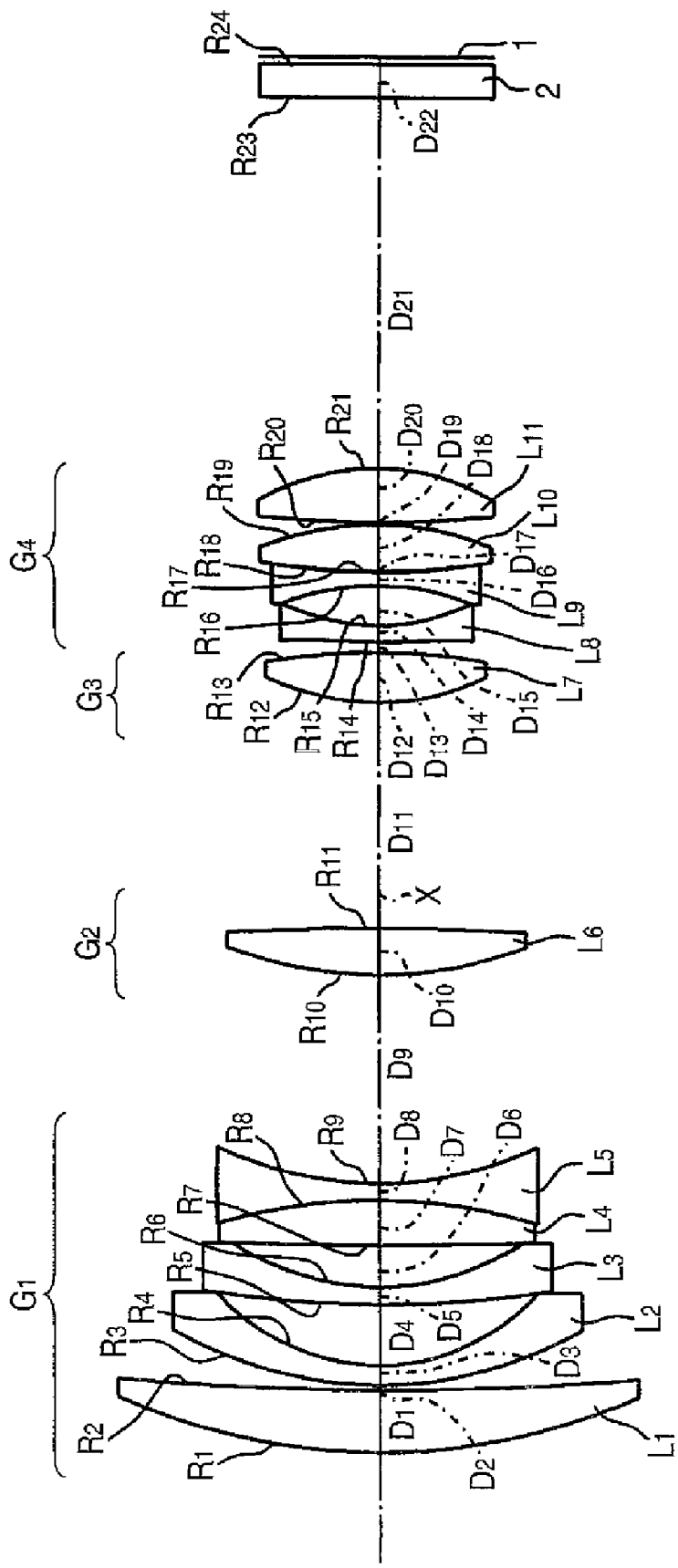
FIG. 9 is a schematic view showing the constitution of a zoom lens for projection according to an example 5 in an exemplary embodiment of the present invention.

A schematic constitution of the zoom lens for projection according to an example 5 is shown in FIG. 9. The lens constitution of the zoom lens for projection according to the example 5 is almost the same as the example 1, and the duplicate explanation is omitted. This embodiment is different from the above embodiments in that the fourth lens $L_4$ and the fifth lens $L_5$ are constituted as a compound lens, mutually cemented, Table 9 shows the values of the zoom lens for projection, including the radius of curvature R (mm) of each lens face, the on-axis surface spacing D (mm) of each lens, the refractive index N of each lens at the d-line, and the Abbe number ν.

Also, the faces (fourteenth face and fifteenth face) of the eighth lens $L_8$ are aspheric. Table 10 shows the constant K and the values of $A_3$ to $A_{20}$ in the above aspheric expression for each aspheric surface.

TABLE 9 f = 16.74~21.15~26.71
Bfw = 36.01
FNo = 2.20~2.51~2.87
2ω = 67.4°~55.4°~44.8°

| Surface Number | R | D | $N_d$ | $v_d$ |
|---|---|---|---|---|
| 1 | 58.866 | 5.61 | 1.51680 | 64.2 |
| 2 | 274.485 | 0.50 | | |
| 3 | 37.519 | 1.80 | 1.77250 | 49.6 |
| 4 | 19.847 | 5.53 | | |
| 5 | 101.573 | 1.60 | 1.83400 | 37.2 |
| 6 | 24.511 | 3.79 | | |
| 7 | 457.215 | 4.10 | 1.84666 | 23.8 |
| 8 | −51.271 | 1.50 | 1.56384 | 60.7 |
| 9 | 34.373 | 19.12~9.49~2.91 | | |
| 10 | 39.077 | 4.29 | 1.60342 | 38.0 |
| 11 | −248.836 | 20.64~21.20~19.32 | | |
| 12 | 23.651 | 4.60 | 1.61272 | 58.7 |
| 13 | −60.427 | 0.97~2.28~4.16 | | |
| 14* | 65.936 | 1.50 | 1.68893 | 31.1 |
| 15* | 18.170 | 3.67 | | |
| 16 | −24.625 | 1.20 | 1.80518 | 25.4 |
| 17 | 60.203 | 0.15 | | |
| 18 | 74.452 | 4.21 | 1.58913 | 61.2 |
| 19 | −29.238 | 0.20 | | |
| 20 | 114.728 | 4.90 | 1.62004 | 36.3 |
| 21 | −22.140 | 33.50~39.04~45.00 | | |
| 22 | ∞ | 3.00 | 1.48749 | 70.2 |
| 23 | ∞ | | | |

*Aspheric surface

TABLE 10

| | Surface Number | |
|---|---|---|
| | 14 | 15 |
| K | 0.0000000 | 0.0000000 |
| $A_3$ | −7.9630536 × 10⁻⁵ | −3.0483514 × 10⁻⁵ |
| $A_4$ | −5.0537907 × 10⁻⁵ | −2.0679181 × 10⁻⁵ |
| $A_5$ | −5.6355939 × 10⁻⁶ | −2.8485128 × 10⁻⁶ |
| $A_6$ | 1.9240832 × 10⁻⁷ | 9.5518463 × 10⁻⁸ |
| $A_7$ | 3.2440020 × 10⁻⁸ | 2.6186878 × 10⁻⁸ |
| $A_8$ | 4.6700920 × 10⁻¹⁰ | 2.6292330 × 10⁻⁹ |
| $A_9$ | −1.7691245 × 10⁻¹⁰ | 3.3342286 × 10⁻¹¹ |
| $A_{10}$ | −1.6510262 × 10⁻¹¹ | −3.5055631 × 10⁻¹¹ |
| $A_{11}$ | 1.3487547 × 10⁻¹³ | −6.7622939 × 10⁻¹² |
| $A_{12}$ | 1.7412104 × 10⁻¹³ | −6.3855563 × 10⁻¹³ |
| $A_{13}$ | 1.4403692 × 10⁻¹⁴ | 7.7904814 × 10⁻¹⁶ |
| $A_{14}$ | −1.2397801 × 10⁻¹⁵ | 1.2382758 × 10⁻¹⁴ |
| $A_{15}$ | −4.0123406 × 10⁻¹⁶ | 2.1363273 × 10⁻¹⁵ |
| $A_{16}$ | −7.3365003 × 10⁻¹⁷ | −4.3274309 × 10⁻¹⁸ |
| $A_{17}$ | 1.1636279 × 10⁻¹⁷ | −2.3981011 × 10⁻¹⁷ |
| $A_{18}$ | 4.8341268 × 10⁻²¹ | −8.7157272 × 10⁻³³ |
| $A_{19}$ | 2.4986267 × 10⁻³⁷ | −7.3608398 × 10⁻³⁸ |
| $A_{20}$ | 3.9921875 × 10⁻³⁸ | −1.0839844 × 10⁻³⁸ |

Also, with the zoom lens for projection according to the example 5, all of the conditional expressions (1) to (3) and (6) are satisfied, as shown in Table 9 and Table 17 (refractive index $Nd_9$ of glass material of the ninth lens $L_9$ having the strongest negative power in the fourth lens group $G_4$,=1.805).

Figure 10:
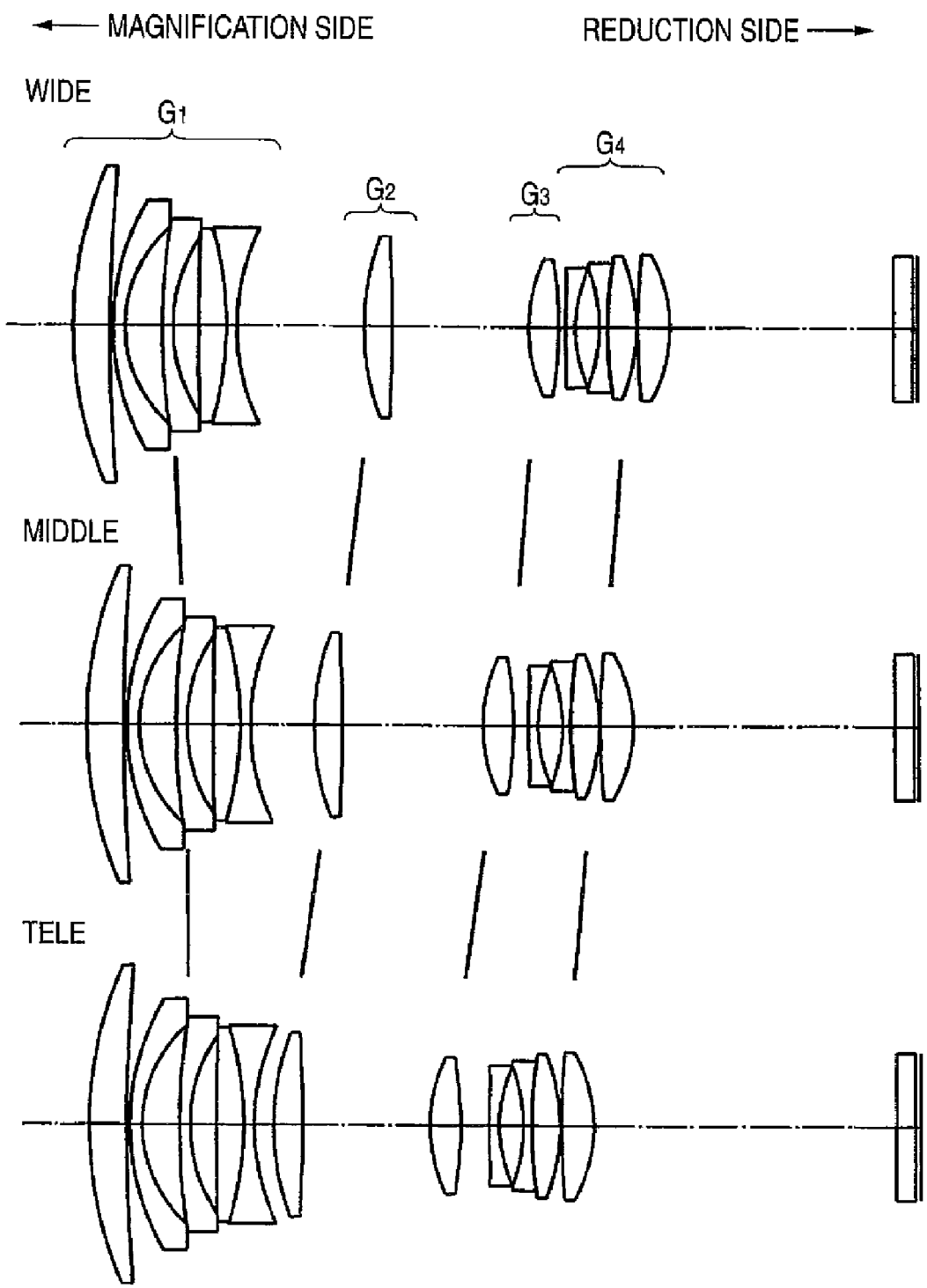
FIG. 10 is a schematic view showing the lens movement loci at variable power in the zoom lens for projection according to the example 5.

FIG. 10 shows the lens movement loci at variable power in the zoom lens for projection according to the example 5.

Figure 27:
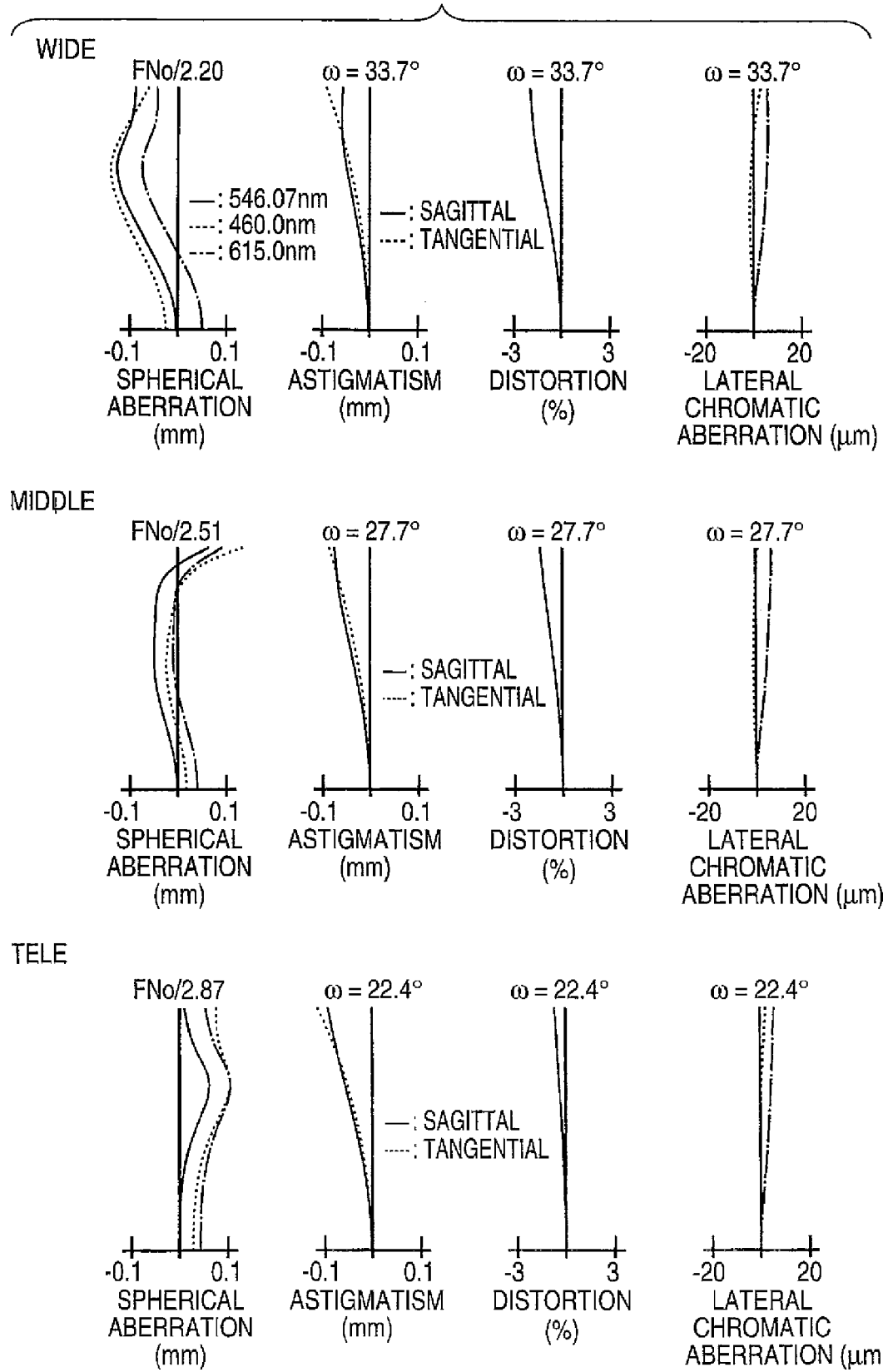
FIG. 27 is an aberration view showing various aberrations (spherical aberration, astigmatism, distortion and lateral chromatic aberration) of the zoom lens for projection according to the example 5.
Figure 29:
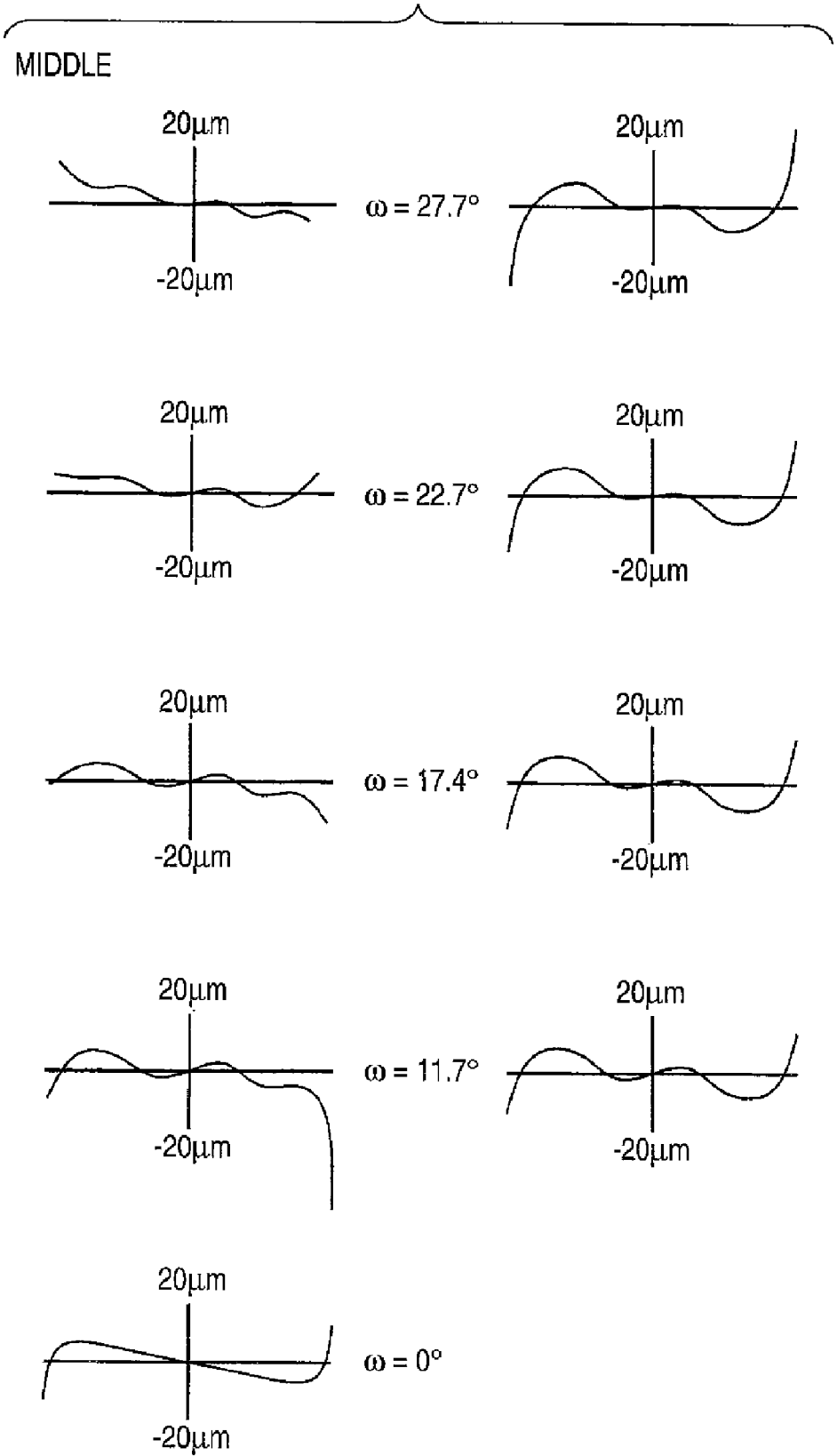
FIG. 29 is an aberration view showing the lateral aberration at the middle position of the zoom lens for projection according to the example 5.

Further, FIG. 27 is an aberration view showing the spherical aberration, astigmatism, distortion and lateral chromatic aberration at the wide-angle end, the middle position and the telephoto end in the zoom lens for projection according to the example 5. FIGS. 28, 29 and 30 are the lateral aberration views at the wide-angle end, the middle position and the telephoto end for the light having a wavelength of 546.07 nm.

As will be clear from these aberration views, with the zoom lens for projection according to the example 5, each aberration can be corrected extremely excellently.

Also, with the zoom lens for projection according to the example 5, the optical performance is excellent, and the variable power ratio can be 1.59 times or more, or near 1.6 times. Also, the angle of view 2ω at the wide-angle end can be as large as 67.4 degrees.

Example 6

Figure 31:
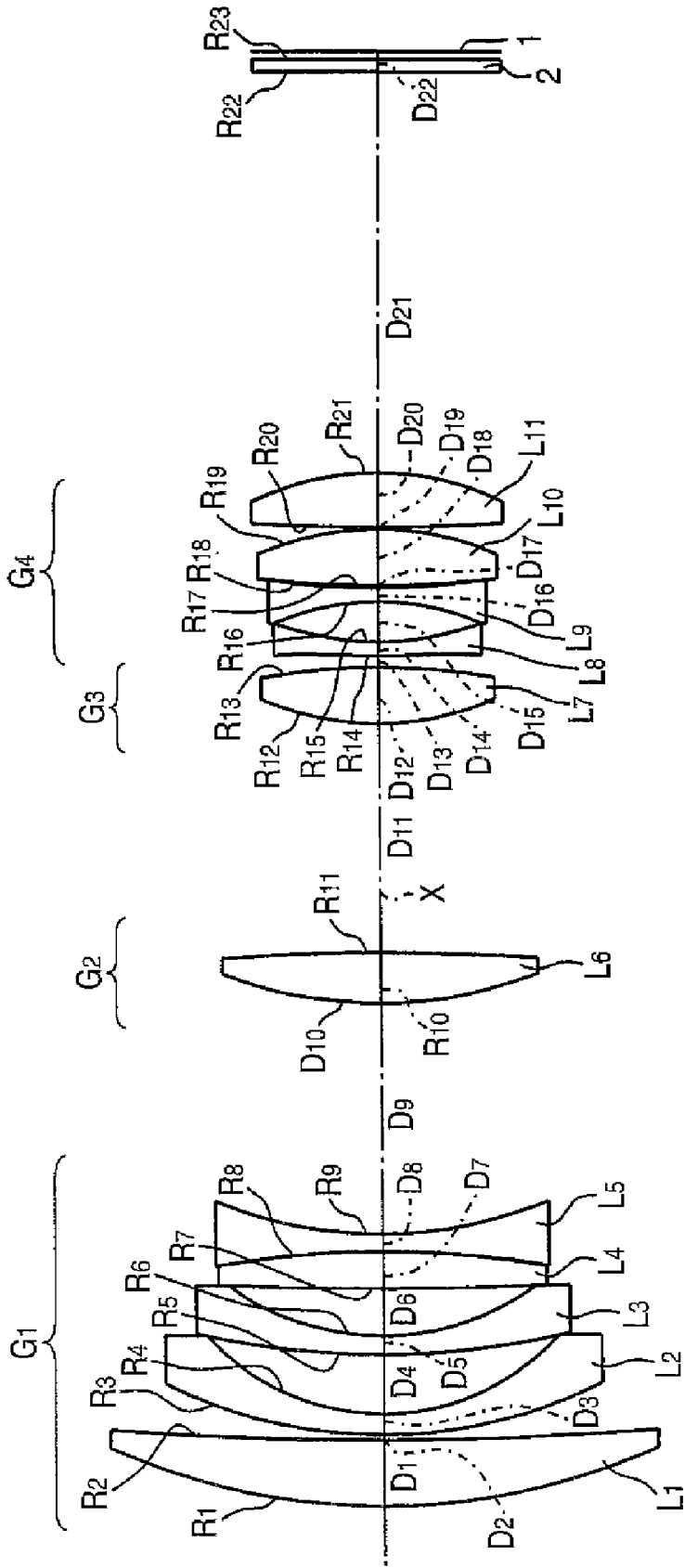
FIG. 31 is a schematic view showing the constitution of a zoom lens for projection according to an example 6 in an exemplary embodiment of the present invention.

A schematic constitution of the zoom lens for projection according to an example 6 is shown in FIG. 31. The lens constitution of the zoom lens for projection according to the example 6 is almost the same as the example 1, and the duplicate explanation is omitted. This embodiment is the same as the above example 5 in that the fourth lens $L_4$ and the fifth lens $L_5$ are constituted as a compound lens, mutually cemented, Table 11 shows the values of the zoom lens for projection, including the radius of curvature R (mm) of each lens face, the on-axis surface spacing D (mm) of each lens, the refractive index N of each lens at the d-line, and the Abbe number ν.

Also, the faces (fourteenth face and fifteenth face) of the eighth lens $L_8$ are aspheric. Table 12 shows the constant K and the values of $A_3$ to $A_{16}$ in the above aspheric expression for each aspheric surface.

TABLE 11 f = 16.74~21.15~26.70
Bfw = 36.00
FNo = 2.20~2.40~2.64
2ω = 67.4°~55.3°~44.7°

| Surface Number | R | D | $N_d$ | $v_d$ |
|---|---|---|---|---|
| 1 | 58.441 | 5.69 | 1.51680 | 64.2 |
| 2 | 302.267 | 0.50 | | |
| 3 | 42.267 | 1.80 | 1.77250 | 49.6 |
| 4 | 20.479 | 5.18 | | |
| 5 | 71.660 | 1.60 | 1.77250 | 49.6 |
| 6 | 22.791 | 4.08 | | |
| 7 | 306.191 | 3.20 | 1.84666 | 23.8 |
| 8 | −86.088 | 1.50 | 1.60311 | 60.7 |
| 9 | 38.378 | 20.07~10.82~4.70 | | |
| 10 | 38.287 | 4.39 | 1.60342 | 38.0 |
| 11 | −198.301 | 19.91~19.49~16.48 | | |
| 12 | 24.943 | 4.93 | 1.56384 | 60.8 |
| 13 | −59.692 | 1.02~2.78~5.01 | | |
| 14* | 68.066 | 1.20 | 1.68893 | 31.1 |
| 15* | 21.350 | 3.54 | | |
| 16 | −22.796 | 1.20 | 1.84666 | 23.8 |
| 17 | 64.532 | 0.20 | | |
| 18 | 89.912 | 4.92 | 1.67790 | 55.3 |
| 19 | −26.721 | 0.20 | | |
| 20 | 170.625 | 4.75 | 1.67270 | 32.2 |
| 21 | −25.381 | 34.80~39.80~45.31 | | |
| 22 | ∞ | 1.05 | 1.50847 | 61.2 |
| 23 | ∞ | | | |

*Aspheric surface

TABLE 12

| | Surface Number | |
|---|---|---|
| | 14 | 15 |
| K | 0.0000000 | 0.0000000 |
| $A_3$ | −7.5609207 × 10⁻⁵ | −8.8458449 × 10⁻⁵ |
| $A_4$ | −7.4010104 × 10⁻⁵ | −3.6003689 × 10⁻⁵ |
| $A_5$ | −1.7573032 × 10⁻⁶ | −1.1497100 × 10⁻⁶ |

TABLE 12-continued

| | Surface Number | |
|---|---|---|
| | 14 | 15 |
| $A_6$ | $1.2508684 \times 10^{-7}$ | $3.9525513 \times 10^{-8}$ |
| $A_7$ | $1.3596765 \times 10^{-8}$ | $9.2122059 \times 10^{-9}$ |
| $A_8$ | $3.5007261 \times 10^{-10}$ | $7.9745206 \times 10^{-10}$ |
| $A_9$ | $-5.3632157 \times 10^{-11}$ | $9.7049638 \times 10^{-12}$ |
| $A_{10}$ | $-9.3218004 \times 10^{-12}$ | $2.4198405 \times 10^{-12}$ |
| $A_{11}$ | $-8.4612049 \times 10^{-13}$ | $-2.1165429 \times 10^{-12}$ |
| $A_{12}$ | $-3.8671459 \times 10^{-14}$ | $3.4360563 \times 10^{-14}$ |
| $A_{13}$ | $3.4331259 \times 10^{-15}$ | $1.0178094 \times 10^{-14}$ |
| $A_{14}$ | $1.2870618 \times 10^{-15}$ | $-9.7012640 \times 10^{-16}$ |
| $A_{15}$ | $2.4291147 \times 10^{-16}$ | $-8.2429488 \times 10^{-16}$ |
| $A_{16}$ | $-2.4917516 \times 10^{-17}$ | $9.8304623 \times 10^{-17}$ |

Also, with the zoom lens for projection according to the example 6, all of the conditional expressions (1) to (3) and (6) are satisfied, as shown in Table 11 and Table 17 (refractive index $Nd_9$ of glass material of the ninth lens $L_9$ having the strongest negative power in the fourth lens group $G_4$,=1.847).

Figure 32:
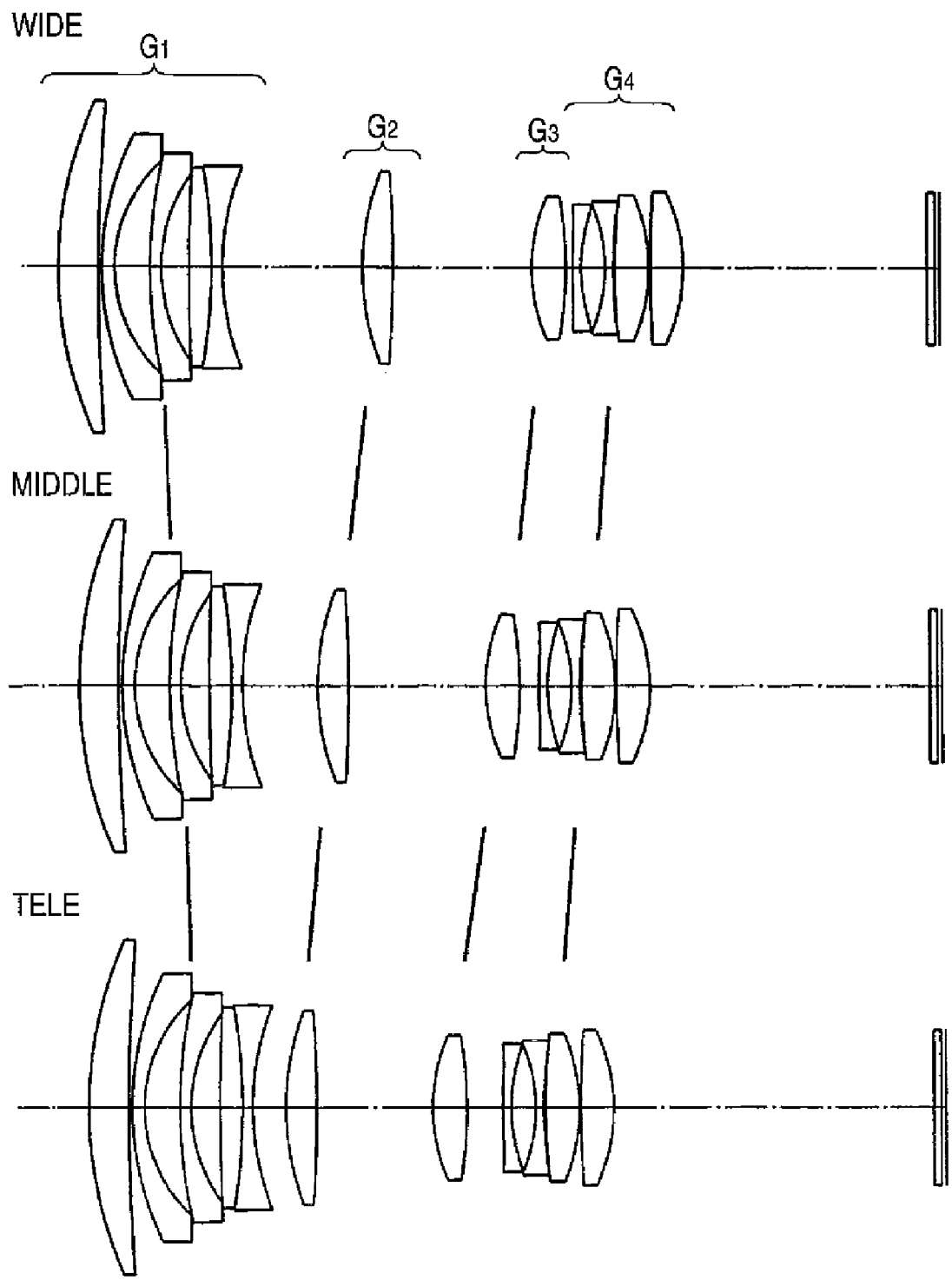
FIG. 32 is a schematic view showing the lens movement loci at variable power in the zoom lens for projection according to the example 6.

FIG. 32 shows the lens movement loci at variable power in the zoom lens for projection according to the example 6.

Figure 37:
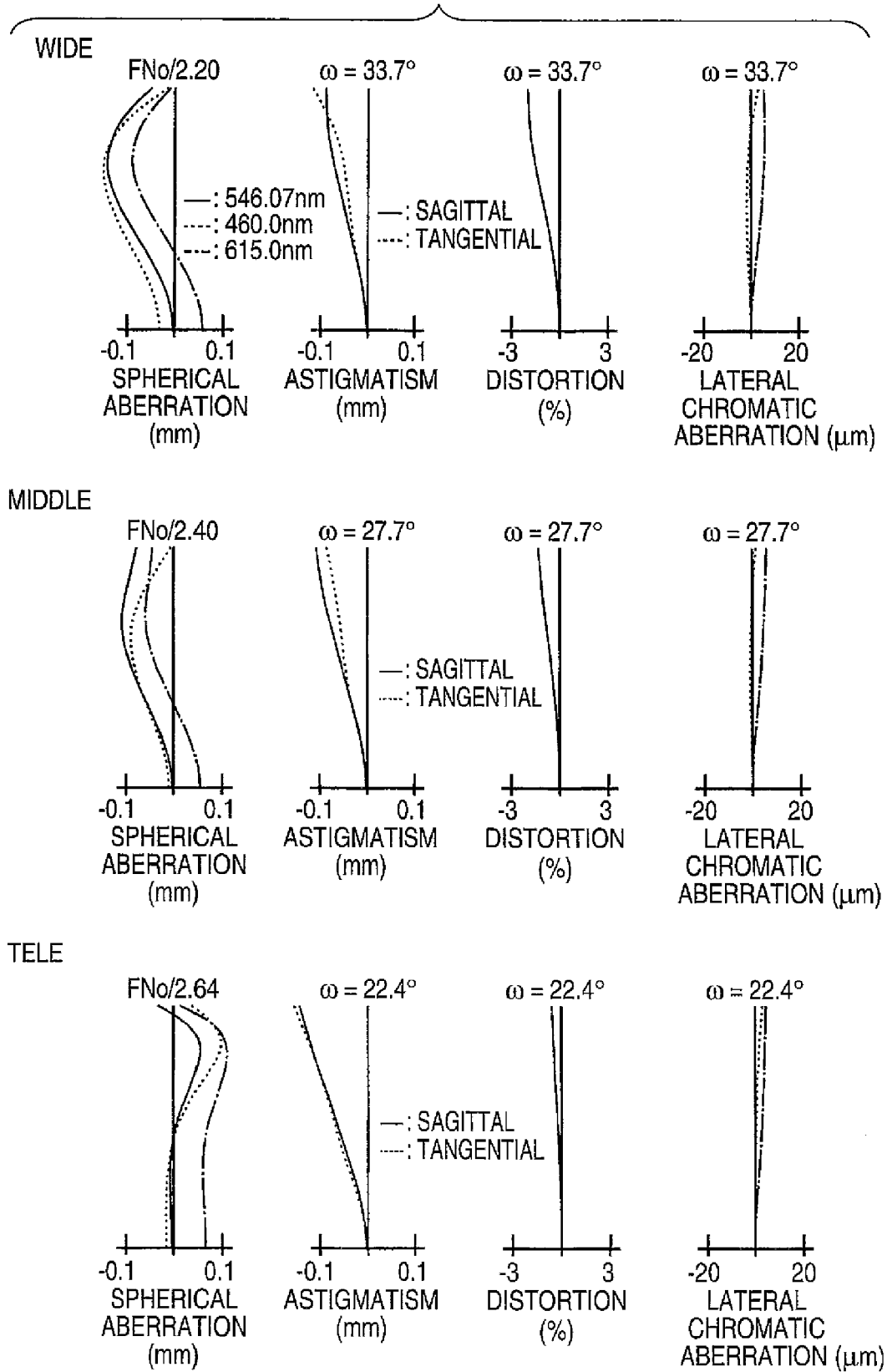
FIG. 37 is an aberration view showing various aberrations (spherical aberration, astigmatism, distortion and lateral chromatic aberration) of the zoom lens for projection according to the example 6.
Figure 38:
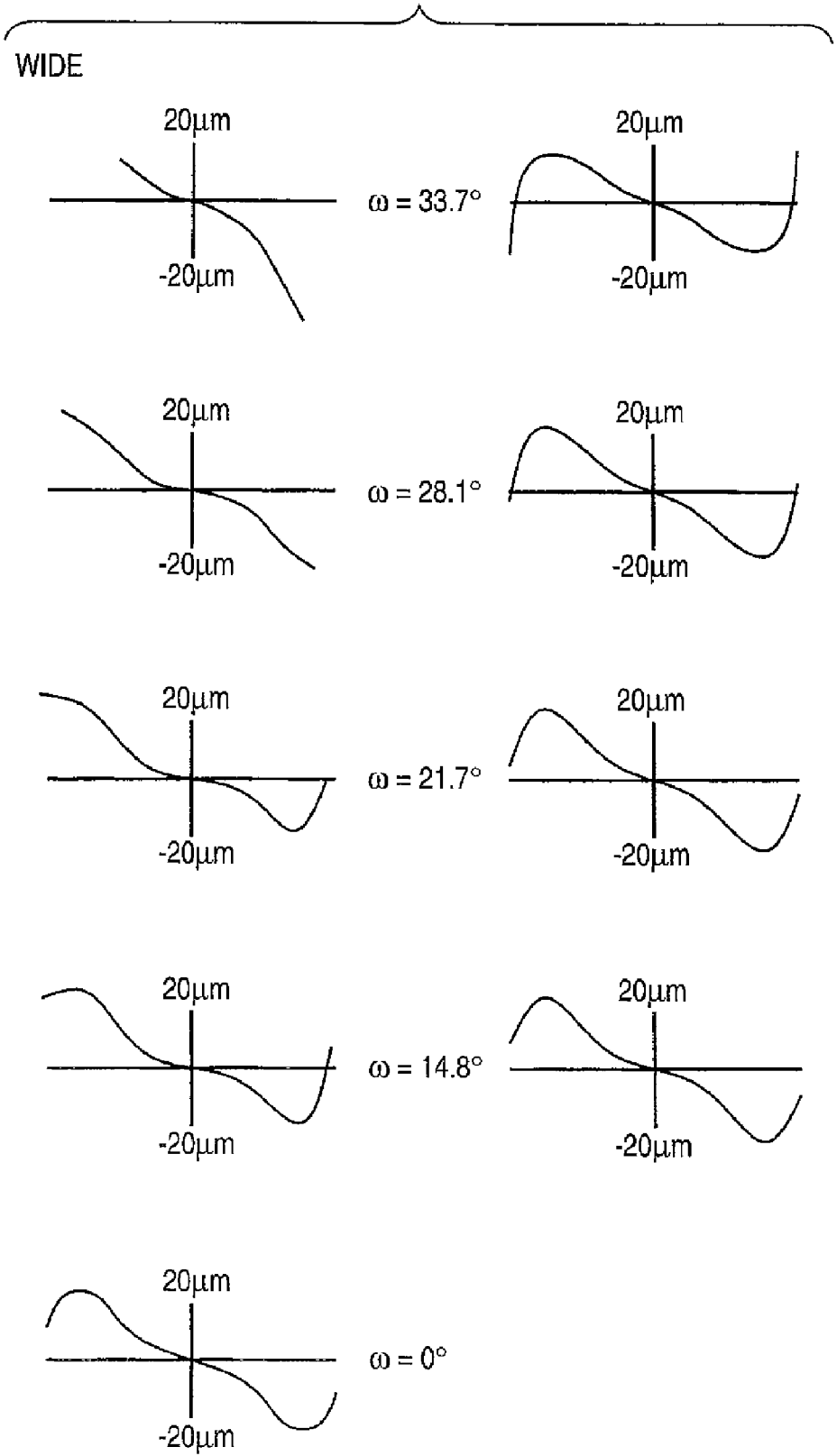
FIG. 38 is an aberration view showing the lateral aberration at the wide-angle end of the zoom lens for projection according to the example 6.
Figure 39:
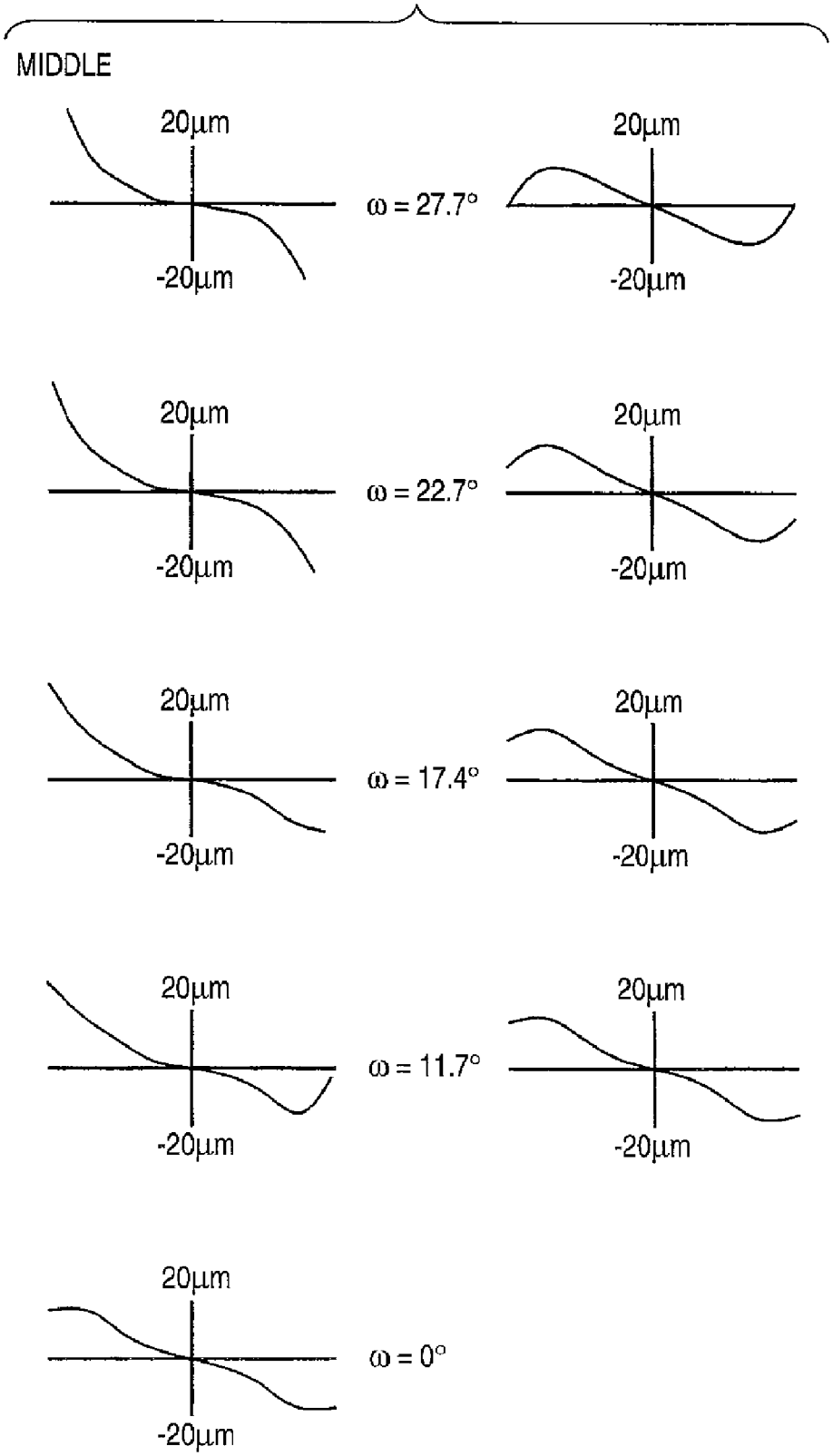
FIG. 39 is an aberration view showing the lateral aberration at the middle position of the zoom lens for projection according to the example 6.

Further, FIG. 37 is an aberration view showing the spherical aberration, astigmatism, distortion and lateral chromatic aberration at the wide-angle end, the middle position and the telephoto end in the zoom lens for projection according to the example 6. FIGS. 38, 39 and 40 are the lateral aberration views at the wide-angle end, the middle position and the telephoto end for the light having a wavelength of 546.07 nm.

As will be clear from these aberration views, with the zoom lens for projection according to the example 6, each aberration can be corrected extremely excellently.

Also, with the zoom lens for projection according to the example 6, the optical performance is excellent, and the variable power ratio can be 1.59 times or more, or near 1.6 times. Also, the angle of view 2ω at the wide-angle end can be as large as 67.4 degrees.

Example 7

Figure 33:
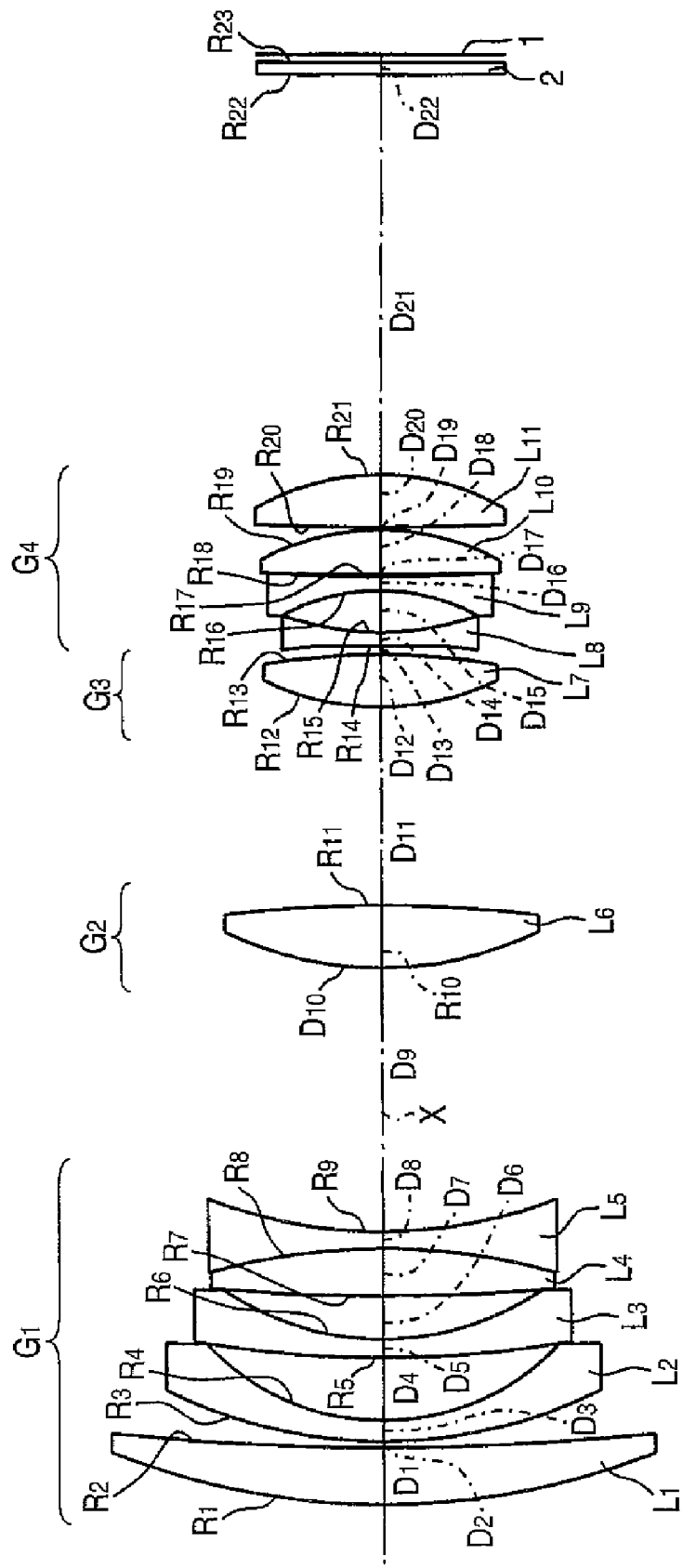
FIG. 33 is a schematic view showing the constitution of a zoom lens for projection according to an example 7 in an exemplary embodiment of the present invention.

A schematic constitution of the zoom lens for projection according to an example 7 is shown in FIG. 33. The lens constitution of the zoom lens for projection according to the example 7 is almost the same as the example 1, and the duplicate explanation is omitted. This embodiment is the same as the above example 5 in that the fourth lens $L_4$ and the fifth lens $L_5$ are constituted as a compound lens, mutually cemented, Table 13 shows the values of the zoom lens for projection, including the radius of curvature R (mm) of each lens face, the on-axis surface spacing D (mm) of each lens, the refractive index N of each lens at the d-line, and the Abbe number ν.

Also, the faces (fourteenth face and fifteenth face) of the eighth lens $L_8$ are aspheric. Table 14 shows the constant K and the values of $A_3$ to $A_{16}$ in the above aspheric expression for each aspheric surface.

TABLE 13 f = 16.73~21.14~26.68
Bfw = 36.00
FNo = 2.20~2.40~2.61
2ω = 67.4°~55.3°~44.7°

| Surface Number | R | D | $N_d$ | $ν_d$ |
|---|---|---|---|---|
| 1 | 64.818 | 4.97 | 1.62041 | 60.3 |
| 2 | 240.522 | 0.50 | | |
| 3 | 42.703 | 1.80 | 1.83481 | 42.7 |
| 4 | 21.051 | 5.50 | | |
| 5 | 98.722 | 1.60 | 1.83481 | 42.7 |
| 6 | 24.578 | 3.76 | | |
| 7 | 176.551 | 4.13 | 1.84666 | 23.8 |
| 8 | -55.759 | 1.50 | 1.62041 | 60.3 |
| 9 | 42.887 | 22.93~13.24~6.43 | | |
| 10 | 31.362 | 5.46 | 1.54814 | 45.8 |
| 11 | -115.417 | 17.32~16.54~13.29 | | |
| 12 | 23.819 | 4.62 | 1.48749 | 70.4 |
| 13 | -58.841 | 0.71~2.46~4.98 | | |
| 14* | 180.550 | 1.20 | 1.68893 | 31.1 |
| 15* | 21.503 | 3.69 | | |
| 16 | -17.877 | 1.20 | 1.84666 | 23.8 |
| 17 | 161.703 | 0.20 | | |
| 18 | 483.023 | 3.94 | 1.72916 | 54.7 |
| 19 | -22.008 | 0.20 | | |
| 20 | 256.392 | 4.63 | 1.67270 | 32.2 |
| 21 | -21.801 | 34.80~39.58~44.62 | | |
| 22 | ∞ | 1.05 | 1.50847 | 61.2 |
| 23 | ∞ | | | |

*Aspheric surface

TABLE 14

| | Surface Number | |
|---|---|---|
| | 14 | 15 |
| K | 0.0000000 | 0.0000000 |
| $A_3$ | $-4.4478601 \times 10^{-5}$ | $-2.1031638 \times 10^{-5}$ |
| $A_4$ | $-9.7193332 \times 10^{-5}$ | $-6.4551011 \times 10^{-5}$ |
| $A_5$ | $-2.6444047 \times 10^{-6}$ | $1.6273821 \times 10^{-6}$ |
| $A_6$ | $3.2732874 \times 10^{-7}$ | $2.2105015 \times 10^{-7}$ |
| $A_7$ | $3.6625704 \times 10^{-8}$ | $9.9824025 \times 10^{-10}$ |
| $A_8$ | $6.0488636 \times 10^{-10}$ | $-1.1922713 \times 10^{-9}$ |
| $A_9$ | $-2.9767725 \times 10^{-10}$ | $-1.2686129 \times 10^{-10}$ |
| $A_{10}$ | $-4.9838346 \times 10^{-11}$ | $4.3099126 \times 10^{-12}$ |
| $A_{11}$ | $-4.2017525 \times 10^{-12}$ | $-6.0208214 \times 10^{-13}$ |
| $A_{12}$ | $-3.8320057 \times 10^{-14}$ | $1.9563944 \times 10^{-13}$ |
| $A_{13}$ | $5.6929325 \times 10^{-14}$ | $1.1290245 \times 10^{-14}$ |
| $A_{14}$ | $1.0543505 \times 10^{-14}$ | $-2.9856450 \times 10^{-15}$ |
| $A_{15}$ | $8.3823551 \times 10^{-16}$ | $-1.1153269 \times 10^{-15}$ |
| $A_{16}$ | $-1.7488501 \times 10^{-16}$ | $1.4061520 \times 10^{-16}$ |

Also, with the zoom lens for projection according to the example 7, all of the conditional expressions (1), and (4) to (6) are satisfied, as shown in Table 13 and Table 17 (refractive index $Nd_9$ of glass material of the ninth lens $L_9$ having the strongest negative power in the fourth lens group $G_4$,=1.847).

Figure 34:
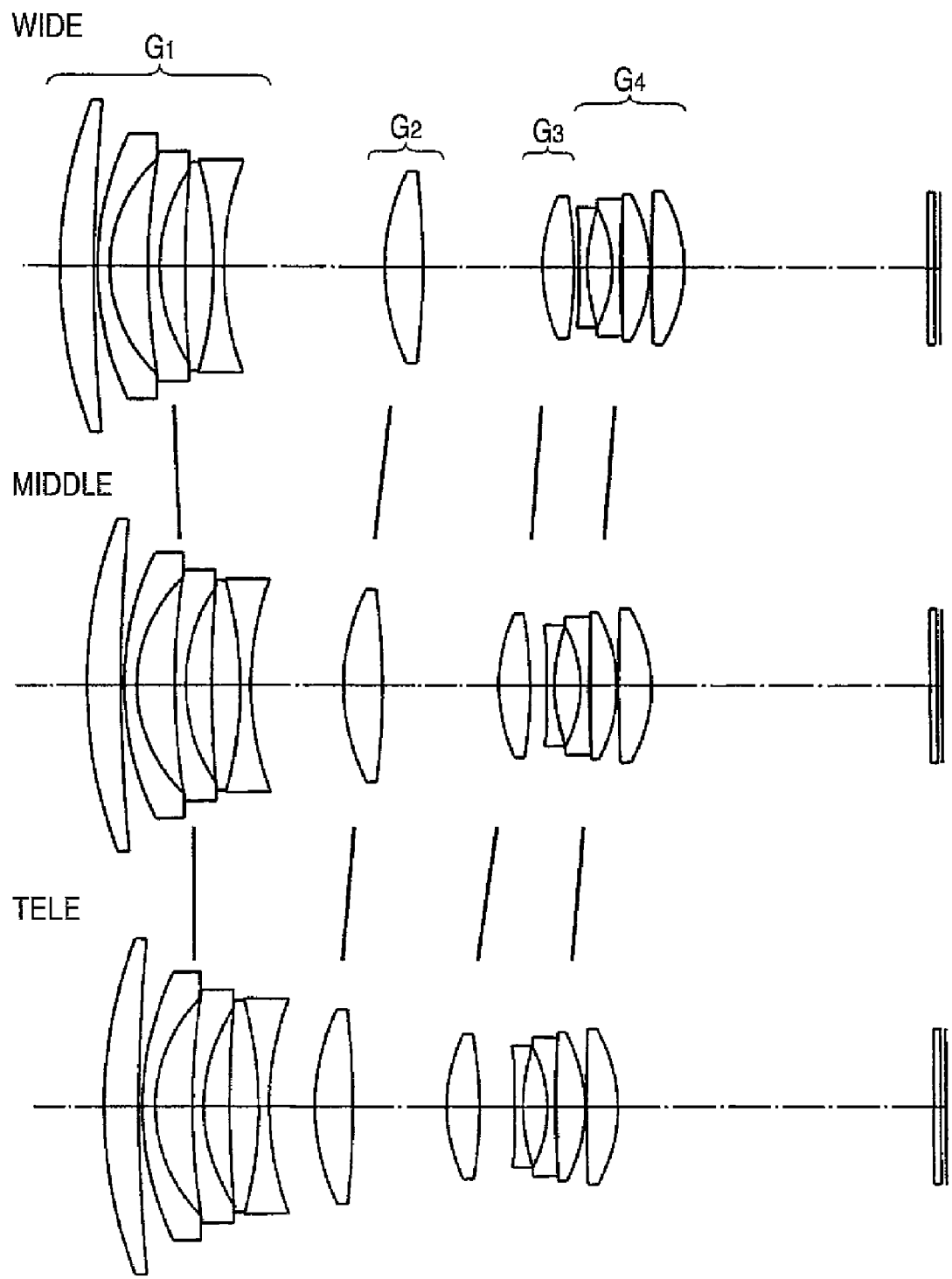
FIG. 34 is a schematic view showing the lens movement loci at variable power in the zoom lens for projection according to the example 7.

FIG. 34 shows the lens movement loci at variable power in the zoom lens for projection according to the example 7.

Figure 41:
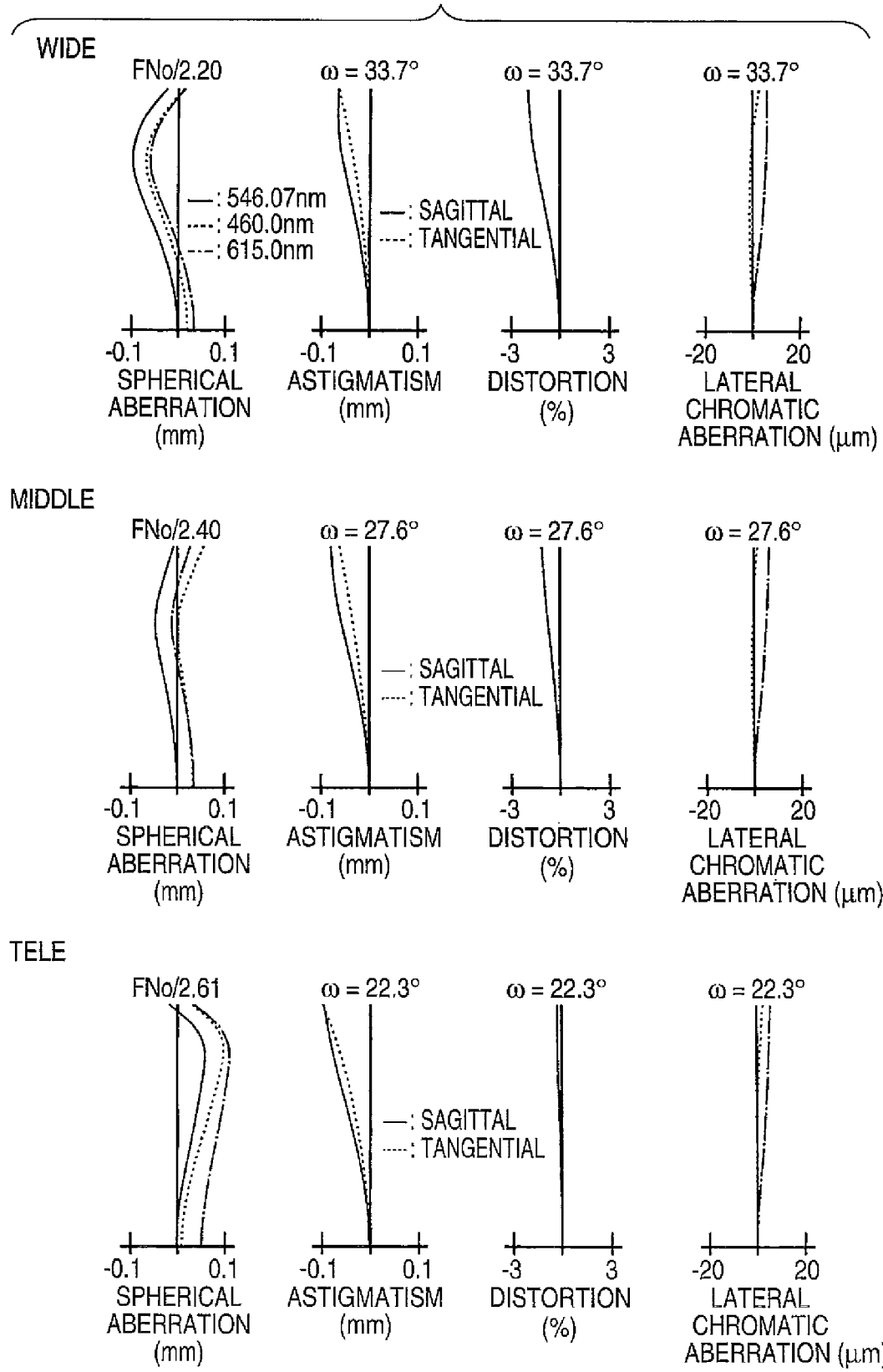
FIG. 41 is an aberration view showing various aberrations (spherical aberration, astigmatism, distortion and lateral chromatic aberration) of the zoom lens for projection according to the example 7.
Figure 42:
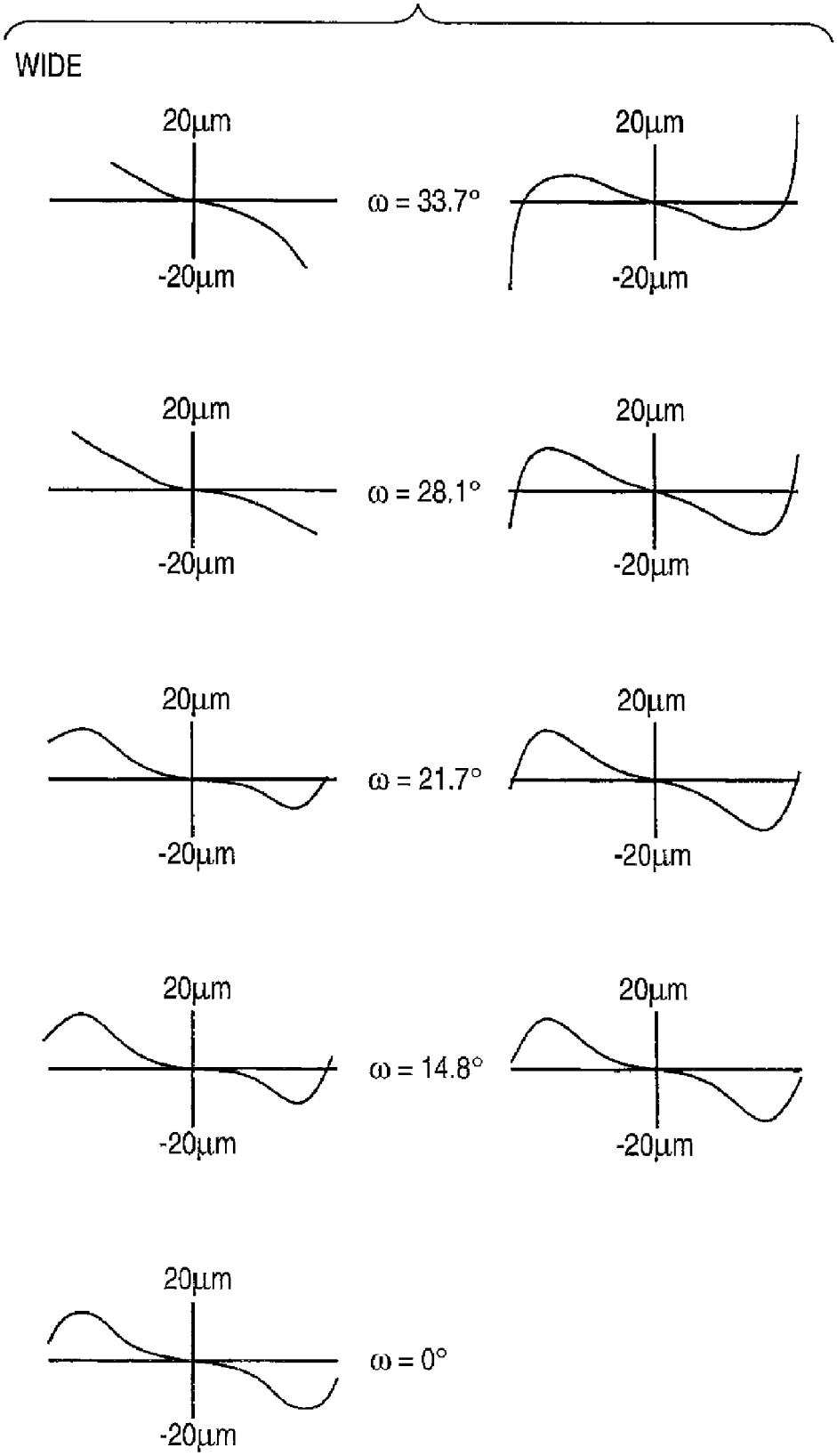
FIG. 42 is an aberration view showing the lateral aberration at the wide-angle end of the zoom lens for projection according to the example 7.
Figure 43:
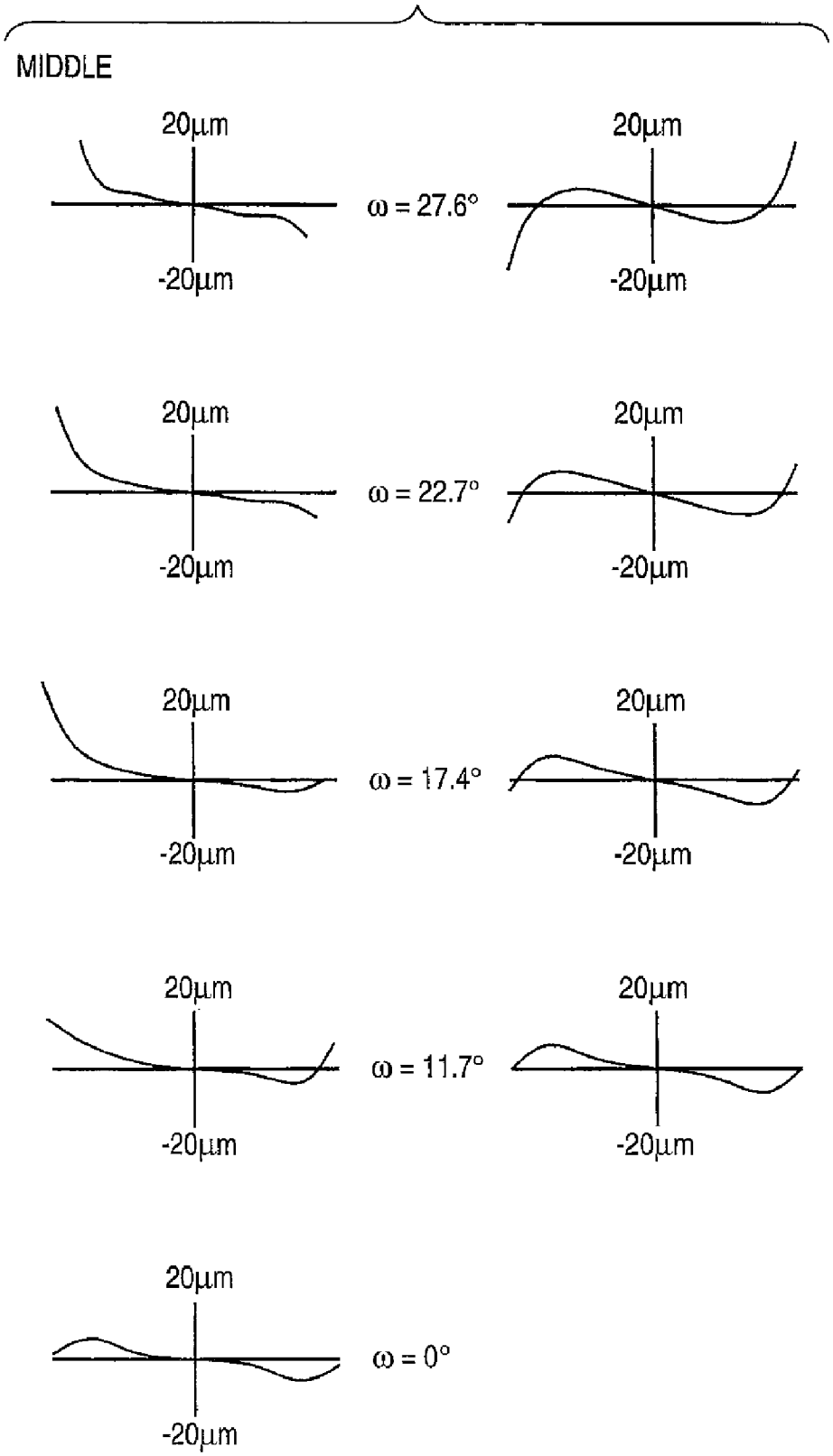
FIG. 43 is an aberration view showing the lateral aberration at the middle position of the zoom lens for projection according to the example 7.

Further, FIG. 41 is an aberration view showing the spherical aberration, astigmatism, distortion and lateral chromatic aberration at the wide-angle end, the middle position and the telephoto end in the zoom lens for projection according to the example 7. FIGS. 42, 43 and 44 are the lateral aberration views at the wide-angle end, the middle position and the telephoto end for the light having a wavelength of 546.07 nm.

As will be clear from these aberration views, with the zoom lens for projection according to the example 7, each aberration can be corrected extremely excellently.

Also, with the zoom lens for projection according to the example 7, the optical performance is excellent, and the variable power ratio can be 1.59 times or more, or near 1.6 times. Also, the angle of view 2ω at the wide-angle end can be as large as 67.4 degrees.

Example 8

Figure 35:
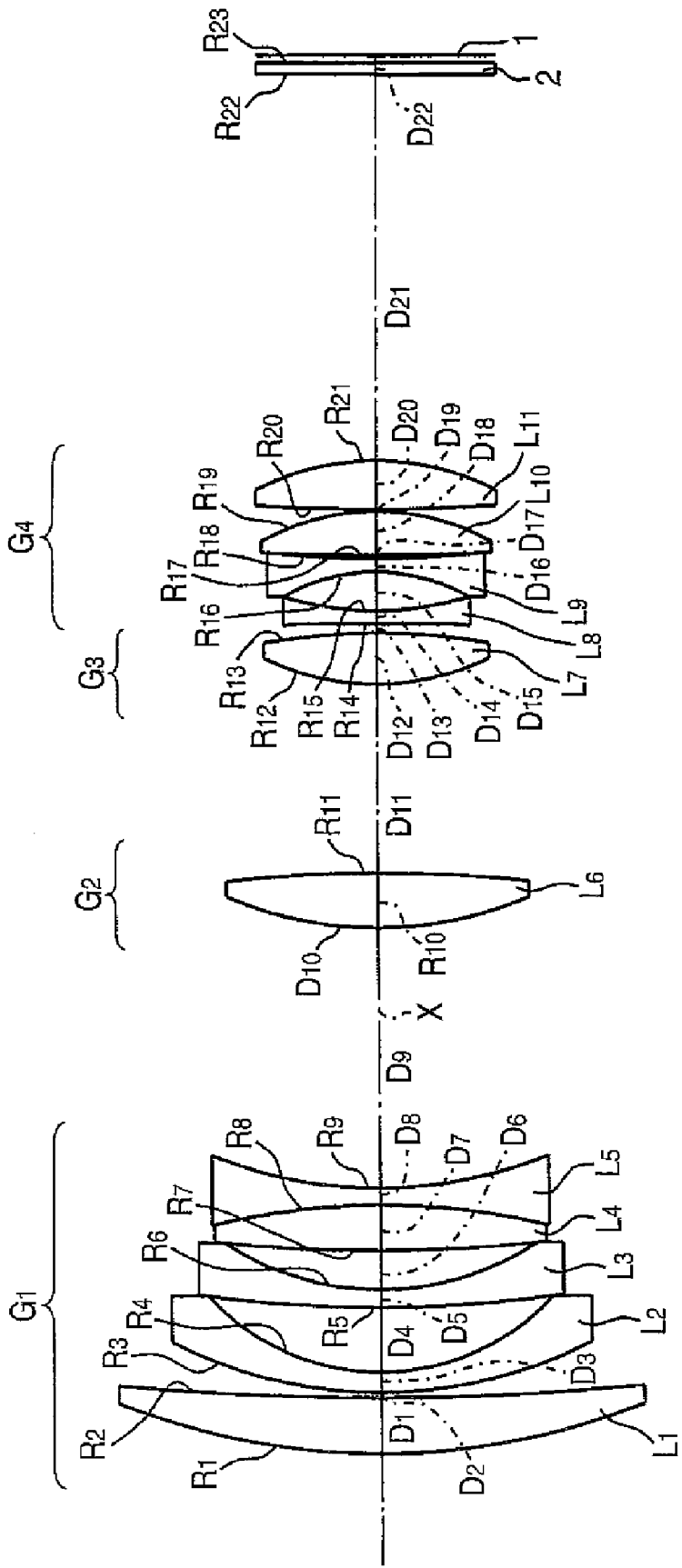
FIG. 35 is a schematic view showing the constitution of a zoom lens for projection according to an example 8 in an exemplary embodiment of the present invention.

A schematic constitution of the zoom lens for projection according to an example 8 is shown in FIG. 35. The lens constitution of the zoom lens for projection according to the example 8 is almost the same as the example 1, and the duplicate explanation is omitted. This embodiment is the same as the above example 5 in that the fourth lens $L_4$ and the fifth lens $L_5$ are constituted as a compound lens, mutually cemented, Table 15 shows the values of the zoom lens for projection, including the radius of curvature R (mm) of each lens face, the on-axis surface spacing D (mm) of each lens, the refractive index N of each lens at the d-line, and the Abbe number ν.

Also, the faces (fourteenth face and fifteenth face) of the eighth lens $L_8$ are aspheric. Table 16 shows the constant K and the values of $A_3$ to $A_{16}$ in the above aspheric expression for each aspheric surface.

TABLE 15

$f = 16.74\sim 21.14\sim 26.69$
$Bfw = 36.00$
$FNo = 2.20\sim 2.39\sim 2.58$
$2\omega = 67.4°\sim 55.3°\sim 44.7°$

| Surface Number | R | D | $N_d$ | $\nu_d$ |
|---|---|---|---|---|
| 1 | 64.921 | 5.03 | 1.60311 | 60.7 |
| 2 | 256.841 | 0.50 | | |
| 3 | 42.050 | 1.80 | 1.83481 | 42.7 |
| 4 | 21.086 | 5.87 | | |
| 5 | 117.771 | 1.60 | 1.83481 | 42.7 |
| 6 | 25.827 | 3.51 | | |
| 7 | 140.461 | 4.11 | 1.84666 | 23.8 |
| 8 | −64.446 | 1.50 | 1.60311 | 60.7 |
| 9 | 40.702 | 23.51~13.68~6.68 | | |
| 10 | 35.137 | 4.96 | 1.60342 | 38.0 |
| 11 | −129.920 | 17.16~16.61~13.67 | | |
| 12 | 23.528 | 4.64 | 1.48749 | 70.4 |
| 13 | −60.048 | 0.80~2.59~5.21 | | |
| 14* | 184.920 | 1.20 | 1.83917 | 23.9 |
| 15* | 26.257 | 3.56 | | |
| 16 | −17.089 | 1.20 | 1.84666 | 23.8 |
| 17 | 95.533 | 0.30 | | |
| 18 | 227.183 | 3.98 | 1.72916 | 54.7 |
| 19 | −21.675 | 0.20 | | |
| 20 | 176.318 | 4.41 | 1.74077 | 27.8 |

TABLE 15-continued $f = 16.74\sim 21.14\sim 26.69$
$Bfw = 36.00$
$FNo = 2.20\sim 2.39\sim 2.58$
$2\omega = 67.4°\sim 55.3°\sim 44.7°$

| Surface Number | R | D | $N_d$ | $\nu_d$ |
|---|---|---|---|---|
| 21 | −23.943 | 34.80~39.27~44.00 | | |
| 22 | ∞ | 1.05 | 1.50847 | 61.2 |
| 23 | ∞ | | | |

*Aspheric surface

TABLE 16

| | Surface Number | |
|---|---|---|
| | 14 | 15 |
| K | 0.0000000 | 0.0000000 |
| $A_3$ | $-1.9943892 \times 10^{-5}$ | $-1.3965449 \times 10^{-5}$ |
| $A_4$ | $-3.8144002 \times 10^{-5}$ | $-4.5492455 \times 10^{-5}$ |
| $A_5$ | $-1.8234915 \times 10^{-6}$ | $-1.4154593 \times 10^{-6}$ |
| $A_6$ | $-2.1305587 \times 10^{-8}$ | $-2.9027385 \times 10^{-8}$ |
| $A_7$ | $1.1487881 \times 10^{-9}$ | $5.4311769 \times 10^{-10}$ |
| $A_8$ | $-1.6920903 \times 10^{-10}$ | $-3.0436811 \times 10^{-10}$ |
| $A_9$ | $-4.8165032 \times 10^{-11}$ | $-1.0610299 \times 10^{-10}$ |
| $A_{10}$ | $-5.1816257 \times 10^{-12}$ | $-5.0616268 \times 10^{-12}$ |
| $A_{11}$ | $-3.0797936 \times 10^{-13}$ | $-1.8329067 \times 10^{-12}$ |
| $A_{12}$ | $1.8801406 \times 10^{-14}$ | $2.1749923 \times 10^{-13}$ |
| $A_{13}$ | $1.0006390 \times 10^{-14}$ | $4.3584562 \times 10^{-14}$ |
| $A_{14}$ | $2.0153834 \times 10^{-15}$ | $2.6559734 \times 10^{-15}$ |
| $A_{15}$ | $2.6706225 \times 10^{-16}$ | $-7.3158926 \times 10^{-16}$ |
| $A_{16}$ | $-4.7362956 \times 10^{-17}$ | $1.4764410 \times 10^{-17}$ |

Also, with the zoom lens for projection according to the example 8, all of the conditional expressions (1), and (4) to (6) are satisfied, as shown in Table 15 and Table 17 (refractive index $Nd_9$ of glass material of the ninth lens $L_9$ having the strongest negative power in the fourth lens group $G_4$,=1.847).

Figure 36:
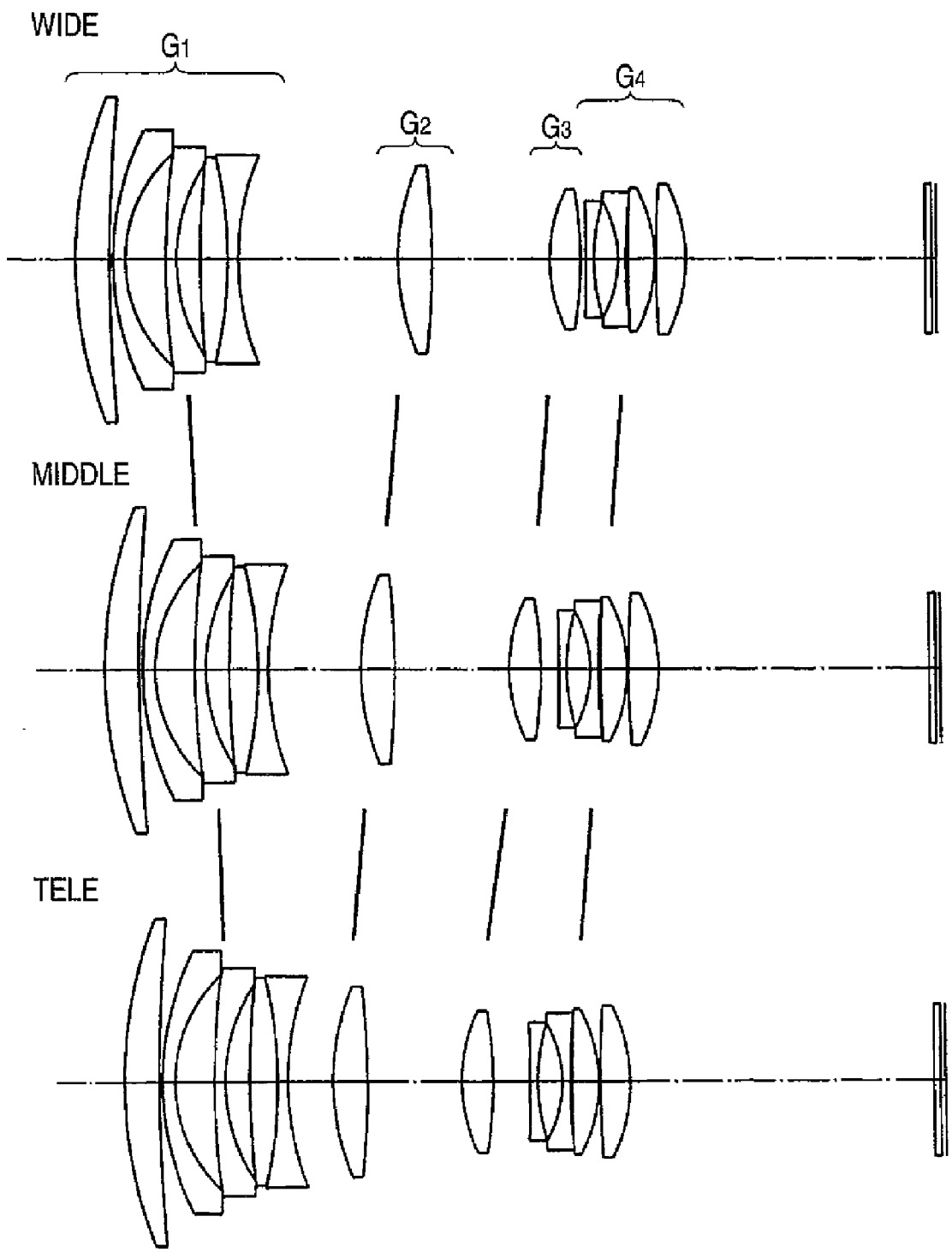
FIG. 36 is a schematic view showing the lens movement loci at variable power in the zoom lens for projection according to the example 8.

FIG. 36 shows the lens movement loci at variable power in the zoom lens for projection according to the example 8.

Figure 45:
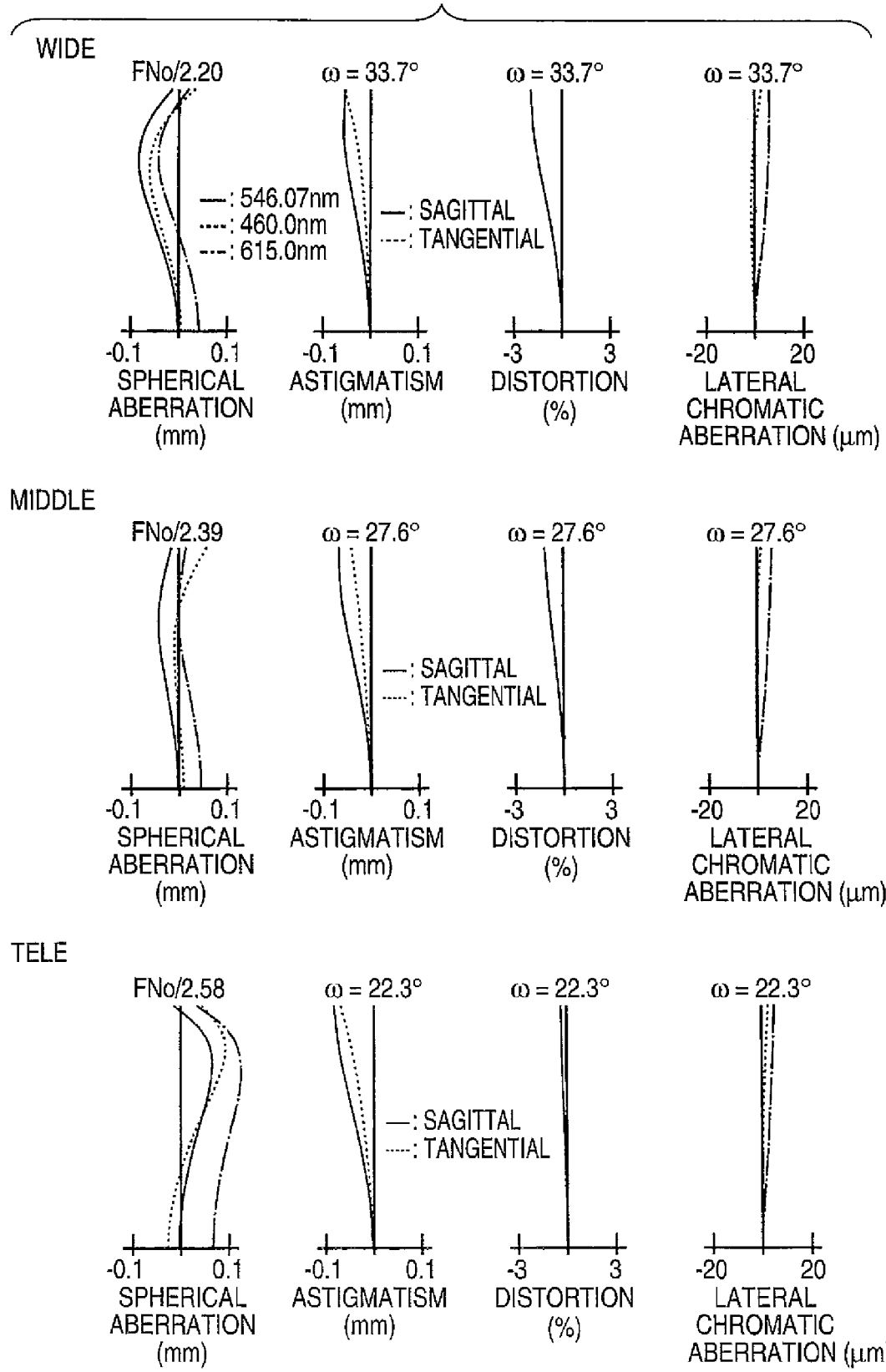
FIG. 45 is an aberration view showing various aberrations (spherical aberration, astigmatism, distortion and lateral chromatic aberration) of the zoom lens for projection according to the example 8.
Figure 46:
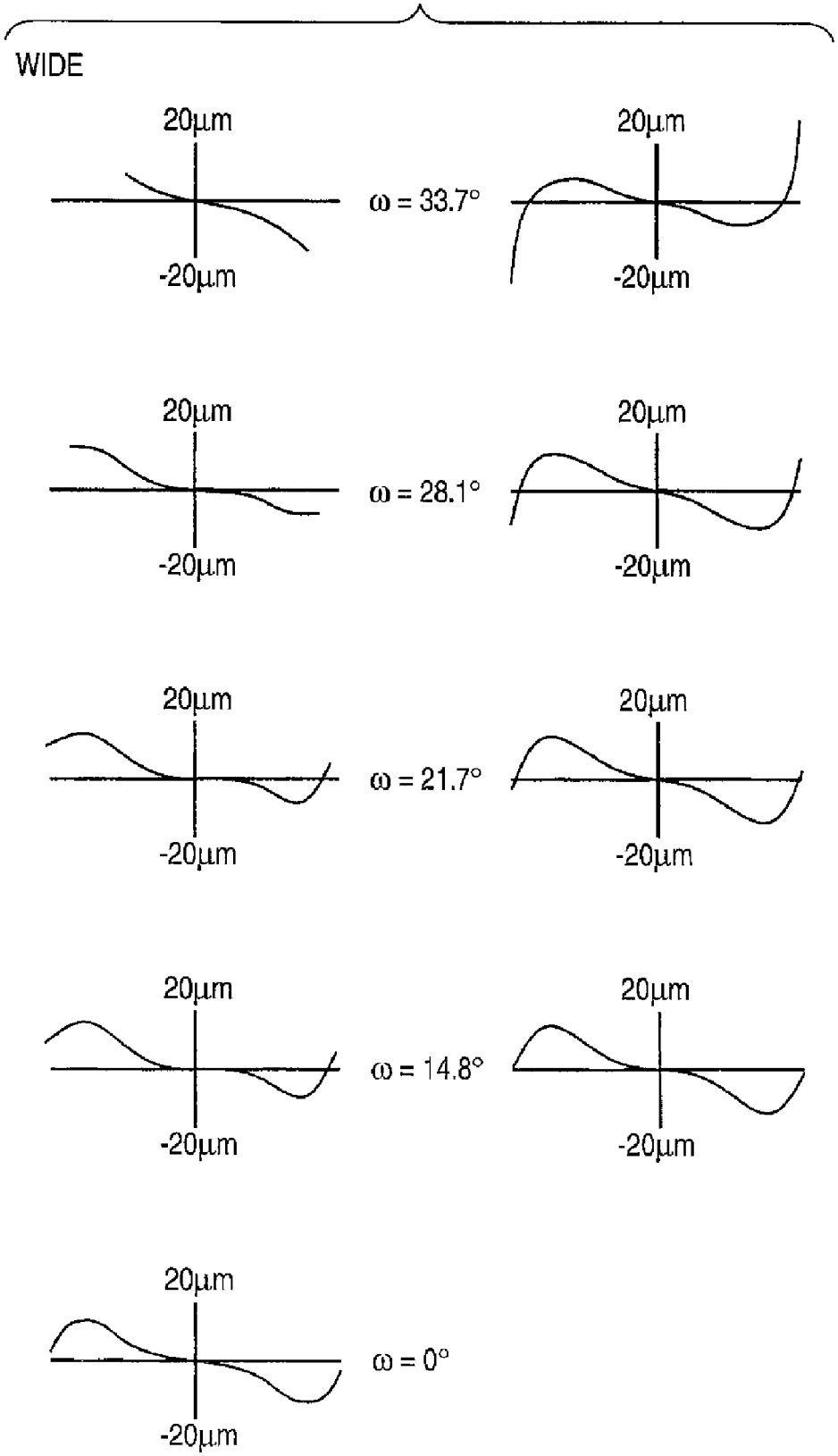
FIG. 46 is an aberration view showing the lateral aberration at the wide-angle end of the zoom lens for projection according to the example 8.
Figure 48:
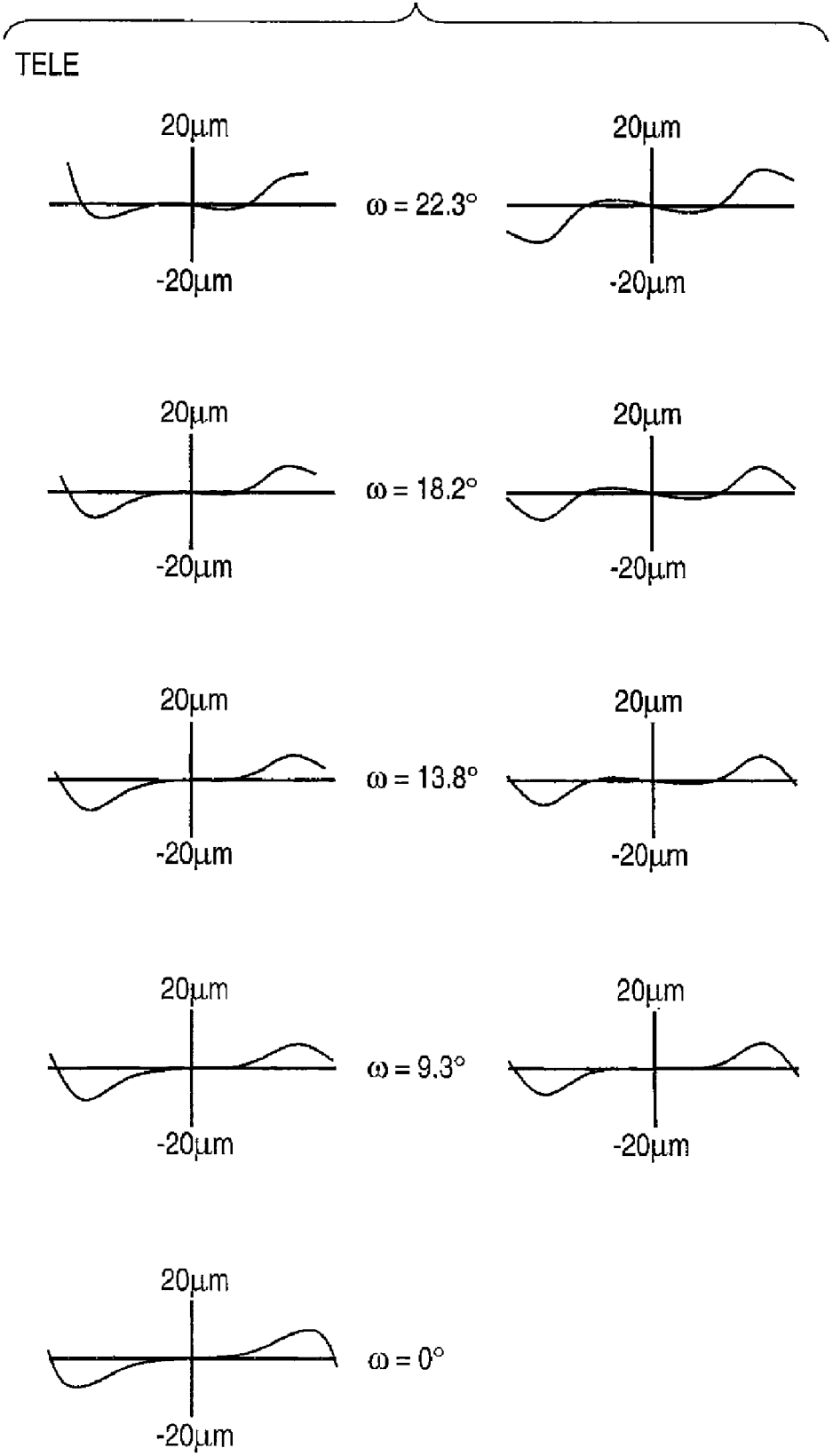
FIG. 48 is an aberration view showing the lateral aberration at the telephoto end of the zoom lens for projection according to the example 8.

Further, FIG. 45 is an aberration view showing the spherical aberration, astigmatism, distortion and lateral chromatic aberration at the wide-angle end, the middle position and the telephoto end in the zoom lens for projection according to the example 8. FIGS. 46, 47 and 48 are the lateral aberration views at the wide-angle end, the middle position and the telephoto end for the light having a wavelength of 546.07 nm.

As will be clear from these aberration views, with the zoom lens for projection according to the example 8, each aberration can be corrected extremely excellently.

Also, with the zoom lens for projection according to the example 8, the optical performance is excellent, and the variable power ratio can be 1.59 times or more, or near 1.6 times. Also, the angle of view 2ω at the wide-angle end can be as large as 67.4 degrees.

TABLE 17

| | Example 1 | Example 2 | Example 3 | Example 4 | Example 5 | Example 6 | Example 7 | Example 8 |
|---|---|---|---|---|---|---|---|---|
| fw | 16.76 | 16.75 | 16.75 | 16.75 | 16.74 | 16.74 | 16.73 | 16.74 |
| ft | 26.72 | 26.72 | 26.72 | 26.71 | 26.71 | 26.70 | 26.68 | 26.69 |
| Bfw | 36.01 | 36.01 | 36.01 | 36.01 | 36.01 | 36.00 | 36.00 | 36.00 |
| frw | 36.26 | 35.74 | 36.38 | 36.88 | 36.65 | 37.02 | 37.57 | 37.16 |
| frt | 36.48 | 36.12 | 36.62 | 37.27 | 36.69 | 36.39 | 36.64 | 36.82 |
| frw/frt | 0.99 | 0.99 | 0.99 | 0.99 | 1.00 | 1.02 | 1.03 | 1.01 |
| M1 | 3.53 | 3.98 | 4.03 | 3.33 | 2.83 | 4.29 | 6.43 | 6.71 |

TABLE 17-continued

|  | Example 1 | Example 2 | Example 3 | Example 4 | Example 5 | Example 6 | Example 7 | Example 8 |
|---|---|---|---|---|---|---|---|---|
| M2 | −14.13 | −13.67 | −14.57 | −13.95 | −13.38 | −11.08 | −10.07 | −10.13 |
| M3 | −14.39 | −13.89 | −14.14 | −14.61 | −14.70 | −14.50 | −14.10 | −13.61 |
| M4 | −12.07 | −11.30 | −12.31 | −11.53 | −11.50 | −10.51 | −9.82 | −9.20 |
| f1 | −22.38 | −22.80 | −22.46 | −22.14 | −21.37 | −21.66 | −22.37 | −23.01 |
| f2 | 59.49 | 58.85 | 59.18 | 58.88 | 55.94 | 53.26 | 45.38 | 46.10 |
| f3 | 25.55 | 27.68 | 23.95 | 28.24 | 28.22 | 31.76 | 35.32 | 35.21 |
| f4 | 454.34 | 253.15 | −41810.14 | 195.31 | 183.41 | 117.67 | 104.94 | 101.51 |
| M1/f1 | −0.16 | −0.17 | −0.18 | −0.15 | −0.13 | −0.20 | −0.29 | −0.29 |
| M2/f2 | −0.24 | −0.23 | −0.25 | −0.24 | −0.24 | −0.21 | −0.22 | −0.22 |
| M3/f3 | −0.56 | −0.50 | −0.59 | −0.52 | −0.52 | −0.46 | −0.40 | −0.39 |
| M4/f4 | −0.03 | −0.04 | −0.00 | −0.06 | −0.06 | −0.09 | −0.09 | −0.09 |

It is supposed that the movement amount of the group is positive on the reduction side in the optical axis direction.

This application claims foreign priority from Japanese Patent Application Nos. 2006-343774 and 2007-54359, filed Dec. 21, 2006 and Mar. 5, 2007, respectively, the entire disclosure of which is herein incorporated by reference.

What is claimed is:

1. A zoom lens for projection, comprising: in order from a magnification side of the zoom lens,
a first lens group having a negative refractive power;
a second lens group having a positive refractive power;
a third lens group having a positive refractive power; and
a fourth lens group having a positive or negative refractive power,
wherein when the zoom lens varies a power thereof from a wide-angle end to a telephoto end, the second, third and fourth lens groups moves to the magnification side, and the zoom lens satisfies conditional expression (1):

$$0.95 < frw/frt < 1.05 \quad (1)$$

wherein frw is a composite focal length of the second, third and fourth lens groups at the wide-angle end, and frt is a composite focal length of the second, third and fourth lens groups at the telephoto end.

2. The zoom lens for projection according to claim 1, further satisfying conditional expressions (2) and (3):

$$|M4/f4| < |M1/f1| < |M2/f2| < |M3/f3| \quad (2)$$

$$0.4 < |M3/f3| < 0.8 \quad (3)$$

wherein Mn is a travel distance of the nth lens group from a wide-angle end position to a telephoto end position, and fn is a focal length of the nth lens group.

3. The zoom lens for projection according to claim 2, wherein the fourth lens group includes a lens having the strongest negative power in the forth lens group, the lens being made of an optical material having a refractive index Nd at the d-line, Nd satisfying conditional expression (6):

$$Nd > 1.75 \quad (6).$$

4. The zoom lens for projection according to claim 3, wherein the fourth lens group includes a positive lens on the most reduction side thereof the positive lens having a convex surface on the reduction side.

5. The zoom lens for projection according to claim 4, wherein the fourth lens group includes an aspheric lens.

6. The zoom lens for projection according to claim 1, further satisfying conditional expressions (4) and (5):

$$|M4/f4| < |M2/f2| < |M1/f1| < |M3/f3| \quad (4)$$

$$0.2 < |M3/f3| < 0.6 \quad (5)$$

wherein Mn is a travel distance of the nth lens group from a wide-angle end position to a telephoto end position, and fn is a focal length of the nth lens group.

7. The zoom lens for projection according to claim 6, wherein the fourth lens group includes a lens having the strongest negative power in the forth lens group, the lens being made of an optical material having a refractive index Nd at the d-line, Nd satisfying conditional expression (6):

$$Nd > 1.75 \quad (6).$$

8. The zoom lens for projection according to claim 7, wherein the fourth lens group includes a positive lens on the most reduction side thereof the positive lens having a convex surface on the reduction side.

9. The zoom lens for projection according to claim 8, wherein the fourth lens group includes an aspheric lens.

10. The zoom lens for projection according to claim 1, wherein the fourth lens group includes a lens having the strongest negative power in the forth lens group, the lens being made of an optical material having a refractive index Nd at the d-line, Nd satisfying conditional expression (6):

$$Nd > 1.75 \quad (6).$$

11. The zoom lens for projection according to claim 1, wherein the fourth lens group includes a positive lens on the most reduction side thereof, the positive lens having a convex surface on the reduction side.

12. The zoom lens for projection according to claim 1, wherein the fourth lens group includes an aspheric lens.

13. A projection display device comprising:
a light source;
an illuminating optical section that conducts a flux of light from the light source to the light valve;
a light valve that optically modulates the flux of light from the light source; and
a zoom lens for projection according to claim 1, the zoom lens projecting the flux of light onto a screen.

* * * * *